(12) United States Patent
Kim et al.

(10) Patent No.: US 10,869,223 B2
(45) Date of Patent: Dec. 15, 2020

(54) METHOD AND APPARATUS FOR EFFICIENT OPERATION UPON PACKET DUPLICATION ACTIVATION AND DEACTIVATION IN NEXT GENERATION WIRELESS COMMUNICATION SYSTEM

(71) Applicant: Samsung Electronics Co., Ltd., Suwon-si (KR)

(72) Inventors: Donggun Kim, Suwon-si (KR); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 123 days.

(21) Appl. No.: 16/266,277

(22) Filed: Feb. 4, 2019

(65) Prior Publication Data

US 2019/0253926 A1 Aug. 15, 2019

(30) Foreign Application Priority Data

Feb. 13, 2018 (KR) .................. 10-2018-0018001
Feb. 23, 2018 (KR) .................. 10-2018-0021829

(51) Int. Cl.
*H04W 28/06* (2009.01)
*H04W 28/02* (2009.01)
(Continued)

(52) U.S. Cl.
CPC ....... *H04W 28/06* (2013.01); *H04W 28/0273* (2013.01); *H04W 28/0278* (2013.01);
(Continued)

(58) Field of Classification Search
CPC .............. H04W 28/06; H04W 28/065; H04W 28/0273; H04W 80/08; H04W 76/27; H04W 28/0278; H04W 80/02
See application file for complete search history.

(56) References Cited

U.S. PATENT DOCUMENTS

2016/0255619 A1  9/2016 Yi et al.
2016/0286412 A1  9/2016 Kim et al.
(Continued)

OTHER PUBLICATIONS

International Search Report and Written Opinion dated May 14, 2019, issued in an International application No. PCT/KR2019/001533.

(Continued)

*Primary Examiner* — Walli Z Butt
(74) *Attorney, Agent, or Firm* — Jefferson IP Law, LLP

(57) ABSTRACT

A method by a terminal in a communication system and an apparatus therefor are disclosed. The method includes receiving, from a base station, a radio resource control (RRC) message including a radio link control (RLC) configuration and a packet data convergence protocol (PDCP) configuration associated with a packet duplication, identifying whether a PDCP packet data unit (PDU) is a PDCP control PDU in case that the packet duplication is activated, and transmitting, to the base station, the PDCP control PDU without the packet duplication through a primary RLC entity based on the PDCP configuration in case the PDCP PDU is the PDCP control PDU. The disclosure relates to a communication method and system for converging a $5^{th}$-Generation (5G) communication system for supporting higher data rates beyond a $4^{th}$-Generation (4G) system with a technology for internet of things (IoT). The present disclosure may be applied to intelligent services based on the 5G communication technology and the IoT-related technology, such as smart home, smart building, smart city, smart car, connected car, health care, digital education, smart retail, security and safety services.

20 Claims, 27 Drawing Sheets

(51) Int. Cl.
*H04W 80/08* (2009.01)
*H04W 76/27* (2018.01)
*H04W 80/02* (2009.01)

(52) U.S. Cl.
CPC ......... *H04W 28/065* (2013.01); *H04W 76/27* (2018.02); *H04W 80/08* (2013.01); *H04W 80/02* (2013.01)

(56) References Cited

U.S. PATENT DOCUMENTS

| | | | |
|---|---|---|---|
| 2018/0309660 A1* | 10/2018 | Loehr | H04L 45/14 |
| 2018/0324641 A1* | 11/2018 | Tsai | H04L 69/321 |
| 2019/0253924 A1* | 8/2019 | Kim | H04W 28/0278 |
| 2019/0254116 A1* | 8/2019 | Kunt | H04W 28/06 |
| 2019/0254117 A1* | 8/2019 | Chen | H04L 5/0098 |
| 2020/0029379 A1* | 1/2020 | Xiao | H04L 1/22 |
| 2020/0205050 A1* | 6/2020 | Shah | H04W 36/0005 |

OTHER PUBLICATIONS

LG Electronics Inc., 'PDCP duplication for SRBs', R2-1801409, 3GPP TSG-RAN WG2 NR Ad Hoc #3, Section 2; Jan. 12, 2018; Vancouver, Canada.

CATT, 'PDCP operation and configuration for duplication', R2-1800171, 3GPP TSG-RAN WG2 NR Ad Hoc #3, Sections 1-2.2; Jan. 12, 2018; Vancouver, Canada.

LG Electronics Inc., 'Small corrections to PDCP specification', R2-1801554, 3GPP TSG-RAN WG2 NR Ad Hoc #3, Sections 5.2.1, 6.1-6.1.2; Jan. 27, 2018; Vancouver, Canada.

Huawei et al: "Operation for PDCP duplication", 3GPP Draft; R2-1800207 Operation for PDCP Duplication, 3rd Generation Partnership Project (3GPP), Mobile Competence Centre; 650, Route Des Lucioles; F-06921 Sophia-Antipolis Cedex; France, vol. Ran WG2, No. Vancouver, Canada; Jan. 22, 2018-Jan. 26, 2018 Jan. 12, 2018 (Jan. 12, 2018), XP051386077.

Ericsson: "PDCP modelling issues", 3GPP Draft; R2-1707155—PDCP Modeling Issues, 3rd Generation Partnership Project (3GPP), Mobile Competence Centre; 650, Route Des Lucioles; F-06921 Sophia-Antipolis Cedex; France, vol. Ran WG2, No. Qingdao; Jun. 27, 2017-Jun. 29, 2017 Jun. 16, 2017 KP051306845.

Huawei et al: "Discussion on the PDCP transmit operation", 3GPP Draft; R2-1801000 Discussion on Transmit Operation for PDCP, 3rd Generation Partnership Project (3GPP), Mobile Competence Centre; 650, Route Des Lucioles; F-06921 Sophia-Antipolis Cedex ; Franc, vol. RAN WG2, No. Vancouver, Canada; Jan. 22, 2018-Jan. 26, 2018 Jan. 12, 2018, XP051386502.

LG Electronics Inc: "Issues on packet duplication", 3GPP Draft; R2-1801233_Issues on PDCP DuplicationV2, 3rd Generation Partnership Project (3GPP), Mobile Competence Centre; 650, Route Des Lucioles; F-06921 Sophia-Antipolis Cedex; France, vol. Ran WG2, No. Vancouver, Canada; Jan. 22, 2018-Jan. 26, 2018 Jan. 12, 2018, XP051386662.

Extended European Search Report dated Aug. 26, 2020, issued in European Application No. 19754675.7.

* cited by examiner

FIG. 2M
(a)
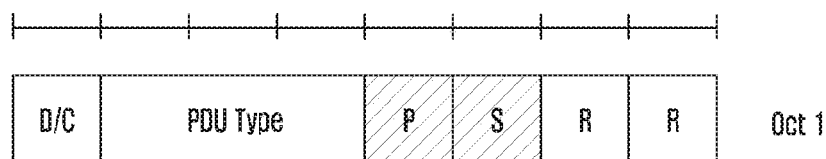
(b)
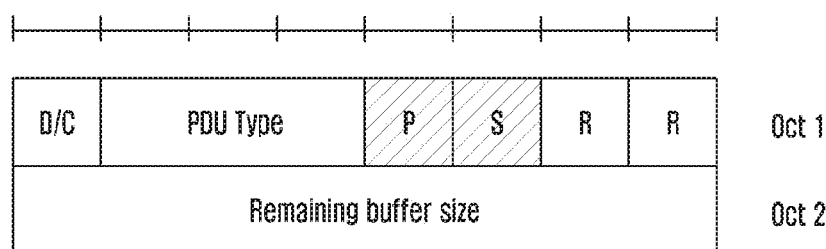

METHOD AND APPARATUS FOR EFFICIENT OPERATION UPON PACKET DUPLICATION ACTIVATION AND DEACTIVATION IN NEXT GENERATION WIRELESS COMMUNICATION SYSTEM

CROSS-REFERENCE TO RELATED APPLICATION(S)

This application is based on and claims priority under 35 U.S.C. § 119 of a Korean patent application number 10-2018-0018001, filed on Feb. 13, 2018, in the Korean Intellectual Property Office, and of a Korean patent application number 10-2018-0021829, filed on Feb. 23, 2018, in the Korean Intellectual Property Office, the disclosure of each of which is incorporated by reference herein in its entirety.

BACKGROUND

1. Field

The disclosure relates to a method and apparatus capable of reducing transmission latency and preventing unnecessary transmission by proposing an efficient operation of a packet data convergence protocol (PDCP) entity and radio link control (RLC) entity when packet duplication is activated and deactivated in a next-generation mobile communication system.

Furthermore, the disclosure relates to a method and apparatus for efficiently processing the control data of a PDCP entity when packet duplication is applied to the normal user data of a PDCP layer in a next-generation mobile communication system.

2. Description of Related Art

To meet the demand for wireless data traffic having increased since deployment of $4^{th}$-generation (4G) communication systems, efforts have been made to develop an improved $5^{th}$-Generation (5G) or pre-5G communication system. Therefore, the 5G or pre-5G communication system is also called a 'beyond 4G network' or a 'post long term evolution (LTE) system'. The 5G communication system is considered to be implemented in higher frequency (mm-Wave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and quadrature amplitude modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The internet, which is a human centered connectivity network where humans generate and consume information, is now evolving to the internet of things (IoT) where distributed entities, such as things, exchange and process information without human intervention. The internet of everything (IoE), which is a combination of the IoT technology and the big data processing technology through connection with a cloud server, has emerged. As technology elements, such as "sensing technology", "wired/wireless communication and network infrastructure", "service interface technology", and "Security technology" have been demanded for IoT implementation, a sensor network, a machine-to-machine (M2M) communication, machine type communication (MTC), and so forth have been recently researched. Such an IoT environment may provide intelligent internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described Big Data processing technology may also be considered to be as an example of convergence between the 5G technology and the IoT technology.

The above information is presented as background information only to assist with an understanding of the disclosure. No determination has been made, and no assertion is made, as to whether any of the above might be applicable as prior art with regard to the disclosure.

SUMMARY

A next-generation mobile communication system may transmit the same data through different independent paths in a carrier aggregation or dual connectivity (DC) in order to improve reliability and reduce transmission latency. In the above description, each radio link control (RLC) device supporting the packet duplication may operate in an RLC acknowledged mode (AM) or an RLC unacknowledged mode (RLC UM), and may be activated or deactivated by medium access control (MAC) control information. However, efficiency of a transmission resource can be improved by reducing transmission latency and preventing unnecessary transmission only when the activation operation and the deactivation operation are efficiently performed. However, it is necessary to consider a method of processing the control data of a packet data convergence protocol (PDCP) layer by taking into considering the easiness of an implementation when the packet duplication method is applied and so that a problem does not occur in a reception PDCP entity.

Aspects of the disclosure are to address at least the above-mentioned problems and/or disadvantages and to provide at least the advantages described below. Accordingly, an aspect of the disclosure is to provide an apparatus and method for ~~.

Additional aspects will be set forth in part in the description which follows and, in part, will be apparent from the description, or may be learned by practice of the presented embodiments.

In accordance with an aspect of the disclosure, a method by a terminal in a communication system is provided. The method includes receiving, from a base station, a radio resource control (RRC) message including a radio link control (RLC) configuration and a packet data convergence protocol (PDCP) configuration associated with a packet duplication, identifying whether a PDCP packet data unit (PDU) is a PDCP control PDU in case that the packet duplication is activated; and transmitting, to the base station, the PDCP control PDU without the packet duplication through a primary RLC entity based on the PDCP configuration, in case that the PDCP PDU is the PDCP control PDU.

In accordance with another aspect of the disclosure, a terminal in a communication system is provided. The terminal includes a transceiver and at least one processor coupled with the transceiver and configured to control the transceiver to receive, from a base station, a radio resource control (RRC) message including a radio link control (RLC) configuration and a packet data convergence protocol (PDCP) configuration associated with a packet duplication, identify whether a PDCP packet data unit (PDU) is a PDCP control PDU in case that the packet duplication is activated, and control the transceiver to transmit, to the base station, the PDCP control PDU without the packet duplication through a primary RLC entity based on the PDCP configuration, in case that the PDCP PDU is the PDCP control PDU.

In accordance with another aspect of the disclosure, a method by a base station in a communication system is provided. The method includes transmitting, to a terminal, a radio resource control (RRC) message including a radio link control (RLC) configuration and a packet data convergence protocol (PDCP) configuration associated with a packet duplication, and receiving, from the terminal, a PDCP control packet data unit (PDU) without the packet duplication through a primary RLC entity based on the PDCP configuration, in case that the PDCP PDU is the PDCP control PDU and a packet duplication is activated.

In accordance with another aspect of the disclosure, a base station in a communication system is provided. The base station includes a transceiver and at least one processor coupled with the transceiver and configured to control the transceiver to transmit, to a terminal, a radio resource control (RRC) message including a radio link control (RLC) configuration and a packet data convergence protocol (PDCP) configuration associated with a packet duplication, and receive, from the terminal, a PDCP control packet data unit (PDU) without the packet duplication through a primary RLC entity based on the PDCP configuration, in case that the PDCP PDU is the PDCP control PDU and a packet duplication is activated.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 2M is a diagram showing a format in which new fields have been defined in a PDCP control packet data unit (PDU) according to an embodiment of the disclosure;

FIG. 2O is a diagram showing the configuration of a base station according to an embodiment of the disclosure.

Throughout the drawings, it should be noted that like reference numbers are used to depict the same or similar elements, features, and structures.

DETAILED DESCRIPTION

Figure 1A:
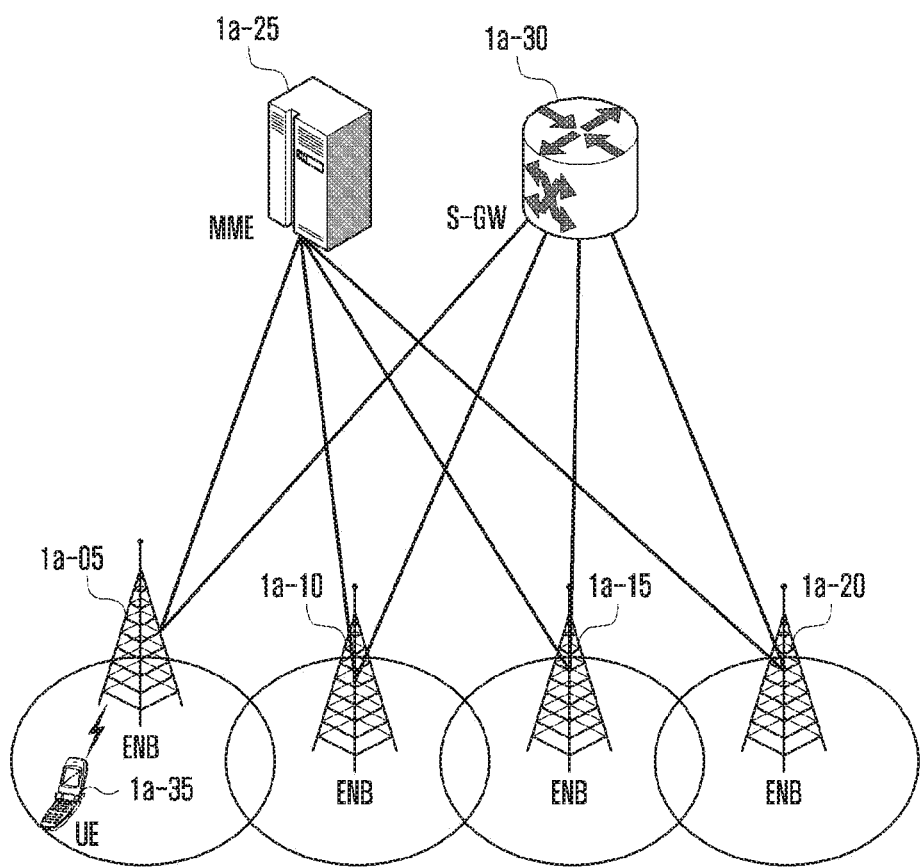
FIG. 1A is a diagram showing the configuration of a long term evolution (LTE) system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In describing the disclosure, a detailed description of a related known function or configuration will be omitted if it is deemed to make the gist of the disclosure unnecessarily vague. Furthermore, terms to be described hereunder have been defined by taking into consideration functions in the disclosure, and may be different depending on a user, an operator's intention or practice. Accordingly, each term should be defined based on contents throughout the entire specification.

In the following description, in describing the disclosure, a detailed description of a related known function or configuration will be omitted if it is deemed to make the gist of the disclosure unnecessarily vague. Embodiments of the disclosure are described in detail with reference to the accompanying drawings.

In the following description, a term to denote an access node, a term to denote network entities, a term to denote messages, a term to denote an interface between network entities, and a term to denote a variety of types of identity information have been illustrated for convenience of description. Accordingly, the disclosure is not limited to the following terms, and other terms to denote targets having equivalent technical meanings may be used.

Hereinafter, for convenience of description, in embodiments of the disclosure, terms and names defined in the $3^{rd}$ generation partnership project long term evolution (3GPP LTE) standard or terms and names modified from the defined terms and names are used. However, the disclosure is not limited to the terms and names and may be identically applied to systems based on other standards. In one embodiment of the disclosure, an eNB may be interchangeably used with a gNB for convenience of description. That is, a base station described as an eNB may indicate a gNB.

First Embodiment

FIG. 1A is a diagram showing the configuration of an LTE system according to an embodiment of the disclosure.

Referring to FIG. 1A, the radio access network of the LTE system includes next-generation evolved Node Bs (hereinafter referred to as "ENBs", "Node Bs" or "base stations") 1a-05, 1a-10, 1a-15, and 1a-20, a mobility management entity (MME) 1a-25, and a serving-gate (S-GW) 1a-30. A user equipment (hereinafter referred to as a "UE or terminal") 1a-35 accesses an external network through the ENBs 1a-05~1a-20 and the S-GW 1a-30.

In FIG. 1A, the ENBs 1a-05~1a-20 correspond to the Node Bs of the existing universal mobile telecommunications system (UMTS) system. The ENB is connected to the UE 1a-35 through a radio channel and performs a more complex function than the existing Node B. In the LTE system, all of types of user traffic including a real-time service, such as voice over internet protocol (VoIP), through the internet protocol, are served through a shared channel. Accordingly, a device that performs schedules by collecting state information, such as the buffer state, available transmission power state, and channel state of UEs, is necessary. The ENBs 1a-05~1a-20 are in charge of such a device. In general, one ENB controls multiple cells. For example, in order to implement the transfer rate of 100 Mbps, the LTE system uses orthogonal frequency division multiplexing (hereinafter referred to as "OFDM") as a radio access technology in the 20 MHz bandwidth, for example. Furthermore, the LTE system adopts an adaptive modulation & coding (hereinafter referred to as "AMC") scheme for determining a modulation scheme and a channel coding rate based on the channel state of a UE. The S-GW 1a-30 provides a data bearer and generates or removes a data bearer under the control of the MME 1a-25. The MME 1a-25 is in charge of various control functions in addition to a mobility management function for a UE, and is connected to multiple ENBs.

Figure 1B:
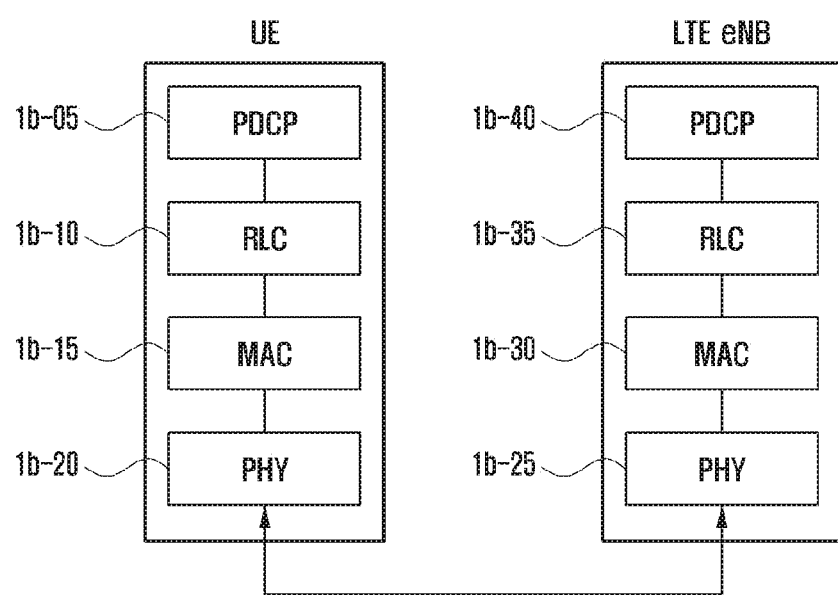
FIG. 1B is a diagram showing radio protocol architecture in the LTE system according to an embodiment of the disclosure.

FIG. 1B is a diagram showing radio protocol architecture in the LTE system according to an embodiment of the disclosure.

Referring to FIG. 1B, the radio protocol of the LTE system includes packet data convergence protocols (PDCPs) 1b-05 and 1b-40, radio link control (RLC) 1b-10 and 1b-35, and medium access control (MAC) 1b-15 and 1b-30 in a UE and an ENB, respectively. The PDCPs 1b-05 and 1b-40 are in charge of an operation, such as IP header compression/restoration. Major functions of the PDCP 1b-05, 1b-40 are summarized as follows.

- Header compression and decompression: robust header compression (ROHC) only
- Transfer of user data
- In-sequence delivery of upper layer PDUs in PDCP re-establishment procedure for RLC AM
- Reordering function (for split bearers in dual connectivity (DC) (only support for RLC AM): PDCP packet data unit (PDU) routing for transmission and PDCP PDU reordering for reception)
- Duplicate detection of lower layer service data units (SDUs) in PDCP re-establishment procedure for RLC AM
- Retransmission of PDCP SDUs at handover and, for split bearers in DC, of PDCP PDUs at PDCP data-recovery procedure, for RLC AM
- Ciphering and deciphering
- Timer-based SDU discard in uplink.

The RLC 1b-10, 1b-35 reconfigures a PDCP packet data unit (PDU) in a proper size and performs an ARQ operation. Major functions of the RLC are summarized as follows.

- Transfer of upper layer PDUs
- ARQ function (Error Correction through ARQ (only for AM data transfer))
- Concatenation, segmentation and reassembly of RLC SDUs (only for unacknowledged mode (UM) and AM data transfer)
- Re-segmentation of RLC data PDUs (only for AM data transfer)
- Reordering of RLC data PDUs (only for UM and AM data transfer)
- Duplicate detection (only for UM and AM data transfer)
- Protocol error detection (only for AM data transfer)
- RLC SDU discard (only for UM and AM data transfer)
- RLC re-establishment The MAC 1b-15, 1b-30 is connected to multiple RLC entities configured in one UE, and performs an operation of multiplexing RLC PDUs with a MAC PDU and demultiplexing RLC PDUs from a MAC PDU. Major functions of the MAC are summarized as follows.

- Mapping between logical channels and transport channels
- Multiplexing/demultiplexing of MAC SDUs belonging to one or different logical channels into/from transport blocks (TB) delivered to/from the physical layer on transport channels)
- Scheduling information reporting
- Error correction through hybrid automatic repeat request (HARQ)
- Priority handling between logical channels of one UE
- Priority handling between UEs by means of dynamic scheduling
- multimedia broadcast multicast services (MBMS) service identification
- Transport format selection
- Padding A physical layer 1b-20, 1b-25 performs an operation of channel-coding and modulating higher layer data, generating the higher layer data into an OFDM symbol, and transmitting the OFDM symbol through a radio channel or demodulating an OFDM symbol received through a radio channel, channel-decoding the OFDM symbol, and transmitting the OFDM symbol to a higher layer.

Figure 1C:
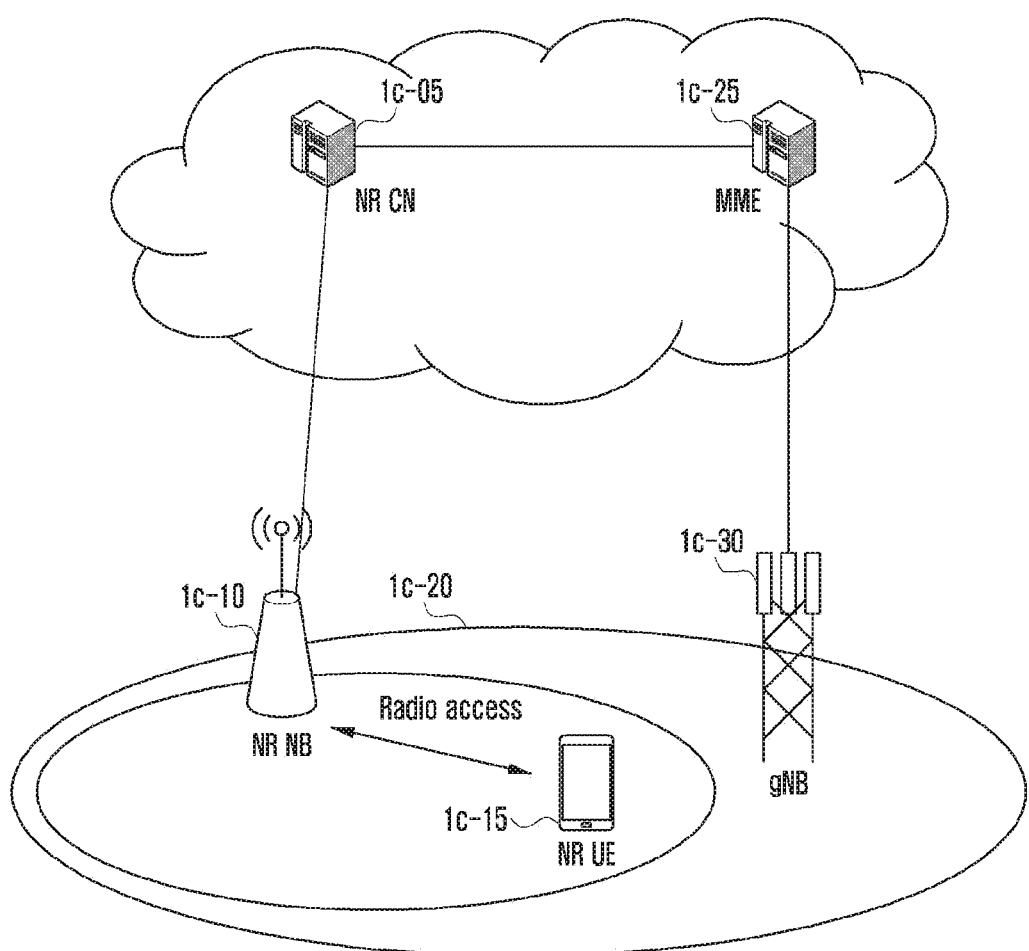
FIG. 1C is a diagram showing the configuration of a next-generation mobile communication system according to an embodiment of the disclosure.

FIG. 1C is a diagram showing the configuration of a next-generation mobile communication system according to an embodiment of the disclosure.

Referring to FIG. 1C, the radio access network of a next-generation mobile communication system (hereinafter referred to as an "NR" or "5G") includes a new radio Node B (hereinafter referred to as an "NR gNB" or an "NR base station") 1c-10 and a new radio core network (NR CN) 1c-05. A new radio user equipment (hereinafter referred to as an "NR UE" or a "terminal") 1c-15 accesses an external network through the NR gNB 1c-10 and the NR CN 1c-05.

In FIG. 1C, the NR gNB 1c-10 corresponds to an evolved Node B (ENB) of the existing LTE system. The NR gNB is connected to the NR UE 1c-15 through a radio channel, and may provide an excellent service compared to the existing Node B. The NR requires a device for performing scheduling by collecting state information, such as the buffer state, available transmission power state, and channel state of UEs, because all of types of user traffic are served through a shared channel. The NR gNB 1c-10 is in charge of the device. In general, one NR gNB controls multiple cells. In order to implement ultra-high speed data transfer compared to the existing LTE, the NR may have the existing maximum bandwidth or more and may additionally graft the beam-forming technology using OFDM as a radio access technology. Furthermore, the NR adopts the AMC scheme that determines a modulation scheme and a channel coding rate based on the channel state of a UE. The NR CN 1c-05 performs functions, such as mobility support, a bearer configuration, and a quality of service (QoS) configuration. The NR CN 1c-05 is in charge of various control functions in addition to a mobility management function for a UE, and is connected to multiple ENBs. Furthermore, the NR may also operate in conjunction with the existing LTE system. The NR CN 1c-05 is connected to an MME 1c-25 through a network interface. The MME 1c-25 is connected to an ENB 1c-30, that is, the existing ENB. The coverage area 1c-20 of the ENB 1c-30 is shown in FIG. 1C as including the coverage area of the NR gNB 1c-10.

Figure 1D:
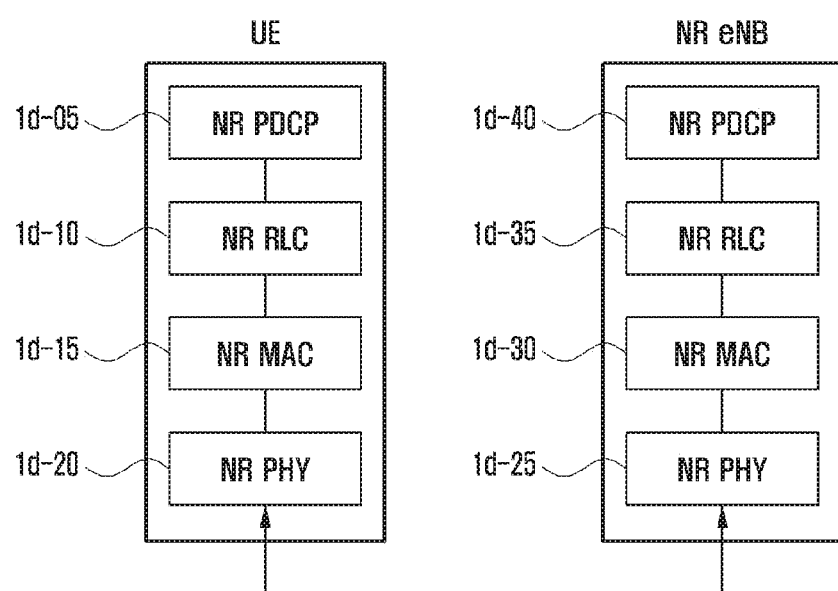
FIG. 1D is a diagram showing radio protocol architecture in the next-generation mobile communication system according to an embodiment of the disclosure.

FIG. 1D is a diagram showing radio protocol architecture in the next-generation mobile communication system according to an embodiment of the disclosure.

Referring to FIG. 1D, the radio protocol of the NR includes NR PDCPs 1d-05 and 1d-40, NR RLC 1d-10 and 1d-35, and NR MAC 1d-15 and 1d-30, respectively, in a UE and an NR base station. Major functions of the NR PDCP 1d-05, 1d-40 may include some of the following functions.

- Header compression and decompression: ROHC only
- Transfer of user data
- In-sequence delivery of upper layer PDUs
- Out-of-sequence delivery of upper layer PDUs
- PDCP PDU reordering for reception
- Duplicate detection of lower layer SDUs
- Retransmission of PDCP SDUs
- Ciphering and deciphering
- Timer-based SDU discard in uplink.

The reordering function of the NR PDCP entity refers to a function of sequentially reordering PDCP PDUs received from a lower layer based on a PDCP sequence number (SN). The reordering function may include a function of transmitting data to a higher layer in a reordered sequence, a function of directly transmitting data to a higher layer without taking the sequence into consideration, a function of reordering the sequence and recording lost PDCP PDUs, a function of making a status report on lost PDCP PDUs to the transmission side, and a function of requesting the retransmission of lost PDCP PDUs.

Major functions of the NR RLC 1d-10, 1d-35 may include some of the following functions.
  Transfer of upper layer PDUs
  In-sequence delivery of upper layer PDUs
  Out-of-sequence delivery of upper layer PDUs
  Error Correction through ARQ
  Concatenation, segmentation and reassembly of the RLC SDUs
  Re-segmentation of RLC data PDUs
  Reordering of RLC data PDUs
  Duplicate detection
  Protocol error detection
  RLC SDU discard
  RLC re-establishment The in-sequence delivery function of the NR RLC entity refers to a function of transmitting RLC SDUs received from a lower layer to a higher layer in sequence, and may include a function of reassembling and transmitting multiple RLC SDUs if one RLC SDU has been originally segmented into the multiple RLC SDUs and received. The in-sequence delivery function may include a function of reordering received RLC PDUs based on an RLC SN (SN) or a PDCP SN, a function of reordering the sequence and recording lost RLC PDUs, a function of transmitting a status report on lost RLC PDUs to the transmission side, a function of requesting the retransmission of lost RLC PDUs, and a function of transmitting only RLC SDUs prior to a lost RLC SDU to a higher layer in sequence if a lost RLC SDU is present or a function of transmitting all of RLC SDUs received before a given timer expires to a higher layer in sequence when the timer expires although there is a lost RLC SDU or a function of transmitting all of RLC SDUs received so far to a higher layer when a given timer expires although there is a lost RLC SDU. Furthermore, the in-sequence delivery function may include a function of processing RLC PDUs in order that they are received (in order of arrival regardless of the sequence of a sequence number) and transmitting the RLC PDUs to a PDCP entity regardless of their sequence (i.e., out of sequence delivery). The in-sequence delivery function may include a function of receiving segments placed in a buffer or segments to be received subsequently, reconfiguring the segments into one complete RLC PDU, processing the RLC PDU, and transmitting the RLC PDU to the PDCP entity. The NR RLC layer may not include a concatenation function. The concatenation function may be performed by the NR MAC layer or may be substituted with the multiplexing function of the NR MAC layer.

In the above description, the out-of-sequence delivery function of the NR RLC entity refers to a function of directly transmitting RLC SDUs received from a lower layer to a higher layer regardless of their sequence. The out-of-sequence delivery function may include a function of reassembling multiple RLC SDUs if one RLC SDU has been originally segmented into the multiple RLC SDUs and received. The out-of-sequence delivery function may include a function of storing the RLC SN or PDCP SN of received RLC PDUs, reordering their sequence, and recording lost RLC PDUs.

The NR MAC 1d-15, 1d-30 may be connected to multiple NR RLC entities configured in one UE. Major functions of the NR MAC may include some of the following functions.
  Mapping between logical channels and transport channels
  Multiplexing/demultiplexing of MAC SDUs
  Scheduling information reporting
  Error correction through HARQ
  Priority handling between logical channels of one UE
  Priority handling between UEs by means of dynamic scheduling
  MBMS service identification
  Transport format selection
  Padding The NR PHY layer 1d-20, 1d-25 may perform an operation of channel-coding and modulating higher layer data, generating the higher layer data into an OFDM symbol, and transmitting the OFDM symbol to a radio channel or demodulating an OFDM symbol received through a radio channel, channel-decoding the OFDM symbol, and transferring the OFDM symbol to a higher layer.

In the disclosure, a transmission stage device may be a base station or a UE, and a reception stage device may be a base station or a UE. That is, the disclosure may include a case where a transmission stage device is a base station and a reception stage device is a UE (downlink data transmission scenario) or a case where a transmission stage device is a UE and a reception stage device is a base station (uplink data transmission scenario). A transmission stage device may indicate a base station or a UE, and a reception stage device may indicate a base station or a UE.

Figure 1E:
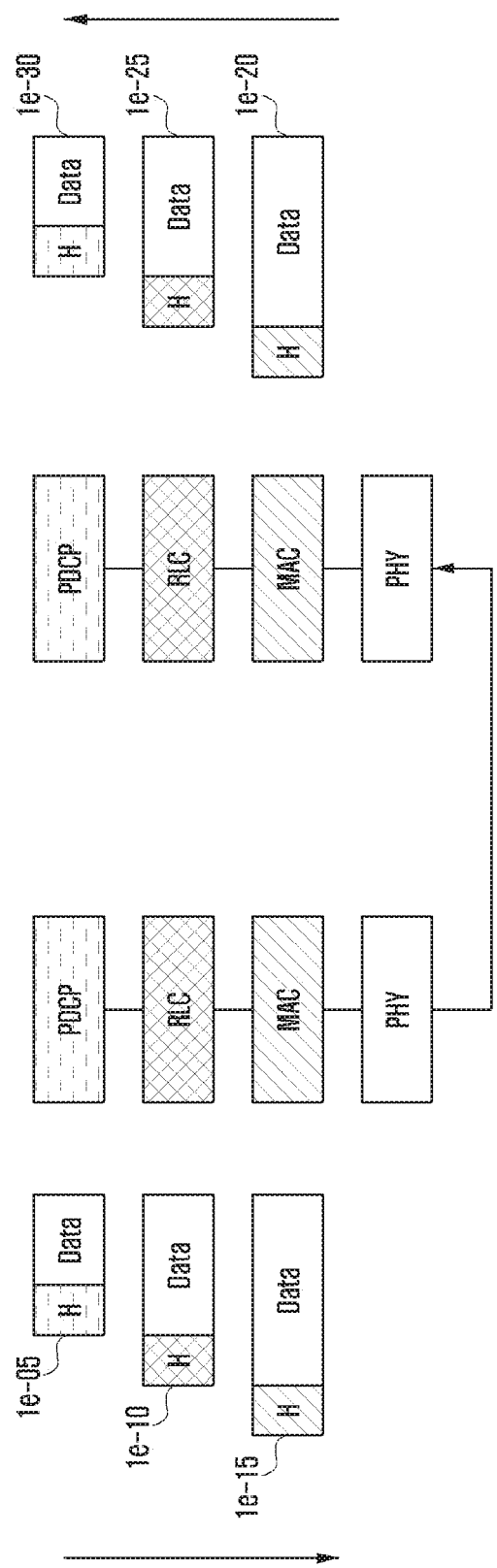
FIG. 1E is a diagram showing a procedure of data being processed in each layer in a next-generation mobile communication system according to an embodiment of the disclosure.

FIG. 1E is a diagram showing a procedure of data being processed in each layer in a next-generation mobile communication system according to an embodiment of the disclosure.

Referring to FIG. 1E, when an IP packet arrives at the PDCP entity, the PDCP layer may perform the function operation of the PDCP layer described in FIG. 1D, may configure a PDCP header, may configure data, such as 1e-05, and may deliver the data to a lower layer. The RLC layer, that is, a lower layer, recognizes the entire PDCP PDU 1e-05, received from the PDCP layer, as one datum, performs an operation according to the RLC layer function described in FIG. 1D, generates data 1e-10 by configuring an RLC header, and delivers the data to a lower layer. When the MAC entity, that is, a lower layer, receives the data 1e-10 from the RLC layer, that is, an RLC PDU 1e-10, it recognizes the entire RLC PDU as data, performs the function of the MAC entity described in FIG. 1D, completes data 1e-15 by configuring a MAC subheader, and performs transmission by delivering the MAC PDU 1e-15 to a lower layer.

When the reception stage MAC entity of FIG. 1E receives a MAC PDU 1e-20 from a lower layer, the MAC entity may read contents regarding a MAC header, considers all the remainders to be data, and delivers them to the RLC layer, that is, a higher layer. When the RLC layer reads the RLC PDU 1e-25, it reads only an RLC header corresponding to the RLC layer, performs a corresponding RLC layer function, and delivers a PDCP PDU 1e-30 to a higher layer. Likewise, the PDCP layer may read only a PDCP header, performs an operation corresponding to the PDCP entity, removes the PDCP header, and delivers the results to a higher layer.

As described above, each layer of a next-generation mobile communication system can read only a header corresponding to each layer, but cannot read a header or data of another layer. Accordingly, each layer manages and processes independent information.

Figure 1F:
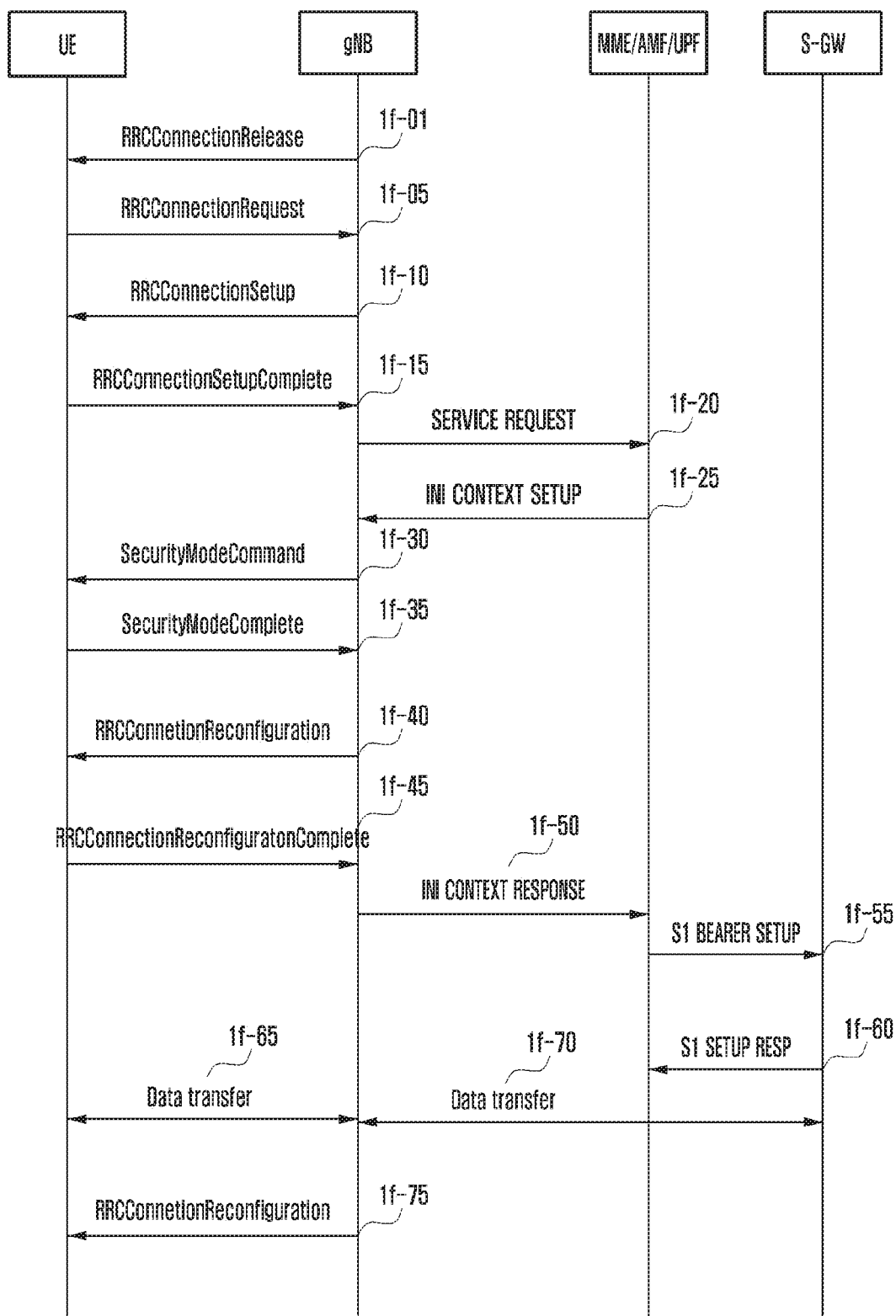
FIG. 1F is a diagram showing a procedure for a base station to configure a packet duplication function in a packet data convergence protocol (PDCP) layer through a radio resource control (RRC) message when a user equipment (UE) establishes a connection with a network according to an embodiment of the disclosure.

FIG. 1F is a diagram showing a procedure for an eNB to configure a packet duplication function in a PDCP layer through a radio resource control (RRC) message when a UE establishes a connection with a network according to an embodiment of the disclosure.

FIG. 1F illustrates a procedure for a UE to switch from an RLC idle mode or an RRC inactive mode (or lightly-connected mode) to an RRC connected mode and to establish a connection with a network, and illustrates a procedure of configuring the uplink packet duplication function (PDCP packet duplication) of the PDCP layer. The procedure may be identically applied to configuring a downlink packet duplication function. The uplink packet duplication function configuration may be configured to configure both the uplink and downlink packet duplication functions.

Referring to FIG. 1F, when the UE that transmits and receives data in the RRC connected mode does not transmit and receive data for a given cause or for a given time, a gNB may transmit an RRCConnectionRelease message to the UE so that the UE switches to the RRC idle mode (1f-01). Subsequently, when the UE with which a connection has not been currently established (hereinafter referred to as an "idle mode UE") has data to be transmitted, it performs an RRC connection establishment process with the gNB. If the UE is the RRC inactive mode, it may perform an RRC connection resume procedure by transmitting an RRCConnectionResumeRequest message. The UE establishes backward transmission synchronization with the gNB through a random access process and transmits an RRCConnectionRequest message to the gNB (1f-05). The message contains an ID and a cause (establishmentCause) for establishing the connection of the UE.

The gNB transmits an RRCConnectionSetup message to the UE so that the UE sets up an RRC connection (1f-10). The message (RRCConnectionSetup message) may configure whether or not to use a packet duplication function for each logical channel (logicalchannelconfig) or for each bearer or for each PDCP entity (PDCP-config). Specifically, the message may designate a primary RLC entity and a secondary RLC entity which are connected to a PDCP entity and may be used for packet duplication. The primary RLC entity or the secondary RLC entity may be indicated as a single RLC entity of a master cell group (MCG) or secondary cell group (SCG) or a logical channel ID. Furthermore, when two RLC entities are configured to be connected to the PDCP entity in the message, the message may configure a threshold that may be used in a split bearer. When the threshold operates as a split bearer, data may be transmitted to only the primary RLC entity when the amount of data to be transmitted is less than the threshold, and data may be transmitted to the primary RLC entity and the secondary RLC entity when the amount of data to be transmitted is greater than the threshold. The configured threshold and the primary RLC entity and the secondary RLC entity activate and use the packet duplication function in dual connectivity. When the packet duplication function is deactivated based on MAC control information, the configured threshold and the primary RLC entity and the secondary RLC entity may be fallen back as a split bearer and may continue to transmit and receive data. Furthermore, when the packet duplication function is configured in the message, the message may configure whether or not to active or deactivate the packet duplication function with respect to a data radio bearer (DRB). Alternatively, when the packet duplication function is configured, the message may designate the packet duplication function to be an activation state or a deactivation state. Specifically, in the case of a signaling radio bearer (SRB) not a data radio bearer, when the packet duplication function is configured, the message may designate the packet duplication function to be always activated. Alternatively, the message may designate the packet duplication function to be always deactivated. Furthermore, when the packet duplication function is configured, the message may designate an initial state as activation or deactivation. Furthermore, when the packet duplication function is configured, the message may designate a default RLC entity to which the PDCP entity will transmit data in the deactivation state. The default RLC entity may be designated as a primary RLC entity or a secondary RLC entity or may be indicated by a logical channel ID. Furthermore, in order to prevent configuration information from being unnecessarily increased in the message, when the packet duplication is configured and becomes the deactivation state, the PDCP entity may always transmit data to the primary RLC entity (convenience of an implementation can be improved because the primary RLC entity is always used in the activation state and the deactivation state). Furthermore, the message may include a logical channel ID to which packet duplication is applied and mapping information of cells to which packet duplication is applied. That is, when the packet duplication is applied, the message may perform a configuration, including mapping information regarding that data corresponding to which logical channel ID will be transmitted to which cells (the logical channel IDs may be configured to transmit data to only the mapped cells). When the packet duplication function is deactivated, the mapping relation of mapping information between the logical channel IDs and the cells configured in the message may be released, and data corresponding to the logical channel ID may be transmitted to a given cell. Furthermore, the message includes RRC connection configuration information. The RRC connection is also called a signaling radio bearer (SRB), and is used for the transmission and reception of an RRC message, that is, a control message, between the UE and the gNB.

The UE that has established an RRC connection transmits an RRCConnetionSetupComplete message to the gNB (1f-15). If the gNB is unaware of the UE capability of a UE with which a connection is now established or wants to be aware of the UE capability, it may transmit, to the UE, a message asking the capability of the UE. Furthermore, the UE may transmit, to the gNB, a message that reports its own capability. The message may indicate whether the UE supports a new packet duplication function. An indicator indicating whether the UE supports a new packet duplication function may be included in the message and transmitted. The RRCConnetionSetupComplete message includes a control message called SERVICE REQUEST that the UE requests a bearer configuration for a given service from the MME or an access and mobility management function (AMF) or a user plane function (UPF) or a session management function (SMF).

The gNB transmits, to the MME or AMF or UPF or SMF, the SERVICE REQUEST message included in the RRCConnetionSetupComplete message (1f-20). The MME determines whether or not to provide a service requested by the UE. If, as a result of the determination, the MME has determined to provide the service requested by the UE, the MME or AMF or UPF or SMF transmits a message called INITIAL CONTEXT SETUP REQUEST to the gNB (1f-25). The message includes quality of service (QoS) information to be applied when a data radio bearer (DRB) is configured and information, such as security-related information (e.g., a security key, security algorithm) to be applied to a DRB.

The gNB transmits a SecurityModeCommand message 1*f*-30 to the UE in order to configure security with the UE. The UE transmits a SecurityModeComplete message 1*f*-35 to the gNB. When the security configuration is completed, the gNB transmits an RRCConnectionReconfiguration message to the UE (1*f*-40). The message (RRCConnectionReconfiguration message) may configure whether or not to use a packet duplication function for each logical channel (logicalchannelconfig) or for each bearer or for each PDCP entity (PDCP-config). Specifically, the message may designate a primary RLC entity and a secondary RLC entity which are connected to a PDCP entity and may be used for packet duplication. The primary RLC entity or the secondary RLC entity may be indicated as a single RLC entity of a master cell group (MCG) or secondary cell group (SCG) or a logical channel ID. Furthermore, when two RLC entities are configured to be connected to the PDCP entity in the message, the message may configure a threshold that may be used in a split bearer. When the threshold operates as a split bearer, data may be transmitted to only the primary RLC entity when the amount of data to be transmitted is less than the threshold, and data may be transmitted to the primary RLC entity and the secondary RLC entity when the amount of data to be transmitted is greater than the threshold. The configured threshold and the primary RLC entity and the secondary RLC entity activate and use the packet duplication function in dual connectivity. When the packet duplication function is deactivated based on MAC control information, the configured threshold and the primary RLC entity and the secondary RLC entity may be fallen back as a split bearer and may continue to transmit and receive data. Furthermore, when the packet duplication function is configured in the message, the message may configure whether or not to active or deactivate the packet duplication function with respect to a data radio bearer (DRB). Alternatively, when the packet duplication function is configured, the message may designate the packet duplication function to be an activation state or a deactivation state. Specifically, in the case of a signaling radio bearer (SRB) not a data radio bearer, when the packet duplication function is configured, the message may designate the packet duplication function to be always activated. Alternatively, the message may designate the packet duplication function to be always deactivated. Furthermore, when the packet duplication function is configured, the message may designate an initial state as activation or deactivation. Furthermore, when the packet duplication function is configured, the message may designate a default RLC entity to which the PDCP entity will transmit data in the deactivation state. The default RLC entity may be designated as a primary RLC entity or a secondary RLC entity or may be indicated by a logical channel ID. Furthermore, in order to prevent configuration information from being unnecessarily increased in the message, when the packet duplication is configured and becomes the deactivation state, the PDCP entity may always transmit data to the primary RLC entity (convenience of an implementation can be improved because the primary RLC entity is always used in the activation state and the deactivation state). Furthermore, the message may include a logical channel ID to which packet duplication is applied and mapping information of cells to which packet duplication is applied. That is, when the packet duplication is applied, the message may perform a configuration, including mapping information regarding that data corresponding to which logical channel ID will be transmitted to which cells (the logical channel IDs may be configured to transmit data to only the mapped cells). When the packet duplication function is deactivated, the mapping relation of mapping information between the logical channel IDs and the cells configured in the message may be released, and data corresponding to the logical channel ID may be transmitted to a given cell. Furthermore, the message may include configuration information of a DRB in which user data will be processed. The UE configures the DRB by applying the configuration information of the DRB, and transmits an RRCConnectionReconfigurationComplete message to the gNB (1*f*-45).

The gNB that has completed the DRB configuration with the UE transmits an INITIAL CONTEXT SETUP COMPLETE message to the MME (1*f*-50). The MME that has received the message transmits an Si BEARER SETUP message to the S-GW in order to set up an Si bearer with the S-GW (1*f*-55). The S-GW transmits an Si BEARER SETUP RESPONSE message to the MME (1*f*-60). The Si bearer is a connection for data transmission set up between the S-GW and the gNB, and corresponds to a DRB in a one-to-one manner. When the process is fully completed, the UE transmits and receives data to and from the gNB and the S-GW (1*f*-65, 1*f*-70).

As described above, the known data transmission process basically includes three operations of an RRC connection configuration, a security configuration, and a DRB configuration. Furthermore, the gNB may transmit an RRCConnectionReconfiguration message (1*f*-75) in order to newly provide a configuration to the UE or to add or change a configuration for a given cause. The message (RRCConnectionReconfiguration message) may configure whether or not to use a packet duplication function for each logical channel (logicalchannelconfig) or for each bearer or for each PDCP entity (PDCP-config). Specifically, the message may designate a primary RLC entity and a secondary RLC entity which are connected to a PDCP entity and may be used for packet duplication. The primary RLC entity or the secondary RLC entity may be indicated as a single RLC entity of a master cell group (MCG) or secondary cell group (SCG) or a logical channel ID. Furthermore, when two RLC entities are configured to be connected to the PDCP entity in the message, the message may configure a threshold that may be used in a split bearer. When the threshold operates as a split bearer, data may be transmitted to only the primary RLC entity when the amount of data to be transmitted is less than the threshold, and data may be transmitted to the primary RLC entity and the secondary RLC entity when the amount of data to be transmitted is greater than the threshold. The configured threshold and the primary RLC entity and the secondary RLC entity activate and use the packet duplication function in dual connectivity. When the packet duplication function is deactivated based on MAC control information, the configured threshold and the primary RLC entity and the secondary RLC entity may be fallen back as a split bearer and may continue to transmit and receive data. Furthermore, when the packet duplication function is configured in the message, the message may configure whether or not to active or deactivate the packet duplication function with respect to a data radio bearer (DRB). Alternatively, when the packet duplication function is configured, the message may designate the packet duplication function to be an activation state or a deactivation state. Specifically, in the case of a signaling radio bearer (SRB) not a data radio bearer, when the packet duplication function is configured, the message may designate the packet duplication function to be always activated. Alternatively, the message may designate the packet duplication function to be always deactivated. Furthermore, when the packet duplication function is configured, the message may designate an initial state as activation or deactivation. Furthermore, when the packet duplication function is configured, the message may designate a default RLC entity to which the PDCP entity will transmit data in the deactivation state. The default RLC entity may be designated as a primary RLC entity or a secondary RLC entity or may be indicated by a logical channel ID. Furthermore, in order to prevent configuration information from being unnecessarily increased in the message, when the packet duplication is configured and becomes the deactivation state, the PDCP entity may always transmit data to the primary RLC entity (convenience of an implementation can be improved because the primary RLC entity is always used in the activation state and the deactivation state). Furthermore, the message may include a logical channel ID to which packet duplication is applied and mapping information of cells to which packet duplication is applied. That is, when the packet duplication is applied, the message may perform a configuration, including mapping information regarding that data corresponding to which logical channel ID will be transmitted to which cells (the logical channel IDs may be configured to transmit data to only the mapped cells). When the packet duplication function is deactivated, the mapping relation of mapping information between the logical channel IDs and the cells configured in the message may be released, and data corresponding to the logical channel ID may be transmitted to a given cell.

Figure 1G:
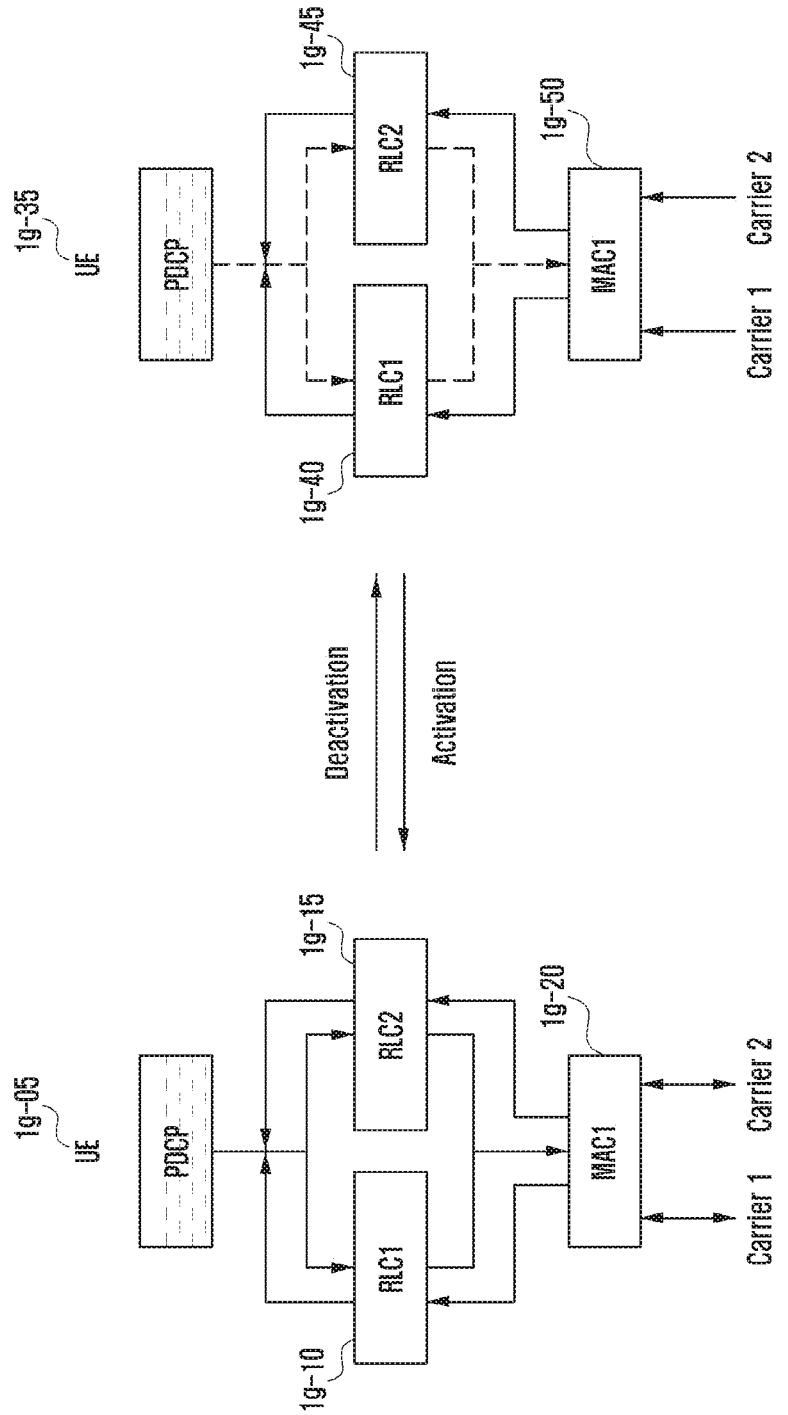
FIG. 1G is a diagram showing a 1-1 embodiment of packet duplication in which the PDCP layer duplicates a packet and transmits the packet based on a carrier aggregation in a next-generation mobile communication system according to an embodiment of the disclosure.

FIG. 1G is a diagram showing a 1-1 embodiment of packet duplication in which the PDCP layer duplicates a packet and transmits the packet based on a carrier aggregation in a next-generation mobile communication system according to an embodiment of the disclosure.

Referring to FIG. 1G, as in FIG. 1F, when an RRC message is received, a UE 1g-05 may configure a bearer (DRB or SRB) based on configuration information received in the message, and may configure a PDCP entity, RLC entity, MAC entity corresponding to each bearer. If packet duplication (PDCP packet duplication) is to be configured based on a carrier aggregation with respect to a bearer or PDCP entity or logical channel, a gNB may configure, in the UE 1g-05, two RLC entities 1g-10 and 1g-15 to be connected to the PDCP entity with respect to the bearer. The two RLC entities may be configured with a primary RLC entity 1g-10 and a secondary RLC entity 1g-15, and may be indicated using a logical channel ID (LCID). As described above, if packet duplication is configured based on a carrier aggregation, an initial state may become an activation state right after the configuration or may immediately become a deactivation state based on the configuration information of the RRC message. If the bearer is an SRB, the initial state may immediately become an activation state. The gNB may indicate whether or not to activate packet duplication with respect to the bearer through a MAC control element. To indicate whether or not to activate or deactivate packet duplication using MAC control information is transmitted from the gNB to the UE 1g-05. Whether or not to activate or deactivate packet duplication is control information on uplink packet duplication. Accordingly, downlink packet duplication may be used or not depending on an implementation of the gNB. Accordingly, when the primary RLC entity 1g-10 and the secondary RLC entity 1g-15 for the packet duplication are configured, the UE 1g-05 may have to always perform a reception operation in the activation state.

The disclosure proposes an operation when the packet duplication function of the PDCP entity is activated more specifically with respect to the 1-1 embodiment.

In packet duplication based on a carrier aggregation of the disclosure, a 1-1a embodiment regarding an activation operation of the packet duplication is described below.

If deactivated uplink packet duplication is activated by receiving an RRC message or MAC control information, the UE 1g-05 starts to apply the packet duplication to data that has not yet been delivered from the PDCP entity to a lower layer when indication indicative of the activation of the uplink packet duplication is received from a higher layer (RRC) or a lower layer (MAC). That is, the UE 1g-05 duplicates and transmits the same data to the primary RLC entity 1g-10 and the secondary RLC entity 1g-15 with respect to the data (PDCP SDU or PDCP PDU) not yet delivered from the PDCP entity to the lower layer. The two RLC entities process the duplicated data in the RLC layer, configure RLC headers, and then deliver them to the MAC entity 1g-20. The MAC entity 1g-20 may perform data processing by placing restriction on the duplicated data received through the primary RLC layer and the secondary RLC layer with different logical channel IDs so that the duplicated data is loaded on different carriers. That is, the MAC entity 1g-20 may perform data processing so that the duplicated data is not included in the MAC PDU of the same carrier and the duplicated data is included in different first and second carriers when a MAC PDU to be transmitted in the first carrier is configured and a MAC PDU to be transmitted in the second carrier is configured. A logical channel ID used to perform the packet duplication may be indicated in the RRC message so that the restriction can be performed. Furthermore, when the MAC entity 1g-20 performs logical channel prioritization (LCP), it may restrict and apply a logical channel ID corresponding to the primary RLC entity 1g-10 and a logical channel ID corresponding to the secondary RLC entity 1g-15. That is, when an LCP procedure for configuring the MAC PDU to be transmitted in the first carrier is performed, the MAC entity 1g-20 may include one of the two IDs for the packet duplication in the LCP procedure, may apply the ID, and may distribute transmission resources. Furthermore, when an LCP procedure for configuring the MAC PDU to be transmitted in the second carrier is performed, the MAC entity 1g-20 may include the other of the two IDs for the packet duplication in the LCP procedure, may apply the ID, and may distribute transmission resources. Mapping information with the logical channel and carrier or cell may be configured as the RRC message. The LCP procedure may include a procedure of selecting logical channels to which a transmission resource will be allocated and a procedure of distributing uplink transmission resources to the selected logical channels. If packet duplication is used, the above procedures may be performed in order to obtain a diversity gain by transmitting data corresponding to different logical channel IDs to which packet duplication has been applied in different carriers. Furthermore, when the PDCP entity duplicates and transmits data to two RLC entities by applying packet duplication, if the two RLC entities operate in the RLC acknowledged mode (AM), the RLC entity may receive an RLC status report for the duplicated and transmitted data, and may notify the PDCP entity that the data has been successfully delivered when the successful reception of the data (RLC PDU or DLC SDU) is identified. For example, mapping information of an RLC sequence number and a PDCP sequence number may be used. The RLC entity may notify the PDCP entity of an RLC sequence number or may notify the PDCP entity of a PDCP sequence number or the successful delivery may indicate confirmation data. When the information is received, the PDCP entity may transmit indication, indicating that data whose successful delivery has been confirmed should be discarded if the data has not yet been transmitted because the data has been successfully delivered to a different RLC entity on which duplication transmission has been performed. When the discard indication is received, the different RLC entity may discard the data if the data (RLC SDU or the RLC PDU) corresponding to the discard indication or some of the data has not yet been transmitted. Mapping information of the RLC sequence number and the PDCP sequence number may be used as the discard indication, for example. The RLC sequence number may be notified or the PDCP sequence number may be notified or the successful delivery may indicate confirmation data (PDCP PDU or RLC SDU or RLC PDU).

In packet duplication based on a carrier aggregation of the disclosure, a 1-1b embodiment regarding an activation operation of the packet duplication is described below.

If deactivated uplink packet duplication is activated by receiving an RRC message or MAC control information, the UE 1g-05 starts to apply the packet duplication to data that has not yet been delivered from the PDCP entity to a lower layer when indication indicative of the activation of the uplink packet duplication is received from a higher layer (RRC) or a lower layer (MAC). In the above description, the PDCP entity may introduce a new states variable in order to clearly indicate data that has not yet been delivered to the lower layer. In order to assign a PDCP sequence number to the data received from the higher layer, the PDCP entity may calculate a PDCP sequence number as a TX_NEXT value for each datum using a states variable called TX_NEXT, may assign the PDCP sequence number, and may increase the PDCP sequence number by 1. The TX_NEXT value is a 32-bit COUNT value, and thus lower bits corresponding to a PDCP sequence number length may be drawn out from the 32-bit COUNT value through modulo operation and may be used as the PDCP sequence number. The COUNT value has a combination of an HFN value and a PDCP sequence number. When indication indicative of the activation of uplink packet duplication is received, the PDCP entity may introduce a new variable called DUP_NEXT, may define the new variable as the PDCP sequence number or COUNT value of the first data not delivered to a lower layer, and may use the new variable. In the above description, when a packet duplication function is configured, the PDCP entity may configure a PDCP sequence number by assigning it to data regardless of activation or deactivation, and may update a value of DUP_NEXT with the PDCP sequence number or a next value of the COUNT value of data to be delivered to a lower layer whenever the data is delivered to the lower layer based on the definition of the DUP_NEXT (In the above description, if a DUP_NEXT variable has been defined as the PDCP sequence number or COUNT value of data finally delivered to the lower layer, the value of DUP_NEXT may be updated with the PDCP sequence number or COUNT value of the data delivered to the lower layer). Furthermore, when the packet duplication is applied, the UE 1g-05 starts to apply the packet duplication to data having a PDCP sequence number corresponding to the DUP_NEXT value (In the above description, if a DUP_NEXT variable has been defined as the PDCP sequence number or COUNT value of data finally delivered to a lower layer, the UE starts to apply the packet duplication to data having a PDCP sequence number corresponding to a DUP_NEXT+1 value), and may duplicate and transmit the data to the primary RLC entity 1g-10 and the secondary RLC entity 1g-15. Furthermore, the UE may increase the DUP_NEXT value by 1 whenever it duplicates and transmits the data to the lower layer, and may continue to apply the packet duplication to data corresponding to DUP_NEXT.

That is, the UE duplicates and transmits the same data to the primary RLC entity 1g-10 and the secondary RLC entity 1g-15 with respect to the data (PDCP SDU or PDCP PDU) not yet delivered from the PDCP entity to the lower layer. The two RLC entities process the duplicated data in the RLC layers, configure RLC headers, and then deliver them to the MAC entity 1g-20. The MAC entity 1g-20 may perform data processing by placing restriction on the duplicated data received through the primary RLC layer and the secondary RLC layer with different logical channel IDs so that the duplicated data is loaded on different carriers. That is, the MAC entity 1g-20 may perform data processing so that the duplicated data is not included in the MAC PDU of the same carrier and the duplicated data is included in different first and second carriers when a MAC PDU to be transmitted in the first carrier is configured and a MAC PDU to be transmitted in the second carrier is configured. A logical channel ID used to perform the packet duplication may be indicated in the RRC message so that the restriction can be performed. Furthermore, when the MAC entity 1g-20 performs logical channel prioritization (LCP), it may restrict and apply a logical channel ID corresponding to the primary RLC entity 1g-10 and a logical channel ID corresponding to the secondary RLC entity 1g-15. That is, when an LCP procedure for configuring the MAC PDU to be transmitted in the first carrier is performed, the MAC entity 1g-20 may include one of the two IDs for the packet duplication in the LCP procedure, may apply the ID, and may distribute transmission resources. Furthermore, when an LCP procedure for configuring the MAC PDU to be transmitted in the second carrier is performed, the MAC entity 1g-20 may include the other of the two IDs for the packet duplication in the LCP procedure, may apply the ID, and may distribute transmission resources. Mapping information with the logical channel and carrier or cell may be configured as the RRC message. The LCP procedure may include a procedure of selecting logical channels to which a transmission resource will be allocated and a procedure of distributing uplink transmission resources to the selected logical channels. If packet duplication is used, the above procedures may be performed in order to obtain a diversity gain by transmitting data corresponding to different logical channel IDs to which packet duplication has been applied in different carriers. Furthermore, when the PDCP entity duplicates and transmits data to two RLC entities by applying packet duplication, if the two RLC entities operate in the RLC acknowledged mode (AM), the RLC entity may receive an RLC status report for the duplicated and transmitted data, and may notify the PDCP entity that the data has been successfully delivered when the successful reception of the data (RLC PDU or DLC SDU) is identified. For example, mapping information of an RLC sequence number and a PDCP sequence number may be used. The RLC entity may notify the PDCP entity of an RLC sequence number or may notify the PDCP entity of a PDCP sequence number or the successful delivery may indicate confirmation data. When the information is received, the PDCP entity may transmit indication, indicating that data whose successful delivery has been confirmed should be discarded if the data has not yet been transmitted because the data has been successfully delivered to a different RLC entity on which duplication transmission has been performed. When the discard indication is received, the different RLC entity may discard the data if the data (RLC SDU or the RLC PDU) corresponding to the discard indication or some of the data has not yet been transmitted. Mapping information of the RLC sequence number and the PDCP sequence number may be used as the discard indication, for example. The RLC sequence number may be notified or the PDCP sequence number may be notified or the successful delivery may indicate confirmation data (PDCP PDU or RLC SDU or RLC PDU).

In packet duplication based on a carrier aggregation of the disclosure, a 1-1c embodiment regarding an activation operation of the packet duplication is described below.

If deactivated uplink packet duplication is activated by receiving an RRC message or MAC control information, the UE 1g-05 starts to apply the packet duplication to data that has not yet been delivered from the PDCP entity to a lower layer when indication indicative of the activation of the uplink packet duplication is received from a higher layer (RRC) or a lower layer (MAC). In the above description, the PDCP entity may introduce a new states variable in order to clearly indicate data that has not yet been delivered to the lower layer. In order to assign a PDCP sequence number to the data received from the higher layer, the PDCP entity may calculate a PDCP sequence number as a TX_NEXT value for each datum using a states variable called TX_NEXT, may assign the PDCP sequence number, and may increase the PDCP sequence number by 1. The TX_NEXT value is a 32-bit COUNT value, and thus lower bits corresponding to a PDCP sequence number length may be drawn out from the 32-bit COUNT value through modulo operation and may be used as the PDCP sequence number. The COUNT value has a combination of an HFN value and a PDCP sequence number. When indication indicative of the activation of uplink packet duplication is received, the PDCP entity may introduce a new variable called DUP_NEXT, may define the new variable as the PDCP sequence number or COUNT value of the first data not delivered to a lower layer, and may use the new variable. In the above description, when the packet duplication is applied, the PDCP entity may update a DUP_NEXT value with a TX_NEXT value or a value of TX_NEXT−1, may start to apply the packet duplication to data having a PDCP sequence number corresponding to DUP_NEXT, and may duplicate and transmit the data to the primary RLC entity 1g-10 and the secondary RLC entity 1g-15. Furthermore, the PDCP entity may increase may increase the DUP_NEXT value by 1 whenever it duplicates and transmits the data to the lower layer, and may continue to apply the packet duplication to data corresponding to DUP_NEXT.

That is, the UE duplicates and transmits the same data to the primary RLC entity 1g-10 and the secondary RLC entity 1g-15 with respect to the data (PDCP SDU or PDCP PDU) not yet delivered from the PDCP entity to the lower layer. The two RLC entities process the duplicated data in the RLC layers, configure RLC headers, and then deliver them to the MAC entity 1g-20. The MAC entity 1g-20 may perform data processing by placing restriction on the duplicated data received through the primary RLC layer and the secondary RLC layer with different logical channel IDs so that the duplicated data is loaded on different carriers. That is, the MAC entity 1g-20 may perform data processing so that the duplicated data is not included in the MAC PDU of the same carrier and the duplicated data is included in different first and second carriers when a MAC PDU to be transmitted in the first carrier is configured and a MAC PDU to be transmitted in the second carrier is configured. A logical channel ID used to perform the packet duplication may be indicated in the RRC message so that the restriction can be performed. Furthermore, when the MAC entity 1g-20 performs logical channel prioritization (LCP), it may restrict and apply a logical channel ID corresponding to the primary RLC entity 1g-10 and a logical channel ID corresponding to the secondary RLC entity 1g-15. That is, when an LCP procedure for configuring the MAC PDU to be transmitted in the first carrier is performed, the MAC entity 1g-20 may include one of the two IDs for the packet duplication in the LCP procedure, may apply the ID, and may distribute transmission resources. Furthermore, when an LCP procedure for configuring the MAC PDU to be transmitted in the second carrier is performed, the MAC entity 1g-20 may include the other of the two IDs for the packet duplication in the LCP procedure, may apply the ID, and may distribute transmission resources. Mapping information with the logical channel and carrier or cell may be configured as the RRC message. The LCP procedure may include a procedure of selecting logical channels to which a transmission resource will be allocated and a procedure of distributing uplink transmission resources to the selected logical channels. If packet duplication is used, the above procedures may be performed in order to obtain a diversity gain by transmitting data corresponding to different logical channel IDs to which packet duplication has been applied in different carriers. Furthermore, when the PDCP entity duplicates and transmits data to two RLC entities by applying packet duplication, if the two RLC entities operate in the RLC acknowledged mode (AM), the RLC entity may receive an RLC status report for the duplicated and transmitted data, and may notify the PDCP entity that the data has been successfully delivered when the successful reception of the data (RLC PDU or DLC SDU) is identified. For example, mapping information of an RLC sequence number and a PDCP sequence number may be used. The RLC entity may notify the PDCP entity of an RLC sequence number or may notify the PDCP entity of a PDCP sequence number or the successful delivery may indicate confirmation data. When the information is received, the PDCP entity may transmit indication, indicating that data whose successful delivery has been confirmed should be discarded if the data has not yet been transmitted because the data has been successfully delivered to a different RLC entity on which duplication transmission has been performed. When the discard indication is received, the different RLC entity may discard the data if the data (RLC SDU or the RLC PDU) corresponding to the discard indication or some of the data has not yet been transmitted. Mapping information of the RLC sequence number and the PDCP sequence number may be used as the discard indication, for example. The RLC sequence number may be notified or the PDCP sequence number may be notified or the successful delivery may indicate confirmation data (PDCP PDU or RLC SDU or RLC PDU).

The disclosure proposes an operation when the packet duplication function of the PDCP entity is deactivated more specifically with respect to the 1-1 embodiment.

In packet duplication based on a carrier aggregation, a 1-1d embodiment regarding the deactivation operation of the packet duplication of the disclosure is described below.

If activated uplink packet duplication is deactivated by receiving an RRC message or MAC control information, a UE 1g-35 no longer applies packet duplication to data that has not yet been delivered from the PDCP entity to a lower layer when indication indicative of the deactivation of the uplink packet duplication is received from a higher layer (RRC) or a lower layer (MAC). Furthermore, the UE may deliver data that has not yet been delivered to only a primary RLC entity 1g-40 or a secondary RLC entity 1g-45 indicated by an eNB. Alternatively, when the packet duplication is deactivated, the PDCP entity may always deliver data to the primary RLC entity 1g-40.

When a bearer or logical channel ID for which packet duplication needs to be deactivated is indicated by the MAC control information, the UE 1g-35 may no longer apply packet duplication, and may perform RLC entity-re-establishment on an RLC entity (e.g., secondary RLC entity 1g-45) that needs to be deactivated. That is, when the RLC entity operates in an unacknowledged mode (UM) or acknowledged mode (AM), both the transmission RLC entity and reception RLC entity of the RLC entity discard all data that has not yet been transmitted so far or data (RLC SDUs or RLC SDU segments or RLC PDUs) remaining in the buffer, stop and reset all the timers, and reset all the state variables as initial values. The RLC entity-re-establishment may be identically applied to the deactivated RLC entity of an eNB.

In the above description, although the uplink packet duplication has been deactivated, the deactivated RLC entity (e.g., secondary RLC entity) may continue to receive downlink data. Furthermore, the PDCP entity may continue to receive downlink data although the packet duplication is deactivated. That is, MAC control information indicative of the deactivation of the uplink packet duplication is to deactivate the uplink packet duplication, and the downlink packet duplication may continue to be used depending on an implementation of an eNB. Accordingly, regarding a deactivated RLC entity of the UE 1g-35, the transmission RLC entity is deactivated, but the reception RLC entity may continue to receive and process data based on the RLC AM or the UM or the TM mode while driving state variables and a window and timer, and may deliver the data to a higher layer (PDCP). If the reception of downlink data is not deactivated as described above, the data transfer rate of an eNB can be enhanced and the flexibility of an eNB implementation can be improved. That is, although the MAC entity 1g-50 of the UE 1g-35 receives MAC control information to deactivate packet duplication with respect to any bearer or logical channel, it does not discard data corresponding to a deactivated logical channel ID or bearer received in downlink because the MAC control information is deactivation regarding uplink data transmission, may process data, and may deliver the data to an RLC entity corresponding to the logical channel ID or bearer. Furthermore, the RLC entity may process the data and deliver the data to the PDCP entity. The PDCP entity may receive the data, may process the data, and may deliver the data to a higher layer.

Furthermore, in the above description, although the UE 1g-35 does not receive direct indication indicative of the deactivation of packet duplication by receiving an RRC message or MAC control information, as in FIG. 1F, the UE may perform implicit deactivation using mapped information configured between bearers or logical channel IDs and cells (carriers) using packet duplication in the RRC message. That is, if all cells (SCell) mapped to bearers or logical channel IDs using packet duplication have been released or deactivated, the UE 1g-35 may implicitly deactivate packet duplication with respect to a (mapped) bearer or logical channel ID corresponding to the released or deactivated cells although direct deactivation indication, such as the RRC message or MAC control information, is not present. Unnecessary signaling overhead between an eNB and a UE can be reduced by applying such implicit deactivation. Such implicit deactivation may be applied as implicit activation. That is, when cells mapped to a bearer or logical channel ID of packet duplication are activated, packet duplication may be activated.

The disclosure proposes an operation when the packet duplication function of the PDCP entity is deactivated more specifically with respect to the 1-1 embodiment.

In packet duplication based on a carrier aggregation of the disclosure, a 1-1e embodiment regarding the deactivation operation of the packet duplication is described below.

If activated uplink packet duplication is deactivated by receiving an RRC message or MAC control information, a UE 1g-35 no longer applies packet duplication to data that has not yet been delivered from the PDCP entity to a lower layer when indication indicative of the deactivation of the uplink packet duplication is received from a higher layer (RRC) or a lower layer (MAC). Furthermore, the UE may deliver data that has not yet been delivered to only the primary RLC entity 1g-40 or the secondary RLC entity 1g-45 indicated by an eNB. Alternatively, when the packet duplication is deactivated, the PDCP entity may always deliver data to the primary RLC entity 1g-40.

When a bearer or logical channel ID for which packet duplication needs to be deactivated is indicated by the MAC control information, the UE 1g-35 may no longer apply packet duplication, and may perform RLC entity partial re-establishment on an RLC entity (e.g., secondary RLC entity 1g-45) that needs to be deactivated. The RLC entity partial re-establishment means that when the RLC entity operates in an unacknowledged mode (UM) or acknowledged mode (AM), the transmission RLC entity of the RLC entity of the UE 1g-35 discards all data that has not yet been transmitted so far or data (RLC SDUs or RLC SDU segments or RLC PDUs) remaining in the buffer, stops and resets all the timers, and resets all the state variables as initial values. In contrast, the reception RLC entity of the RLC entity of the UE 1g-35 may maintain window state variables and timers without any change, may continue to process received data, and may deliver it to a higher layer. Accordingly, the disconnection of data reception in the UE 1g-35 can be prevented and a data reception rate can be enhanced because one of the two RLC entities for uplink packet duplication is deactivated, but data reception through the downlink may continue through the two RLC entities. The procedure may be identically applied to the deactivated RLC entity of an eNB. That is, the reception RLC entity of the deactivated RLC entity of an eNB discards all data (RLC SDUs or RLC SDU segments or RLC PDUs) remaining in the buffer, stops and resets all the timers, and resets all the state variables as initial values. However, the transmission RLC entity of the RLC entity of the eNB may maintain window state variables and timers without any change, may continue to process data to be transmitted, and may deliver the data to a lower layer.

In the above description, although the uplink packet duplication has been deactivated, the deactivated RLC entity (e.g., secondary RLC entity) may continue to receive downlink data. Furthermore, the PDCP entity may continue to receive downlink data although the packet duplication is deactivated. That is, MAC control information indicative of the deactivation of the uplink packet duplication is to deactivate the uplink packet duplication, and the downlink packet duplication may continue to be used depending on an implementation of an eNB. Accordingly, the transmission RLC entity of the deactivated RLC entity of the UE 1g-35 needs to be deactivated, but the reception RLC entity thereof may continue to receive and process data based on the RLC AM or the UM or the TM mode while driving state variables and a window and timer, and may deliver the data to a higher layer (PDCP). If the reception of downlink data is not deactivated as described above, the data transfer rate of an eNB can be enhanced and the flexibility of an eNB implementation can be improved. That is, although the MAC entity 1g-50 of the UE 1g-35 receives MAC control information to deactivate packet duplication with respect to any bearer or logical channel, it does not discard data corresponding to a deactivated logical channel ID or bearer received in downlink because the MAC control information is deactivation regarding uplink data transmission, may process data, and may deliver the data to an RLC entity corresponding to the logical channel ID or bearer. Furthermore, the RLC entity may process the data and deliver the data to the PDCP entity. The PDCP entity may receive the data, may process the data, and may deliver the data to a higher layer.

Furthermore, in the above description, although the UE 1g-35 does not receive direct indication indicative of the deactivation of packet duplication by receiving an RRC message or MAC control information, as in FIG. 1F, the UE may perform implicit deactivation using mapped information configured between bearers or logical channel IDs and cells (carriers) using packet duplication in the RRC message. That is, if all cells (SCell) mapped to bearers or logical channel IDs using packet duplication have been released or deactivated, the UE 1g-35 may implicitly deactivate packet duplication with respect to a (mapped) bearer or logical channel ID corresponding to the released or deactivated cells although direct deactivation indication, such as the RRC message or MAC control information, is not present. Unnecessary signaling overhead between an eNB and a UE can be reduced by applying such implicit deactivation. Such implicit deactivation may be applied as implicit activation. That is, when cells mapped to a bearer or logical channel ID of packet duplication are activated, packet duplication may be activated.

The disclosure proposes an operation when the packet duplication function of the PDCP entity is deactivated more specifically with respect to the 1-1 embodiment.

In packet duplication based on a carrier aggregation of the disclosure, a 1-1f embodiment regarding the deactivation operation of the packet duplication is described below.

If activated uplink packet duplication is deactivated by receiving an RRC message or MAC control information, the UE 1g-35 no longer applies packet duplication to data that has not yet been delivered from the PDCP entity to a lower layer when indication indicative of the deactivation of the uplink packet duplication is received from a higher layer (RRC) or a lower layer (MAC). Furthermore, the UE may deliver data that has not yet been delivered to only the primary RLC entity 1g-40 or the secondary RLC entity 1g-45 indicated by an eNB. Alternatively, when packet duplication is deactivated, the PDCP entity may always deliver data to the primary RLC entity 1g-40).

If a bearer or logical channel ID for which packet duplication needs to be deactivated is indicated by the MAC control information, the PDCP entity of the UE 1g-35 may no longer apply packet duplication, and may perform indication, indicating that data (e.g., RLC SDU or the RLC PDU that has not yet been transmitted) should be discarded, on an RLC entity (e.g., secondary RLC entity) that needs to be deactivated. If the RLC entity operates in the acknowledged mode (AM), the transmission RLC entity of the RLC entity of the UE 1g-35 discards all data (RLC SDUs or RLC SDU segments or RLC PDUs) that has not yet been transmitted so far when indication indicating that data should be discarded is received from the PDCP layer or when deactivation is indicated, and may continue to perform retransmission on already transmitted data until successful delivery is confirmed because the RLC entity operates in the AM. In contrast, the reception RLC entity of the RLC entity of the UE 1g-35 may maintain window state variables and timers without any change, may continue to process received data, and may deliver the data to a higher layer. If the RLC entity operates in an unacknowledged mode (UM), the transmission RLC entity of the RLC entity of the UE 1g-35 may discard all data that has not yet been transmitted so far or data (RLC SDUs or RLC SDU segments or RLC PDUs) remaining in the buffer when indication indicating that data should be discarded is received from the PDCP layer or when deactivation is indicated. In contrast, the reception RLC entity of the RLC entity of the UE 1g-35 may maintain window state variables and timers without any change, may continue to process received data, and may deliver the data to a higher layer. Accordingly, the disconnection of data reception in the UE 1g-35 can be prevented and a data reception rate can be enhanced because one of the two RLC entities for uplink packet duplication is deactivated, but data reception through the downlink continues through the two RLC entities. The procedure may be identically applied to the deactivated RLC entity of an eNB. That is, the reception RLC entity of the deactivated RLC entity of the eNB may continue to perform reassembly on data (RLC SDUs or RLC SDU segments or RLC PDUs) remaining in the buffer, and may request retransmission by transmitting an RLC status report with respect to lost data. However, the transmission RLC entity of the RLC entity of the eNB may maintain window state variables and timers without any change, may continue to process data to be transmitted, and may deliver the data to a lower layer.

In the above description, although the uplink packet duplication has been deactivated, the deactivated RLC entity (e.g., secondary RLC entity) may continue to receive downlink data. Furthermore, the PDCP entity may continue to receive downlink data although the packet duplication is deactivated. That is, MAC control information indicative of the deactivation of the uplink packet duplication is to deactivate the uplink packet duplication, and the downlink packet duplication may continue to be used depending on an implementation of an eNB. Accordingly, the transmission RLC entity of the deactivated RLC entity of the UE 1g-35 needs to be deactivated, but the reception RLC entity thereof may continue to receive and process data based on the RLC AM or the UM or the TM mode while driving state variables and a window and timer, and may deliver the data to a higher layer (PDCP). If the reception of downlink data is not deactivated as described above, the data transfer rate of an eNB can be enhanced and the flexibility of an eNB implementation can be improved. That is, although the MAC entity 1g-50 of the UE 1g-35 receives MAC control information to deactivate packet duplication with respect to any bearer or logical channel, it does not discard data corresponding to a deactivated logical channel ID or bearer received in downlink because the MAC control information is deactivation regarding uplink data transmission, may process data, and may deliver the data to an RLC entity corresponding to the logical channel ID or bearer. Furthermore, the RLC entity may process the data and deliver the data to the PDCP entity. The PDCP entity may receive the data, may process the data, and may deliver the data to a higher layer.

Furthermore, in the above description, although the UE 1g-35 does not receive direct indication indicative of the deactivation of packet duplication by receiving an RRC message or MAC control information, as in FIG. 1F, the UE may perform implicit deactivation using mapped information configured between bearers or logical channel IDs and cells (carriers) using packet duplication in the RRC message. That is, if all cells (SCell) mapped to bearers or logical channel IDs using packet duplication have been released or deactivated, the UE 1g-35 may implicitly deactivate packet duplication with respect to a (mapped) bearer or logical channel ID corresponding to the released or deactivated cells although direct deactivation indication, such as the RRC message or MAC control information, is not present. Unnecessary signaling overhead between an eNB and a UE can be reduced by applying such implicit deactivation. Such implicit deactivation may be applied as implicit activation. That is, when cells mapped to a bearer or logical channel ID of packet duplication are activated, packet duplication may be activated.

The disclosure proposes an operation when the packet duplication function of the PDCP entity is deactivated more specifically with respect to the 1-1 embodiment.

In packet duplication based on a carrier aggregation of the disclosure, a 1-1g embodiment regarding the deactivation operation of the packet duplication is described below.

If activated uplink packet duplication is deactivated by receiving an RRC message or MAC control information, the UE 1g-35 no longer applies packet duplication to data that has not yet been delivered from the PDCP entity to a lower layer when indication indicative of the deactivation of the uplink packet duplication is received from a higher layer (RRC) or a lower layer (MAC). Furthermore, the UE may deliver data that has not yet been delivered to only the primary RLC entity 1g-40 or the secondary RLC entity 1g-45 indicated by an eNB. Alternatively, when packet duplication is deactivated, the PDCP entity may always deliver data to the primary RLC entity 1g-40).

If a bearer or logical channel ID for which packet duplication needs to be deactivated is indicated by the MAC control information, the PDCP entity of the UE 1g-35 may no longer apply packet duplication, may notify an RLC entity (e.g., secondary RLC entity) that needs to be deactivated of the deactivation, and may no longer deliver data. If the RLC entity operates in the acknowledged mode (AM), the transmission RLC entity of the RLC entity of the UE 1g-35 continues to transmit all data (RLC SDUs or RLC SDU segments or RLC PDUs) that has not yet been transmitted so far when the deactivation is indicated from the PDCP layer, and may continue to perform retransmission on already transmitted data until successful delivery is confirmed because the RLC entity operates in the AM. Furthermore, the reception RLC entity of the RLC entity of the UE 1g-35 may maintain window state variables and timers without any change, may continue to process received data, and may deliver the data to a higher layer. If the RLC entity operates in an unacknowledged mode (UM), the transmission RLC entity of the RLC entity of the UE 1g-35 may perform transmission on all data that has not yet been transmitted so far or data (RLC SDUs or RLC SDU segments or RLC PDUs) remaining in the buffer when the deactivation is received from the PDCP layer. Furthermore, the reception RLC entity of the RLC entity of the UE 1g-35 may maintain window state variables and timers without any change, may continue to process received data, and may deliver the data to a higher layer. Accordingly, the disconnection of data reception in the UE 1g-35 can be prevented and a data reception rate can be enhanced because one of the two RLC entities for uplink packet duplication is deactivated, but data reception through the downlink continues through the two RLC entities. The procedure may be identically applied to the deactivated RLC entity of an eNB. That is, the reception RLC entity of the deactivated RLC entity of the eNB may continue to perform reassembly on data (RLC SDUs or RLC SDU segments or RLC PDUs) remaining in the buffer, and may request retransmission by transmitting an RLC status report with respect to lost data. However, the transmission RLC entity of the RLC entity of the eNB may maintain window state variables and timers without any change, may continue to process data to be transmitted, and may deliver the data to a lower layer.

In the above description, although the uplink packet duplication has been deactivated, the deactivated RLC entity (e.g., secondary RLC entity) may continue to receive downlink data. Furthermore, the PDCP entity may continue to receive downlink data although the packet duplication is deactivated. That is, MAC control information indicative of the deactivation of the uplink packet duplication is to deactivate the uplink packet duplication, and the downlink packet duplication may continue to be used depending on an implementation of an eNB. Accordingly, the transmission RLC entity of the deactivated RLC entity of the UE 1g-35 needs to be deactivated, but the reception RLC entity thereof may continue to receive and process data based on the RLC AM or the UM or the TM mode while driving state variables and a window and timer, and may deliver the data to a higher layer (PDCP). If the reception of downlink data is not deactivated as described above, the data transfer rate of an eNB can be enhanced and the flexibility of an eNB implementation can be improved. That is, although the MAC entity 1g-50 of the UE 1g-35 receives MAC control information to deactivate packet duplication with respect to any bearer or logical channel, it does not discard data corresponding to a deactivated logical channel ID or bearer received in downlink because the MAC control information is deactivation regarding uplink data transmission, may process data, and may deliver the data to an RLC entity corresponding to the logical channel ID or bearer. Furthermore, the RLC entity may process the data and deliver the data to the PDCP entity. The PDCP entity may receive the data, may process the data, and may deliver the data to a higher layer.

Furthermore, in the above description, although the UE 1g-35 does not receive direct indication indicative of the deactivation of packet duplication by receiving an RRC message or MAC control information, as in FIG. 1F, the UE may perform implicit deactivation using mapped information configured between bearers or logical channel IDs and cells (carriers) using packet duplication in the RRC message. That is, if all cells (SCell) mapped to bearers or logical channel IDs using packet duplication have been released or deactivated, the UE 1g-35 may implicitly deactivate packet duplication with respect to a (mapped) bearer or logical channel ID corresponding to the released or deactivated cells although direct deactivation indication, such as the RRC message or MAC control information, is not present. Unnecessary signaling overhead between an eNB and a UE can be reduced by applying such implicit deactivation. Such implicit deactivation may be applied as implicit activation. That is, when cells mapped to a bearer or logical channel ID of packet duplication are activated, packet duplication may be activated.

In the above description of the disclosure, if the packet duplication is deactivated and the deactivated RLC entity no longer transmits data, an LCP procedure is not applied to a logical channel ID corresponding to the deactivated RLC entity. More specifically, a transmission resource is not allocated to the logical channel ID, the logical channel ID is not selected when an LCP procedure is performed, and a token value (prioritized bit rate (PBR)) that is updated and increased at a given interval in an LCP procedure may not be updated (or may be reset or initialized).

Furthermore, if packet duplication is deactivated and a deactivated RLC entity no longer transmits data, the RLC layer may transmit indication, indicating that data is no longer transmitted, to a lower MAC layer so that an LCP procedure is not applied to a logical channel ID corresponding to the deactivated RLC entity.

Packet duplication based on a carrier aggregation of the disclosure has objects of improving reliability and reducing transmission latency by duplicating the original packet. However, a gNB may configure a PDCP entity, primary RLC entity and secondary RLC entity for configuring the packet duplication based on a carrier aggregation in a UE, and may perform a configuration and implementation so that different data not duplicated data is transmitted to the primary RLC entity and the secondary RLC entity in order to enhance a data transmission rate of service corresponding to a given bearer or logical channel.

Figure 1H:
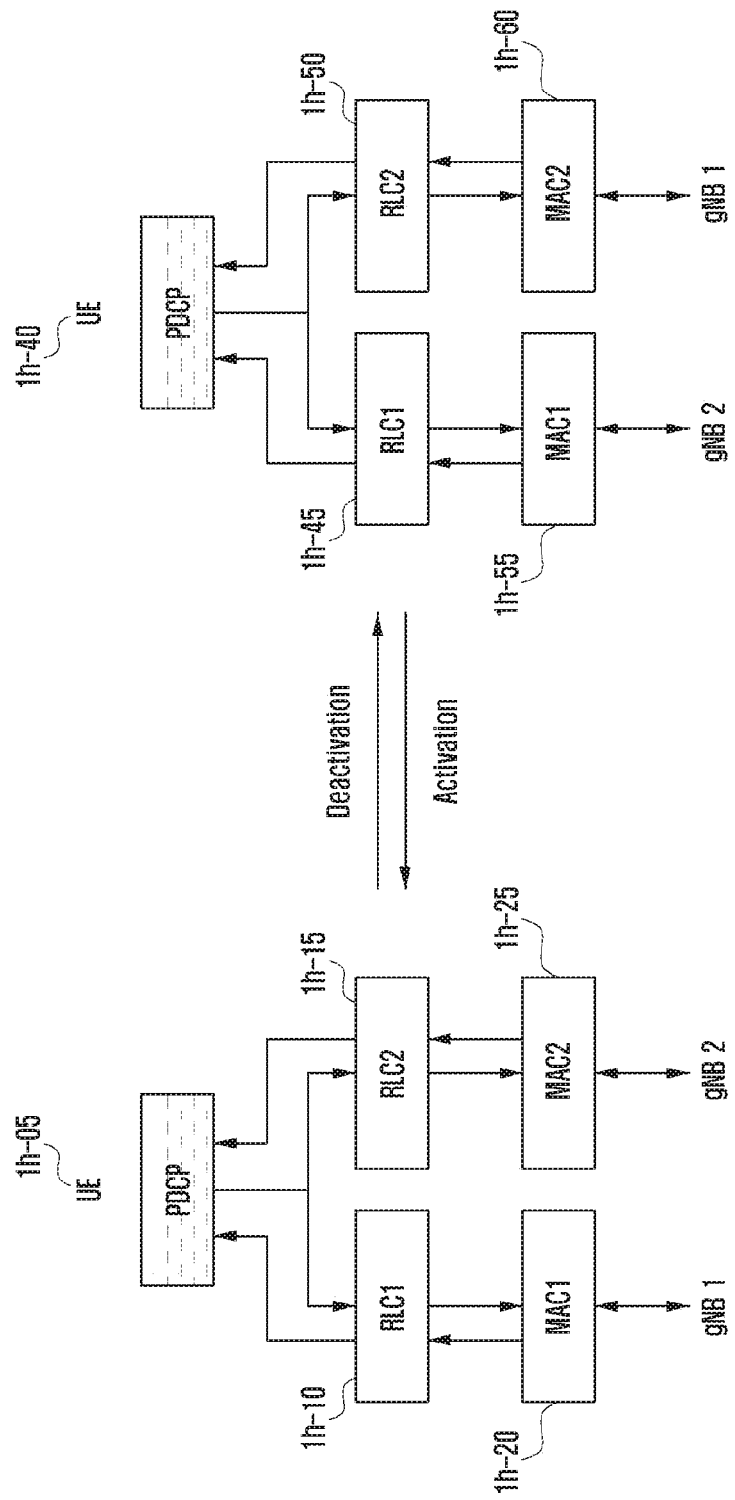
FIG. 1H is a diagram showing a 1-2 embodiment of packet duplication in which the PDCP layer duplicates and transmits a packet based on dual connectivity (DC) in a next-generation mobile communication system according to an embodiment of the disclosure.

FIG. 1H is a diagram showing a 1-2 embodiment of packet duplication in which the PDCP layer duplicates and transmits a packet based on dual connectivity in a next-generation mobile communication system according to an embodiment of the disclosure.

Referring to FIG. 1H, as in FIG. 1F, when an RRC message is received, the UE 1h-05 may configure a bearer (DRB or SRB) based on configuration information received in the message, and may configure a PDCP entity, RLC entities and MAC entities corresponding to each bearer. If packet duplication (PDCP packet duplication) is to be configured based on dual connectivity with respect to a bearer or PDCP entity or logical channel, a gNB may configure, in the UE, two RLC entities 1h-10 and 1h-15 to be connected to the PDCP entity with respect to the bearer. The two RLC entities may be configured with a primary RLC entity 1h-10 and a secondary RLC entity 1h-15, and may be indicated using a logical channel ID (LCID) and a cell group ID. If packet duplication is configured based on dual connectivity as described above, an initial state may become an activation state right after the configuration or may immediately become a deactivation state based on the configuration information of the RRC message. If the bearer is an SRB, the initial state may immediately become an activation state. The gNB may indicate whether or not to activate or deactivate packet duplication for the bearer using a MAC control element. To indicate whether or not to activate or deactivate packet duplication using MAC control information is transmitted from the eNB to the UE. Whether or not to activate or deactivate packet duplication is control information on uplink packet duplication. In the above description, the eNB may transmit MAC control information, indicating whether or not to activate or deactivate uplink packet duplication, to MAC entities 1h-20 and 1h-55 corresponding to a master cell group or MAC entities 1h-55 and 1h-60 corresponding to a secondary cell group. Alternatively, the MAC control information may always be transmitted to the MAC entities corresponding to a master cell group because the master cell group is always activated, convenience of an implementation. Unlike in the uplink packet duplication, downlink packet duplication may be used or not depending on an implementation of the eNB. Accordingly, the UE may need to always perform a reception operation in the activation state when the primary RLC entity and secondary RLC entity for packet duplication are configured.

The disclosure proposes an operation when the packet duplication function of the PDCP entity is activated more specifically with respect to the 1-2 embodiment when.

In packet duplication based on dual connectivity of the disclosure, a 1-2a embodiment regarding an activation operation of the packet duplication is described below.

If deactivated uplink packet duplication is activated by receiving an RRC message or MAC control information, the UE starts to apply the packet duplication to data that has not yet been delivered from the PDCP entity to a lower layer when indication indicative of the activation of the uplink packet duplication is received from a higher layer (RRC) or a lower layer (MAC). That is, the UE 1h-05 duplicates and transmits the same data to the primary RLC entity 1h-10 and the secondary RLC entity 1h-15 with respect to the data (PDCP SDU or PDCP PDU) not yet delivered from the PDCP entity to the lower layer. The two RLC entities process the duplicated data in the RLC layer, configure RLC headers, and then deliver them to the respective MAC entities 1h-20 and 1h-25. Each of the MAC entities 1h-20 and 1h-25 may perform data processing by placing restriction on the duplicated data received through the primary RLC layer (or secondary RLC layer) having a logical channel ID so that the data is loaded on a carrier mapped to the logical channel ID. That is, each MAC entity may perform the restriction so that the duplicated data is transmitted in the mapped carrier when a MAC PDU to be transmitted in a first carrier is configured and a MAC PDU to be transmitted in a second carrier is configured. A logical channel ID used to perform the packet duplication may be indicated in the RRC message. Furthermore, when each MAC entity performs logical channel prioritization (LCP), it may restrict and apply a logical channel ID corresponding to the primary RLC entity 1h-10 and a logical channel ID corresponding to the secondary RLC entity 1h-15. That is, when an LCP procedure for configuring the MAC PDU to be transmitted in the first carrier is performed, each MAC entity may include one ID for the packet duplication mapped to the carrier in the LCP procedure, may apply the ID, and may distribute transmission resources. Furthermore, when an LCP procedure for configuring the MAC PDU to be transmitted in the second carrier is performed, the MAC entity 1h-20 may include the other of the two IDs for the packet duplication in the LCP procedure, may apply the ID, and may distribute transmission resources. Mapping information with the logical channel and carrier or cell may be configured as the RRC message. The LCP procedure may include a procedure of selecting logical channels to which a transmission resource will be allocated and a procedure of distributing uplink transmission resources to the selected logical channels. If packet duplication is used, a diversity gain may be obtained by transmitting data, corresponding to different logical channel IDs to which packet duplication has been applied, to different gNBs. Furthermore, when the PDCP entity duplicates and transmits data to two RLC entities by applying packet duplication, if the two RLC entities operate in the RLC acknowledged mode (AM), the RLC entity may receive an RLC status report for the duplicated and transmitted data, and may notify the PDCP entity that the data has been successfully delivered when the successful reception of the data (RLC PDU or DLC SDU) is identified. For example, mapping information of an RLC sequence number and a PDCP sequence number may be used. The RLC entity may notify the PDCP entity of an RLC sequence number or may notify the PDCP entity of a PDCP sequence number or the successful delivery may indicate confirmation data. When the information is received, the PDCP entity may transmit indication, indicating that data whose successful delivery has been confirmed should be discarded if the data has not yet been transmitted because the data has been successfully delivered to a different RLC entity on which duplication transmission has been performed. When the discard indication is received, the different RLC entity may discard the data if the data (RLC SDU or the RLC PDU) corresponding to the discard indication or some of the data has not yet been transmitted. Mapping information of the RLC sequence number and the PDCP sequence number may be used as the discard indication, for example. The RLC sequence number may be notified or the PDCP sequence number may be notified or the successful delivery may indicate confirmation data (PDCP PDU or RLC SDU or RLC PDU).

In packet duplication based on dual connectivity of the disclosure, a 1-2b embodiment regarding an activation operation of the packet duplication is described below.

If deactivated uplink packet duplication is activated by receiving an RRC message or MAC control information, the UE starts to apply the packet duplication to data that has not yet been delivered from the PDCP entity to a lower layer when indication indicative of the activation of the uplink packet duplication is received from a higher layer (RRC) or a lower layer (MAC). In the above description, the PDCP entity may introduce a new states variable in order to clearly indicate data that has not yet been delivered to the lower layer. In order to assign a PDCP sequence number to the data received from the higher layer, the PDCP entity may calculate a PDCP sequence number as a TX_NEXT value for each datum using a states variable called TX_NEXT, may assign the PDCP sequence number, and may increase the PDCP sequence number by 1. The TX_NEXT value is a 32-bit COUNT value, and thus lower bits corresponding to a PDCP sequence number length may be drawn out from the 32-bit COUNT value through modulo operation and may be used as the PDCP sequence number. The COUNT value has a combination of an HFN value and a PDCP sequence number. When indication indicative of the activation of uplink packet duplication is received, the PDCP entity may introduce a new variable called DUP_NEXT, may define the new variable as the PDCP sequence number or COUNT value of the first data not delivered to a lower layer, and may use the new variable. In the above description, when a packet duplication function is configured, the PDCP entity may configure a PDCP sequence number by assigning it to data regardless of activation or deactivation, and may update a value of DUP_NEXT with the PDCP sequence number or a next value of the COUNT value of data to be delivered to a lower layer whenever the data is delivered to the lower layer based on the definition of the DUP_NEXT (In the above description, if a DUP_NEXT variable has been defined as the PDCP sequence number or COUNT value of data finally delivered to the lower layer, the value of DUP_NEXT may be updated with the PDCP sequence number or COUNT value of the data delivered to the lower layer). Furthermore, when the packet duplication is applied, the UE starts to apply the packet duplication to data having a PDCP sequence number corresponding to the DUP_NEXT value (In the above description, if a DUP_NEXT variable has been defined as the PDCP sequence number or COUNT value of data finally delivered to a lower layer, the UE starts to apply the packet duplication to data having a PDCP sequence number corresponding to a DUP_NEXT+1 value), and may duplicate and transmit the data to the primary RLC entity 1h-10 and the secondary RLC entity 1h-15. Furthermore, the UE may increase the DUP_NEXT value by 1 whenever it duplicates and transmits the data to the lower layer, and may continue to apply the packet duplication to data corresponding to DUP_NEXT.

That is, the UE duplicates and transmits the same data to the primary RLC entity 1h-10 and the secondary RLC entity 1h-15 with respect to the data (PDCP SDU or PDCP PDU) not yet delivered from the PDCP entity to the lower layer. The two RLC entities process the duplicated data in the RLC layers, configure RLC headers, and then deliver them to the respective MAC entities 1h-20 and 1h-25. Each of the MAC entities 1h-20 and 1h-25 may perform data processing by placing restriction on the duplicated data received through the primary RLC layer (or secondary RLC layer) having the logical channel ID so that the data is loaded on a carrier mapped to the logical channel ID. That is, each MAC entity may perform the restriction so that the duplicated data is transmitted in the mapped carrier when a MAC PDU to be transmitted in a first carrier is configured and a MAC PDU to be transmitted in a second carrier is configured. A logical channel ID used to perform the packet duplication may be indicated in the RRC message. Furthermore, when each MAC entity performs logical channel prioritization (LCP), it may restrict and apply a logical channel ID corresponding to the primary RLC entity 1h-10 and a logical channel ID corresponding to the secondary RLC entity 1h-15. That is, when an LCP procedure for configuring the MAC PDU to be transmitted in the first carrier is performed, each MAC entity may include one ID for the packet duplication mapped to the carrier in the LCP procedure, may apply the ID, and may distribute transmission resources. Furthermore, when an LCP procedure for configuring the MAC PDU to be transmitted in the second carrier is performed, the MAC entity 1h-20 may include the other of the two IDs for the packet duplication in the LCP procedure, may apply the ID, and may distribute transmission resources. Mapping information with the logical channel and carrier or cell may be configured as the RRC message. The LCP procedure may include a procedure of selecting logical channels to which a transmission resource will be allocated and a procedure of distributing uplink transmission resources to the selected logical channels. If packet duplication is used, a diversity gain may be obtained by transmitting data, corresponding to different logical channel IDs to which packet duplication has been applied, to different gNBs. Furthermore, when the PDCP entity duplicates and transmits data to two RLC entities by applying packet duplication, if the two RLC entities operate in the RLC acknowledged mode (AM), the RLC entity may receive an RLC status report for the duplicated and transmitted data, and may notify the PDCP entity that the data has been successfully delivered when the successful reception of the data (RLC PDU or DLC SDU) is identified. For example, mapping information of an RLC sequence number and a PDCP sequence number may be used. The RLC entity may notify the PDCP entity of an RLC sequence number or may notify the PDCP entity of a PDCP sequence number or the successful delivery may indicate confirmation data. When the information is received, the PDCP entity may transmit indication, indicating that data whose successful delivery has been confirmed should be discarded if the data has not yet been transmitted because the data has been successfully delivered to a different RLC entity on which duplication transmission has been performed. When the discard indication is received, the different RLC entity may discard the data if the data (RLC SDU or the RLC PDU) corresponding to the discard indication or some of the data has not yet been transmitted. Mapping information of the RLC sequence number and the PDCP sequence number may be used as the discard indication, for example. The RLC sequence number may be notified or the PDCP sequence number may be notified or the successful delivery may indicate confirmation data (PDCP PDU or RLC SDU or RLC PDU.

In packet duplication based on dual connectivity of the disclosure, a 1-2c embodiment regarding an activation operation of the packet duplication is described below.

If deactivated uplink packet duplication is activated by receiving an RRC message or MAC control information, the UE starts to apply the packet duplication to data that has not yet been delivered from the PDCP entity to a lower layer when indication indicative of the activation of the uplink packet duplication is received from a higher layer (RRC) or a lower layer (MAC). In the above description, the PDCP entity may introduce a new states variable in order to clearly indicate data that has not yet been delivered to the lower layer. In order to assign a PDCP sequence number to the data received from the higher layer, the PDCP entity may calculate a PDCP sequence number as a TX_NEXT value for each datum using a states variable called TX_NEXT, may assign the PDCP sequence number, and may increase the PDCP sequence number by 1. The TX_NEXT value is a 32-bit COUNT value, and thus lower bits corresponding to a PDCP sequence number length may be drawn out from the 32-bit COUNT value through modulo operation and may be used as the PDCP sequence number. The COUNT value has a combination of an HFN value and a PDCP sequence number. When indication indicative of the activation of uplink packet duplication is received, the PDCP entity may introduce a new variable called DUP_NEXT, may define the new variable as the PDCP sequence number or COUNT value of the first data not delivered to a lower layer, and may use the new variable. In the above description, when the packet duplication is applied, the PDCP entity may update a DUP_NEXT value with a TX_NEXT value or a value of TX_NEXT−1, may start to apply the packet duplication to data having a PDCP sequence number corresponding to DUP_NEXT, and may duplicate and transmit the data to the primary RLC entity 1h-10 and the secondary RLC entity 1h-15. Furthermore, the PDCP entity may increase may increase the DUP_NEXT value by 1 whenever it duplicates and transmits the data to the lower layer, and may continue to apply the packet duplication to data corresponding to DUP_NEXT.

That is, the UE duplicates and transmits the same data to the primary RLC entity 1h-10 and the secondary RLC entity 1h-15 with respect to the data (PDCP SDU or PDCP PDU) not yet delivered from the PDCP entity to the lower layer. The two RLC entities process the duplicated data in the RLC layers, configure RLC headers, and then deliver them to the respective MAC entities 1h-20 and 1h-25. Each of the MAC entities 1h-20 and 1h-25 may perform data processing by placing restriction on the duplicated data received through the primary RLC layer (or secondary RLC layer) having the logical channel ID so that the data is loaded on a carrier mapped to the logical channel ID. That is, each MAC entity may perform the restriction so that the duplicated data is transmitted in the mapped carrier when a MAC PDU to be transmitted in a first carrier is configured and a MAC PDU to be transmitted in a second carrier is configured. A logical channel ID used to perform the packet duplication may be indicated in the RRC message. Furthermore, when each MAC entity performs logical channel prioritization (LCP), it may restrict and apply a logical channel ID corresponding to the primary RLC entity 1h-10 and a logical channel ID corresponding to the secondary RLC entity 1h-15. That is, when an LCP procedure for configuring the MAC PDU to be transmitted in the first carrier is performed, each MAC entity may include one ID for the packet duplication mapped to the carrier in the LCP procedure, may apply the ID, and may distribute transmission resources. Furthermore, when an LCP procedure for configuring the MAC PDU to be transmitted in the second carrier is performed, the MAC entity 1h-20 may include the other of the two IDs for the packet duplication in the LCP procedure, may apply the ID, and may distribute transmission resources. Mapping information with the logical channel and carrier or cell may be configured as the RRC message. The LCP procedure may include a procedure of selecting logical channels to which a transmission resource will be allocated and a procedure of distributing uplink transmission resources to the selected logical channels. If packet duplication is used, a diversity gain may be obtained by transmitting data, corresponding to different logical channel IDs to which packet duplication has been applied, to different gNBs. Furthermore, when the PDCP entity duplicates and transmits data to two RLC entities by applying packet duplication, if the two RLC entities operate in the RLC acknowledged mode (AM), the RLC entity may receive an RLC status report for the duplicated and transmitted data, and may notify the PDCP entity that the data has been successfully delivered when the successful reception of the data (RLC PDU or DLC SDU) is identified. For example, mapping information of an RLC sequence number and a PDCP sequence number may be used. The RLC entity may notify the PDCP entity of an RLC sequence number or may notify the PDCP entity of a PDCP sequence number or the successful delivery may indicate confirmation data. When the information is received, the PDCP entity may transmit indication, indicating that data whose successful delivery has been confirmed should be discarded if the data has not yet been transmitted because the data has been successfully delivered to a different RLC entity on which duplication transmission has been performed. When the discard indication is received, the different RLC entity may discard the data if the data (RLC SDU or the RLC PDU) corresponding to the discard indication or some of the data has not yet been transmitted. Mapping information of the RLC sequence number and the PDCP sequence number may be used as the discard indication, for example. The RLC sequence number may be notified or the PDCP sequence number may be notified or the successful delivery may indicate confirmation data (PDCP PDU or RLC SDU or RLC PDU.

The disclosure proposes an operation when the packet duplication function of the PDCP entity is deactivated more specifically with respect to the 1-2 embodiment.

In packet duplication based on dual connectivity of the disclosure, a 1-2d embodiment regarding the deactivation operation of the packet duplication is described below.

If activated uplink packet duplication is deactivated by receiving an RRC message or MAC control information, a UE 1h-40 no longer applies packet duplication to data that has not yet been delivered from the PDCP entity to a lower layer when indication indicative of the deactivation of the uplink packet duplication is received from a higher layer (RRC) or a lower layer (MAC). That is, the PDCP entity no longer duplicates and transmits data to the primary RLC entity 1h-45 or secondary RLC entity 1h-50 of the lower layer. Furthermore, the PDCP entity or bearer for which packet duplication has been deactivated may switch to a split bearer, and may be fallen back and used. That is, the PDCP entity may operate as a split bearer by identifying the primary RLC entity 1h-45 and threshold for a split bearer configured in an RRC message. That is, if the amount of data to be transmitted of the PDCP entity or the RLC entity is greater than the threshold, the PDCP entity may deliver different data to the primary RLC entity 1h-45 and the secondary RLC entity 1h-50. If the amount of data to be transmitted of the PDCP entity or the RLC entity is smaller than the threshold, the PDCP entity may deliver data to only the primary RLC entity 1h-45.

If packet duplication has been configured based on dual connectivity, that is, the primary RLC entity 1h-45 and the secondary RLC entity 1h-50 have been configured in one PDCP entity, but have not been activated, the PDCP entity may always operate as a split bearer.

If a bearer or logical channel ID for which packet duplication needs to be deactivated is indicated by the MAC control information, the UE no longer applies the uplink packet duplication, may switch to a split bearer, may transmit uplink data, and may continue to receive downlink data through the split bearer.

In the above description, although the uplink packet duplication has been deactivated, the deactivated RLC entity (e.g., secondary RLC entity) may continue to receive downlink data. Furthermore, the PDCP entity may continue to receive downlink data although the packet duplication is deactivated. That is, MAC control information indicative of the deactivation of the uplink packet duplication is to deactivate the uplink packet duplication, and the downlink packet duplication may continue to be used depending on an implementation of an eNB. Accordingly, regarding a deactivated RLC entity of the UE, the transmission RLC entity is deactivated, but the reception RLC entity may continue to receive and process data based on the RLC AM or the UM or the TM mode while driving state variables and a window and timer, and may deliver the data to a higher layer (PDCP). If the reception of downlink data is not deactivated as described above, the data transfer rate of an eNB can be enhanced and the flexibility of an eNB implementation can be improved. That is, although the MAC entity of the UE receives MAC control information to deactivate packet duplication with respect to any bearer or logical channel, it does not discard data corresponding to a deactivated logical channel ID or bearer received in downlink because the MAC control information is deactivation regarding uplink data transmission, may process data, and may deliver the data to an RLC entity corresponding to the logical channel ID or bearer. Furthermore, the RLC entity may process the data and deliver the data to the PDCP entity. The PDCP entity may receive the data, may process the data, and may deliver the data to a higher layer.

Furthermore, in the above description, although the UE does not receive direct indication indicative of the deactivation of packet duplication by receiving an RRC message or MAC control information, as in FIG. 1F, the UE may perform implicit deactivation using mapped information configured between bearers or logical channel IDs and cell groups using packet duplication in the RRC message. That is, if all cell groups mapped to bearers or logical channel IDs using packet duplication have been released or deactivated, the UE may implicitly deactivate packet duplication with respect to a (mapped) bearer or logical channel ID corresponding to the released or deactivated cells although direct deactivation indication, such as the RRC message or MAC control information, is not present. Unnecessary signaling overhead between an eNB and a UE can be reduced by applying such implicit deactivation. Such implicit deactivation may be applied as implicit activation. That is, when cells mapped to a bearer or logical channel ID of packet duplication are activated, packet duplication may be activated.

The disclosure proposes an operation when the packet duplication function of the PDCP entity is deactivated more specifically with respect to the 1-2 embodiment.

In packet duplication based on dual connectivity of the disclosure, a 1-2e embodiment regarding the deactivation operation of the packet duplication is described below.

If activated uplink packet duplication is deactivated by receiving an RRC message or MAC control information, a UE no longer applies packet duplication to data that has not yet been delivered from the PDCP entity to a lower layer when indication indicative of the deactivation of the uplink packet duplication is received from a higher layer (RRC) or a lower layer (MAC). That is, the PDCP entity no longer duplicates and transmits data to the primary RLC entity 1h-45 or secondary RLC entity 1h-50 of the lower layer. Furthermore, the PDCP entity or bearer for which packet duplication has been deactivated may switch to a split bearer, and may be fallen back and used. That is, the PDCP entity may operate as a split bearer by identifying the primary RLC entity 1h-45 and threshold for a split bearer configured in an RRC message. That is, if the amount of data to be transmitted of the PDCP entity or the RLC entity is greater than the threshold, the PDCP entity may deliver different data to the primary RLC entity 1h-45 and the secondary RLC entity 1h-50. If the amount of data to be transmitted of the PDCP entity or the RLC entity is smaller than the threshold, the PDCP entity may deliver data to only the primary RLC entity 1h-45. In the above description, if the packet duplication has been deactivated, the PDCP entity may transmit an indicator, indicating that data that has been delivered for packet duplication and that has not yet been transmitted should be discarded if the data is present, to one (e.g., secondary RLC entity) of the primary RLC entity 1h-45 and the secondary RLC entity 1h-50. When the discard indicator is received, one (e.g., secondary RLC entity) of the primary RLC entity 1h-45 or the secondary RLC entity 1h-50 may discard all duplicated data that has not yet been transmitted if the secondary RLC entity operates in the RLC UM, and may discard all duplicated data that has not yet been transmitted if the secondary RLC entity operates in the RLC AM, thereby being capable of preventing unnecessary transmission and improving efficiency of a transmission resource.

If packet duplication has been configured based on dual connectivity, that is, the primary RLC entity 1h-45 and the secondary RLC entity 1h-50 have been configured in one PDCP entity, but have not been activated, the PDCP entity may always operate as a split bearer.

If a bearer or logical channel ID for which packet duplication needs to be deactivated is indicated by the MAC control information, the UE no longer applies the uplink packet duplication, may switch to a split bearer, may transmit uplink data, and may continue to receive downlink data through the split bearer.

In the above description, although the uplink packet duplication has been deactivated, the deactivated RLC entity (e.g., secondary RLC entity) may continue to receive downlink data. Furthermore, the PDCP entity may continue to receive downlink data although the packet duplication is deactivated. That is, MAC control information indicative of the deactivation of the uplink packet duplication is to deactivate the uplink packet duplication, and the downlink packet duplication may continue to be used depending on an implementation of an eNB. Accordingly, regarding a deactivated RLC entity of the UE, the transmission RLC entity is deactivated, but the reception RLC entity may continue to receive and process data based on the RLC AM or the UM or the TM mode while driving state variables and a window and timer, and may deliver the data to a higher layer (PDCP). If the reception of downlink data is not deactivated as described above, the data transfer rate of an eNB can be enhanced and the flexibility of an eNB implementation can be improved. That is, although the MAC entity of the UE receives MAC control information to deactivate packet duplication with respect to any bearer or logical channel, it does not discard data corresponding to a deactivated logical channel ID or bearer received in downlink because the MAC control information is deactivation regarding uplink data transmission, may process data, and may deliver the data to an RLC entity corresponding to the logical channel ID or bearer. Furthermore, the RLC entity may process the data and deliver the data to the PDCP entity. The PDCP entity may receive the data, may process the data, and may deliver the data to a higher layer.

Furthermore, in the above description, although the UE does not receive direct indication indicative of the deactivation of packet duplication by receiving an RRC message or MAC control information, as in FIG. 1F, the UE may perform implicit deactivation using mapped information configured between bearers or logical channel IDs and cell groups using packet duplication in the RRC message. That is, if all cell groups mapped to bearers or logical channel IDs using packet duplication have been released or deactivated, the UE may implicitly deactivate packet duplication with respect to a (mapped) bearer or logical channel ID corresponding to the released or deactivated cells although direct deactivation indication, such as the RRC message or MAC control information, is not present. Unnecessary signaling overhead between an eNB and a UE can be reduced by applying such implicit deactivation. Such implicit deactivation may be applied as implicit activation. That is, when cells mapped to a bearer or logical channel ID of packet duplication are activated, packet duplication may be activated.

In the above description of the disclosure, if the packet duplication is deactivated and a deactivated RLC entity no longer transmits data, an LCP procedure is not applied to a logical channel ID corresponding to the deactivated RLC entity. More specifically, a transmission resource may not be allocated to the logical channel ID, the logical channel ID may not be selected when an LCP procedure is performed, and a token value (prioritized bit rate (PBR)) updated and increased at a given interval in an LCP procedure may not be updated (or may be reset and initialized).

Furthermore, if packet duplication is deactivated and a deactivated RLC entity no longer transmits data, the RLC layer may transmit indication, indicating that data is no longer transmitted, to a lower MAC layer so that an LCP procedure is not applied to a logical channel ID corresponding to the deactivated RLC entity.

Figure 1I:
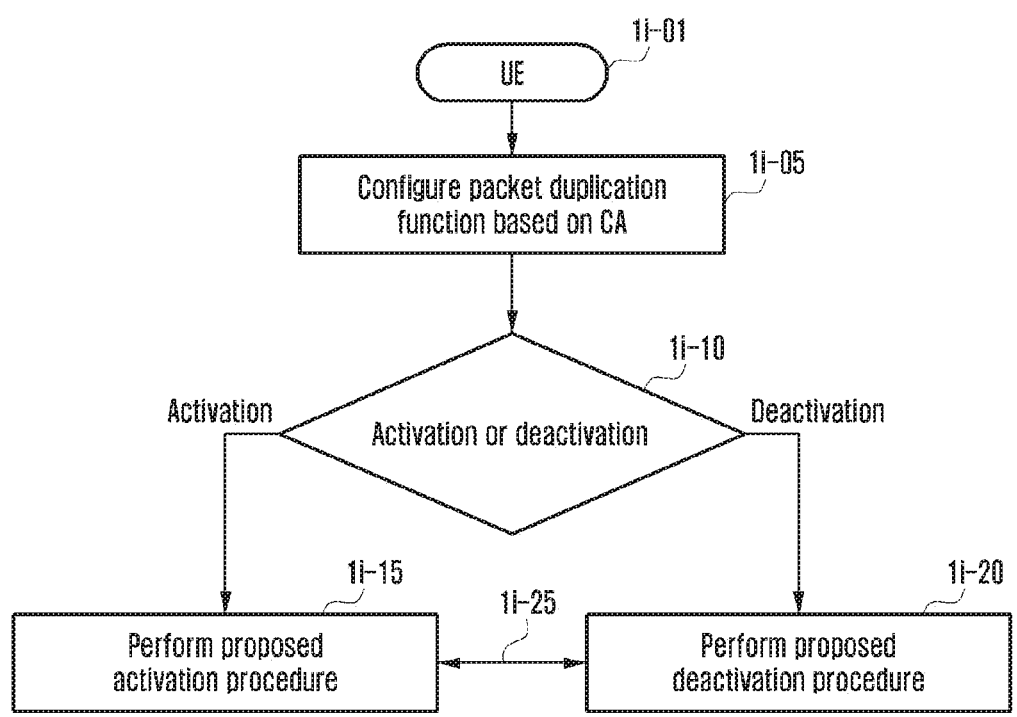
FIG. 1I is a diagram showing a UE operation of performing packet duplication when the PDCP layer duplicates a packet and transmits the packet based on a carrier aggregation in a next-generation mobile communication system according to an embodiment of the disclosure.

FIG. 1I is a diagram showing a UE operation of performing packet duplication when the PDCP layer duplicates a packet and transmits the packet based on a carrier aggregation in a next-generation mobile communication system according to an embodiment of the disclosure.

Referring to FIG. 1I, as in FIG. 1F, when a UE 1i-01 receives an RRC message, it may configure a bearer (DRB or SRB) based on configuration information received in the message, and may configure a PDCP entity, RLC entities and MAC entities corresponding to each bearer. If packet duplication (PDCP packet duplication) is to be configured based on a carrier aggregation with respect to a bearer or PDCP entity or logical channel, a gNB may configure, in the UE 1i-01, two RLC entities to be connected to the PDCP entity with respect to the bearer (1i-05). The two RLC entities may be configured as a primary RLC entity and a secondary RLC entity and may be indicated using a logical channel ID (LCID). As described above, if packet duplication is configured based on a carrier aggregation, an initial state may become an activation state right after the configuration or may immediately become a deactivation state based on the configuration information of the RRC message. If the bearer is an SRB, the initial state may immediately become an activation state. The UE 1i-01 determines whether a packet duplication operation has been activated or deactivated (1i-10). If the packet duplication operation has been configured as activation, the UE may apply one of the proposed embodiments of the activation operation in the above description of the disclosure (1i-15). If the packet duplication operation has been configured as deactivation, the UE may apply one of the proposed embodiments of the deactivation operation in the above description of the disclosure (1i-20).

Furthermore, a gNB may indicate whether or not to activate or deactivate packet duplication with respect to the bearer using a MAC control element. To indicate whether or not to activate or deactivate packet duplication using MAC control information is transmitted from the gNB to the UE. Whether or not to activate or deactivate packet duplication is control information on uplink packet duplication. An activation state and a deactivation state may be configured using the MAC control information as in 1i-25.

Figure 1J:
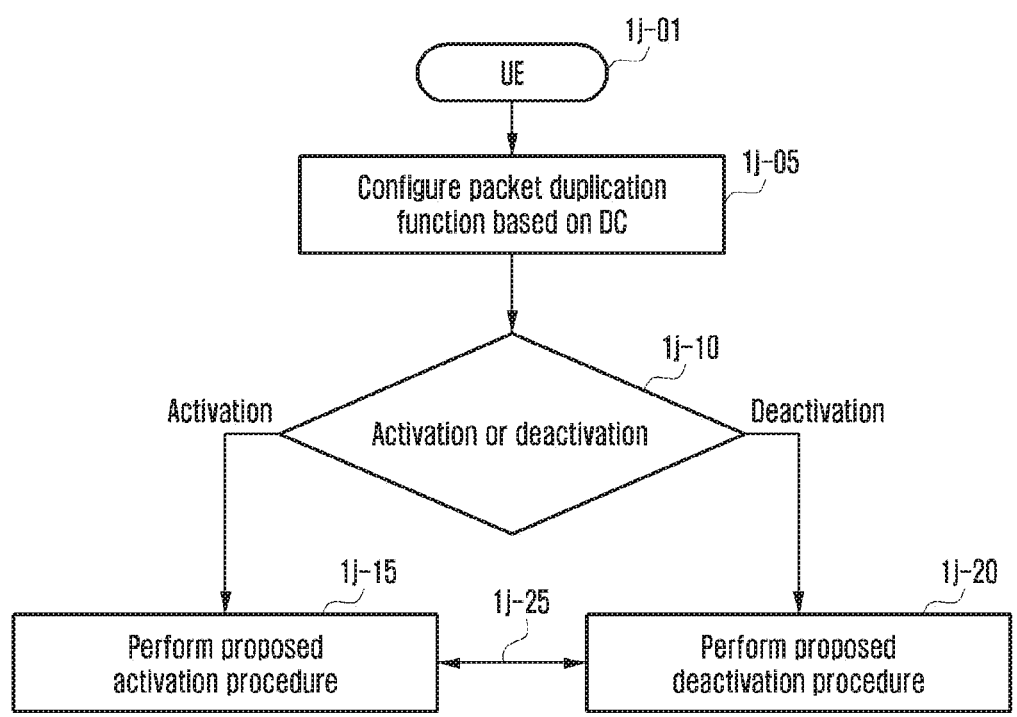
FIG. 1J is a diagram showing a UE operation of performing packet duplication when the PDCP layer duplicates and transmits a packet based on dual connectivity in a next-generation mobile communication system according to an embodiment of the disclosure.

FIG. 1J is a diagram showing a UE operation of performing packet duplication when the PDCP layer duplicates and transmits a packet based on dual connectivity in a next-generation mobile communication system according to an embodiment of the disclosure.

Referring to FIG. 1J, as in FIG. 1F, when a UE 1j-01 receives an RRC message, it may configure a bearer (DRB or SRB) based on configuration information received in the message, and may configure a PDCP entity, RLC entities and MAC entities corresponding to each bearer. If packet duplication (PDCP packet duplication) is to be configured based on dual connectivity with respect to a bearer or PDCP entity or logical channel, a gNB may configure, in the UE 1j-01, two RLC entities to be connected to the PDCP entity with respect to the bearer (1j-05). The two RLC entities may be configured as a primary RLC entity and a secondary RLC entity, and may be indicated using a logical channel ID (LCID) and a cell group ID. As described above, if packet duplication is configured based on dual connectivity, an initial state may become an activation state right after the configuration or may immediately become a deactivation state based on the configuration information of the RRC message. If the bearer is an SRB, the initial state may immediately become an activation state. The UE 1j-01 determines whether a packet duplication operation has been activated or deactivated (1j-10). If the packet duplication operation has been configured as activation, the UE may apply one of the proposed embodiments of the activation operation in the above description of the disclosure (1j-15). If the packet duplication operation has been configured as deactivation, the UE may apply one of the proposed embodiments of the deactivation operation in the above description of the disclosure (1j-20).

A gNB may indicate whether or not to activate or deactivate packet duplication with respect to the bearer using a MAC control element. To indicate whether or not to activate or deactivate packet duplication using MAC control information is transmitted from the gNB to the UE. Whether or not to activate or deactivate packet duplication is control information on uplink packet duplication. In the above description, the gNB may transmit MAC control information indicating whether to activate or deactivate uplink packet duplication to a MAC entity corresponding to a master cell group or a MAC entity corresponding to a secondary cell group. Alternatively, the gNB may always transmit the MAC control information to only a MAC entity, corresponding to a master cell group, because the master cell group has always been activated, for convenience of an implementation. An activation state and a deactivation state may be configured using the MAC control information as in 1j-25.

Figure 1K:
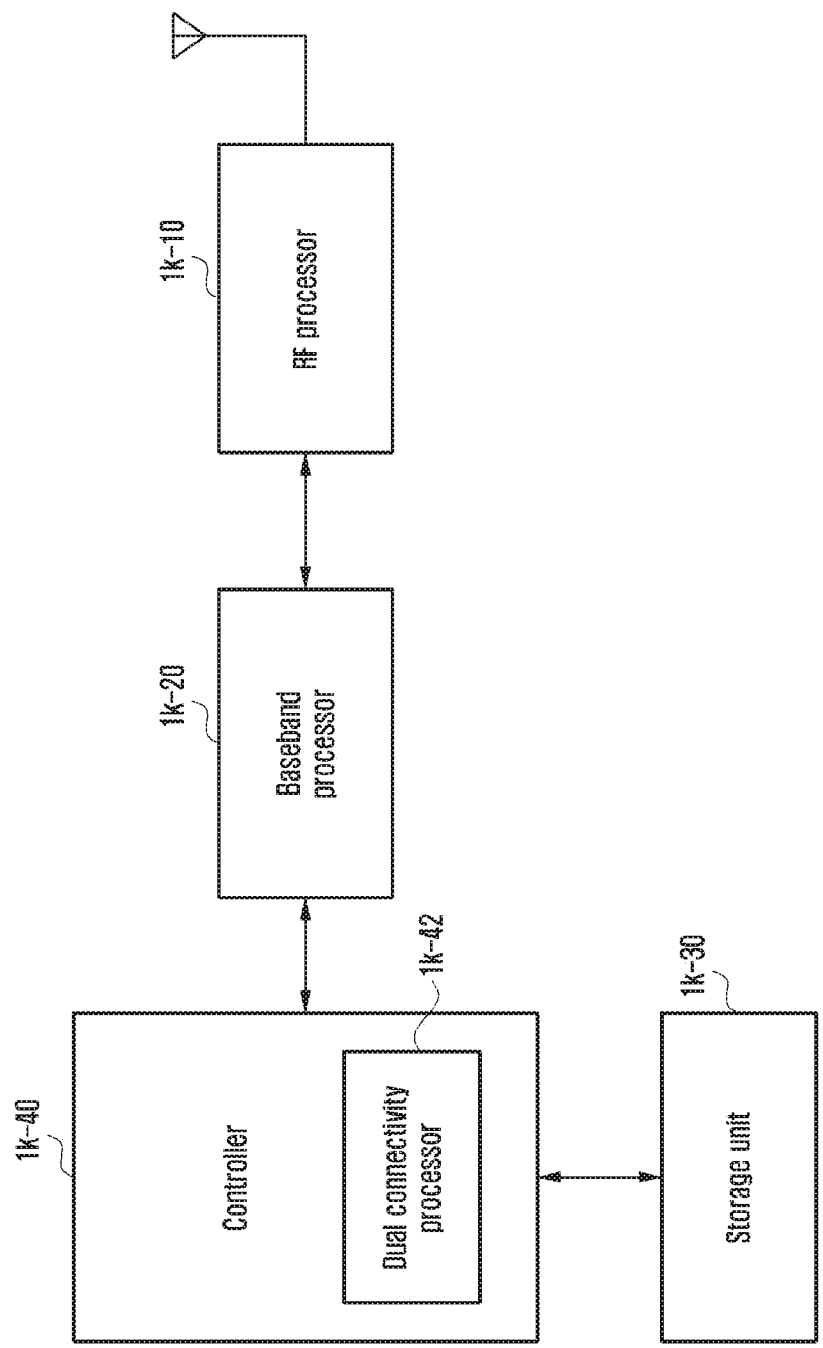
FIG. 1K is a diagram showing the configuration of a UE according to an embodiment of the disclosure.

FIG. 1K is a diagram showing the configuration of a UE according to an embodiment of the disclosure.

Referring to FIG. 1K, the UE includes a radio frequency (RF) processor 1k-10, a baseband processor 1k-20, a storage unit 1k-30, and a controller 1k-40.

The RF processor 1k-10 performs functions for transmitting/receiving a signal through a radio channel, such as the band conversion and amplification of a signal. That is, the RF processor 1k-10 up-converts a baseband signal received from the baseband processor 1k-20 into an RF band signal, transmits the RF band signal through an antenna, and down-converts an RF band signal received through the antenna into a baseband signal. For example, the RF processor 1k-10 may include a transmission filter, a reception filter, an amplifier, a mixer, an oscillator, a digital to analog convertor (DAC), and an analog to digital convertor (ADC). In FIG. 1K, only one antenna has been illustrated, but the UE may include multiple antennas. Furthermore, the RF processor 1k-10 may include multiple RF chains. Furthermore, the RF processor 1k-10 may perform beamforming. For the beamforming, the RF processor 1k-10 may adjust the phase and size of each of signals transmitted/received through multiple antennas or antenna elements. Furthermore, the RF processor may perform MIMO. When the MIMO operation is performed, the RF processor may receive multiple layers. The RF processor 1k-10 may properly configure multiple antenna or antenna elements under the control of the controller, and may perform received beam swiping or adjust the direction and beam width of the received beam so that the received beam cooperates with a transmitted beam.

The baseband processor 1k-20 performs a baseband signal and inter-bit stream conversion function based on the physical layer standard of a system. For example, when data is transmitted, the baseband processor 1k-20 generates complex symbols by coding and modulating a transmission bit stream. Furthermore, when data is received, the baseband processor 1k-20 reconstructs a reception bit stream from a baseband signal received from the RF processor 1k-10 through demodulation and decoding. For example, if an orthogonal frequency division multiplexing (OFDM) scheme is applied, when data is transmitted, the baseband processor 1k-20 generates complex symbols by coding and modulating a transmission bit stream, maps the complex symbols to subcarriers, and then configures OFDM symbols through inverse fast Fourier transform (IFFT) operation and cyclic prefix (CP) insertion. Furthermore, when data is received, the baseband processor 1k-20 segments a baseband signal received from the RF processor 1k-10 in an OFDM symbol unit, reconstructs signals mapped to subcarriers through fast Fourier transform (FFT) operation, and reconstructs a reception bit stream through demodulation and decoding.

The baseband processor 1k-20 and the RF processor 1k-10 transmit and receive signals as described above. Accordingly, the baseband processor 1k-20 and the RF processor 1k-10 may be called a transmitter, a receiver, a transceiver or a communication unit. Furthermore, at least one of the baseband processor 1k-20 and the RF processor 1k-10 may include multiple communication modules in order to support different multiple radio access technologies. Furthermore, at least one of the baseband processor 1k-20 and the RF processor 1k-10 may include different communication modules in order to process signals of different frequency bands. For example, the different radio access technologies may include an LTE network and an NR network. Furthermore, the different frequency bands may include a super high frequency (SHF) (e.g., 2.5 GHz, 5 GHz) band and a millimeter wave (e.g., 60 GHz) band.

The storage unit 1k-30 stores data, such as a basic program, an application program, and configuration information for the operation of the UE. The storage unit 1k-30 provides stored data in response to a request from the controller 1k-40.

The controller 1k-40 controls an overall operation of the UE. For example, the controller 1k-40 transmits/receives a signal through the baseband processor 1k-20 and the RF processor 1k-10. Furthermore, the controller 1k-40 writes data in the storage unit 1k-40 and reads data from the storage unit 1k-40. To this end, the controller 1k-40 may include at least one processor. For example, the controller 1k-40 may include a communication processor (CP) performing control for communication and an application processor (AP) controlling a higher layer, such as an application program. Furthermore, the controller 1k-40 may include a dual connectivity processor 1k-42 configured to perform processing for an operation in a multi-connection mode.

Figure 1L:
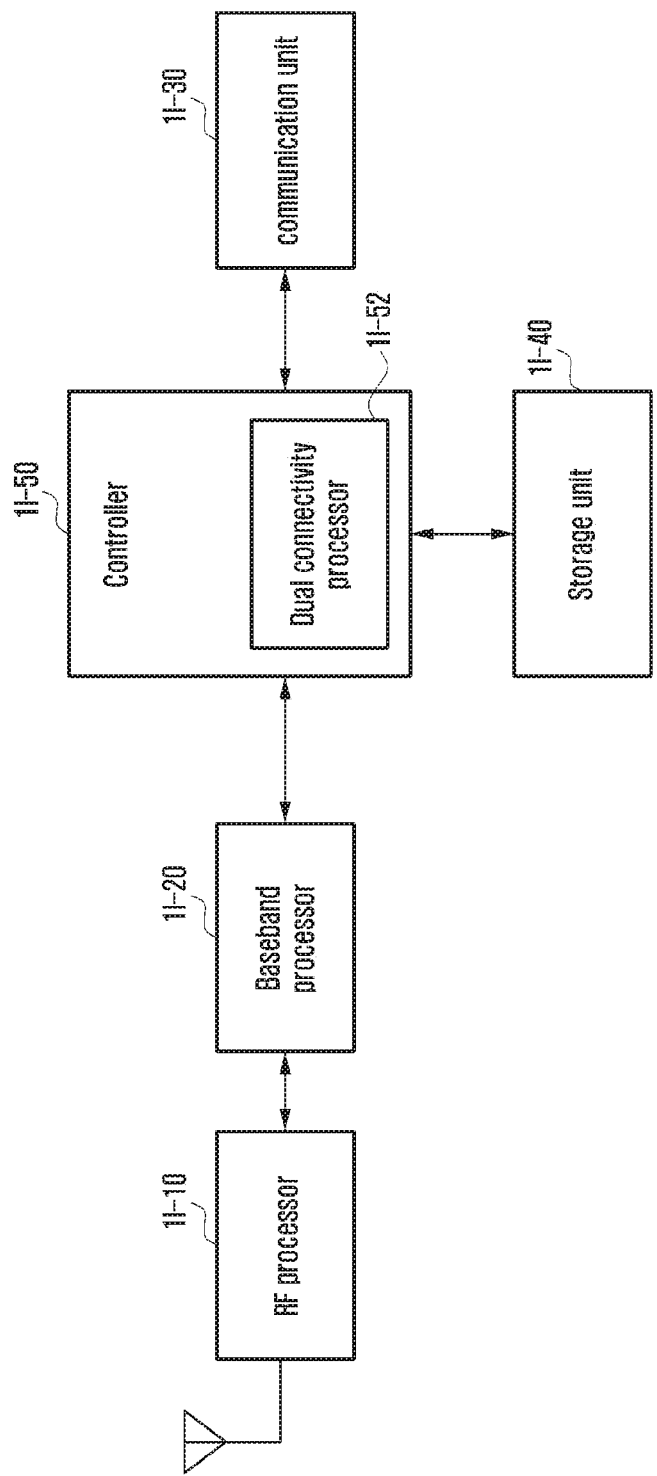
FIG. 1L is a diagram showing the configuration of a base station according to an embodiment of the disclosure.

FIG. 1L is a diagram showing the configuration of a base station according to an embodiment of the disclosure. The base station may be named a transmission and reception point (TRP).

Referring to FIG. 1L, the base station may include an RF processor 1l-10, a baseband processor 1l-20, a backhaul communication unit 1l-30, a storage unit 1l-40 and a controller 1l-50.

The RF processor 1l-10 performs a function for transmitting/receiving a signal through a radio channel, such as the band conversion and amplification of a signal. That is, the RF processor 1l-10 up-converts a baseband signal received from the baseband processor 1l-20 into an RF band signal, transmits the RF band signal through an antenna, and down-converts an RF band signal received through the antenna into a baseband signal. For example, the RF processor 1l-10 may include a transmission filter, a reception filter, an amplifier, a mixer, an oscillator, a DAC, and an ADC. In FIG. 1L, only one antenna has been illustrated, but the base station may include multiple antennas. Furthermore, the RF processor 1l-10 may include multiple RF chains. Furthermore, the RF processor 1l-10 may perform beamforming. For the beamforming, the RF processor 1l-10 may adjust the phase and size of each of signals transmitted/received multiple antennas or antenna elements. The RF processor may perform a downlink MIMO operation by transmitting one or more layers.

The baseband processor 1l-20 performs a baseband signal and inter-bit stream conversion function based on the physical layer standard of a first radio access technology. For example, when data is transmitted, the baseband processor 1l-20 generates complex symbols by coding and modulating a transmission bit stream. Furthermore, when data is received, the baseband processor 1l-20 reconstructs a reception bit stream from a baseband signal received from the RF processor 1l-10 through demodulation and decoding. For example, if the OFDM scheme is applied, when data is transmitted, the baseband processor 1l-20 generates complex symbols by coding and modulating a transmission bit stream, maps the complex symbols to subcarriers, and configures OFDM symbols through IFFT operation and CP insertion. Furthermore, when data is received, the baseband processor 1l-20 segments a baseband signal received from the RF processor 1l-10 in an OFDM symbol unit, reconstructs signals mapped to subcarriers through FFT operation, and then reconstructs a reception bit stream through demodulation and decoding. The baseband processor 1l-20 and the RF processor 1l-10 transmit and receive signals as described above. Accordingly, the baseband processor 1l-20 and the RF processor 1l-10 may be called a transmitter, a receiver, a transceiver, a communication unit or a wireless communication unit.

The communication unit 1l-30 provides an interface for performing communication with other nodes within a network.

The storage unit 1l-40 stores data, such as a basic program, an application program, and configuration information for the operation of a main base station. Specifically, the storage unit 1l-40 may store information on a bearer allocated to an accessed UE and measurement results reported by an accessed UE. Furthermore, the storage unit 1l-40 may store information, that is, a criterion by which whether to provide a UE with multiple connections is determined. Furthermore, the storage unit 1l-40 provides stored data in response to a request from the controller 1l-50.

The controller 1l-50 controls an overall operation of the main base station. For example, the controller 1l-50 transmits/receives a signal through the baseband processor 1l-20 and the RF processor 1l-10 or through the backhaul communication unit 1l-30. Furthermore, the controller 1l-50 writes data in the storage unit 1l-40 and reads data from the storage unit 1l-40. To this end, the controller 1l-50 may include at least one processor. Furthermore, the controller 1l-50 may include a DC processor 1l-52 configured to perform processing for an operation in a multi-connection mode.

Second Embodiment

Figure 2A:
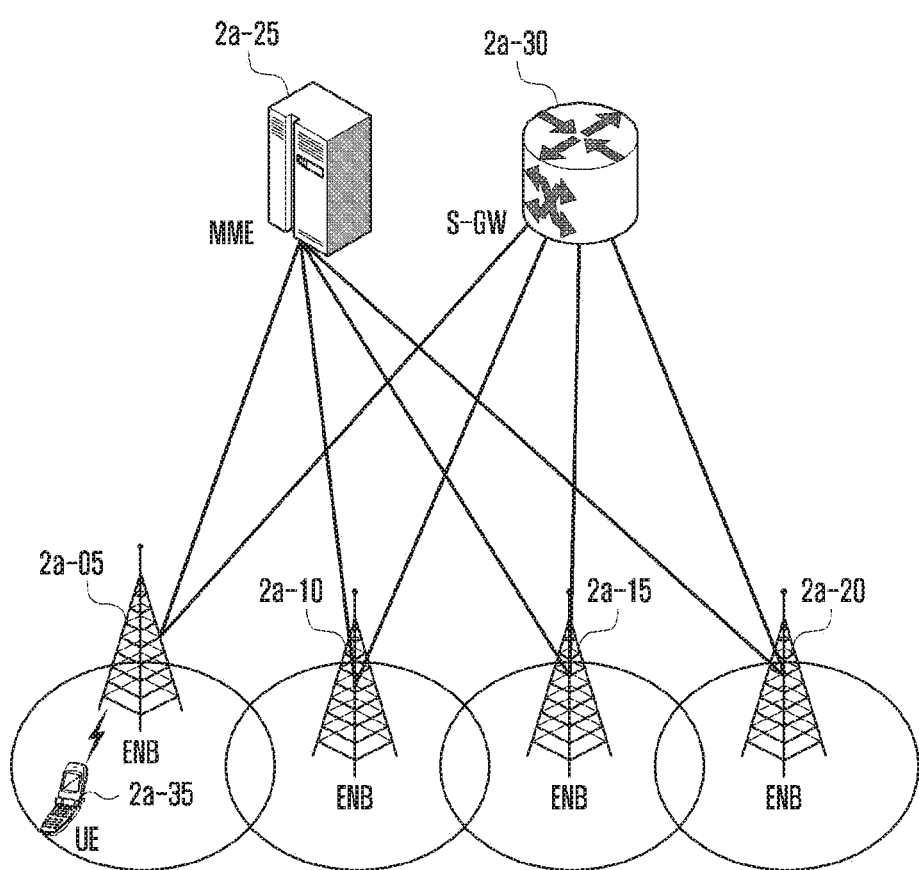
FIG. 2A is a diagram showing the configuration of an LTE system according to an embodiment of the disclosure.

FIG. 2A is a diagram showing the configuration of an LTE system according to an embodiment of the disclosure.

Referring to FIG. 2A, the radio access network of the LTE system includes next-generation evolved Node Bs (hereinafter referred to as "ENBs", "Node Bs" or "base stations") 2a-05, 2a-10, 2a-15, and 2a-20, a mobility management entity (MME) 2a-25, and a serving-gate (S-GW) 2a-30. A user equipment (hereinafter referred to as a "UE" or "terminal") 2a-35 accesses an external network through the ENBs 2a-05~2a-20 and the S-GW 2a-30.

In FIG. 2A, the ENBs 2a-05~2a-20 correspond to the Node Bs of the existing UMTS system. The ENB is connected to the UE 2a-35 through a radio channel and performs a more complex function than the existing Node B. In the LTE system, all of types of user traffic including a real-time service, such as voice over IP (VoIP), through the internet protocol, are served through a shared channel. Accordingly, a device that performs schedules by collecting state information, such as the buffer state, available transmission power state, and channel state of UEs, is necessary. The ENBs 2a-05~2a-20 are in charge of such a device. In general, one ENB controls multiple cells. For example, in order to implement the transfer rate of 100 Mbps, the LTE system uses orthogonal frequency division multiplexing (hereinafter referred to as "OFDM") as a radio access technology in the 20 MHz bandwidth, for example. Furthermore, the LTE system adopts an adaptive modulation & coding (hereinafter referred to as "AMC") scheme for determining a modulation scheme and a channel coding rate based on the channel state of a UE. The S-GW 2a-30 provides a data bearer and generates or removes a data bearer under the control of the MME 2a-25. The MME 2a-25 is in charge of various control functions in addition to a mobility management function for a UE, and is connected to multiple ENBs.

Figure 2B:
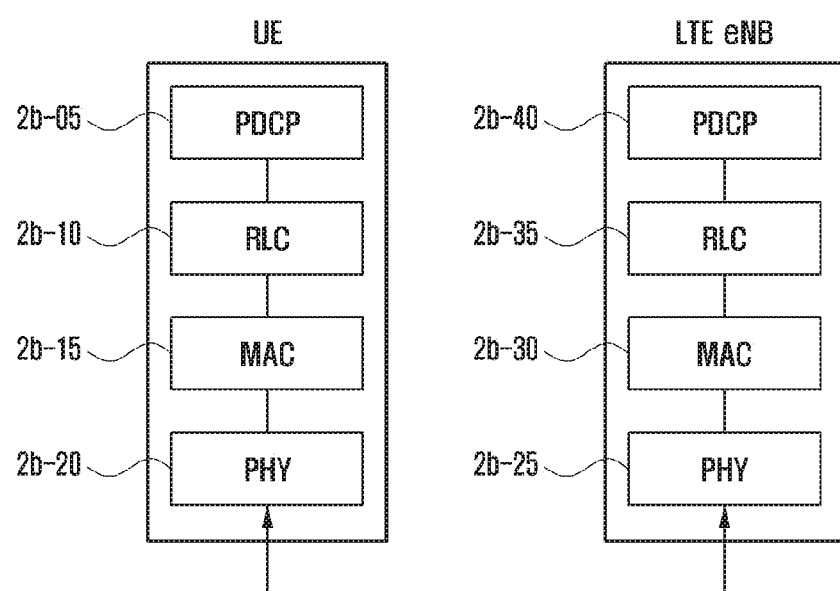
FIG. 2B is a diagram showing radio protocol architecture in the LTE system according to an embodiment of the disclosure.

FIG. 2B is a diagram showing radio protocol architecture in the LTE system according to an embodiment of the disclosure.

Referring to FIG. 2B, the radio protocol of the LTE system includes packet data convergence protocols (PDCPs) 2b-05 and 2b-40, radio link control (RLC) 2b-10 and 2b-35, and medium access control (MAC) 2b-15 and 2b-30 in a UE and an ENB, respectively. The PDCPs 2b-05 and 2b-40 are in charge of an operation, such as IP header compression/restoration. Major functions of the PDCP 2b-05, 2b-40 are summarized as follows.

Header compression and decompression: ROHC only
 Transfer of user data
 In-sequence delivery of upper layer PDUs in a PDCP re-establishment procedure for RLC AM
 Reordering function (for split bearers in DC (only support for RLC AM): PDCP PDU routing for transmission and PDCP PDU reordering for reception)
 Duplicate detection of lower layer SDUs in a PDCP re-establishment procedure for RLC AM
 Retransmission of PDCP SDUs at handover and, for split bearers in DC, of PDCP PDUs in a PDCP data-recovery procedure, for RLC AM
 Ciphering and deciphering
 Timer-based SDU discard in uplink.

The RLC 2b-10, 2b-35 reconfigures a PDCP packet data unit (PDU) in a proper size and performs an ARQ operation. Major functions of the RLC are summarized as follows.

Transfer of upper layer PDUs
 ARQ function (Error Correction through ARQ (only for AM data transfer))
 Concatenation, segmentation and reassembly of RLC SDUs (only for UM and AM data transfer)
 Re-segmentation of RLC data PDUs (only for AM data transfer)
 Reordering of RLC data PDUs (only for UM and AM data transfer)
 Duplicate detection (only for UM and AM data transfer)
 Protocol error detection (only for AM data transfer)
 RLC SDU discard (only for UM and AM data transfer)
 RLC re-establishment The MAC 2b-15, 2b-30 is connected to multiple RLC entities configured in one UE, and performs an operation of multiplexing RLC PDUs with a MAC PDU and demultiplexing RLC PDUs from a MAC PDU. Major functions of the MAC are summarized as follows.

Mapping between logical channels and transport channels
 Multiplexing/demultiplexing of MAC SDUs belonging to one or different logical channels into/from transport blocks (TB) delivered to/from the physical layer on transport channels)
 Scheduling information reporting
 Error correction through HARQ
 Priority handling between logical channels of one UE
 Priority handling between UEs by means of dynamic scheduling
 MBMS service identification
 Transport format selection
 Padding A physical layer 2b-20, 2b-25 performs an operation of channel-coding and modulating higher layer data, generating the higher layer data into an OFDM symbol, and transmitting the OFDM symbol through a radio channel or demodulating an OFDM symbol received through a radio channel, channel-decoding the OFDM symbol, and transmitting the OFDM symbol to a higher layer.

Figure 2C:
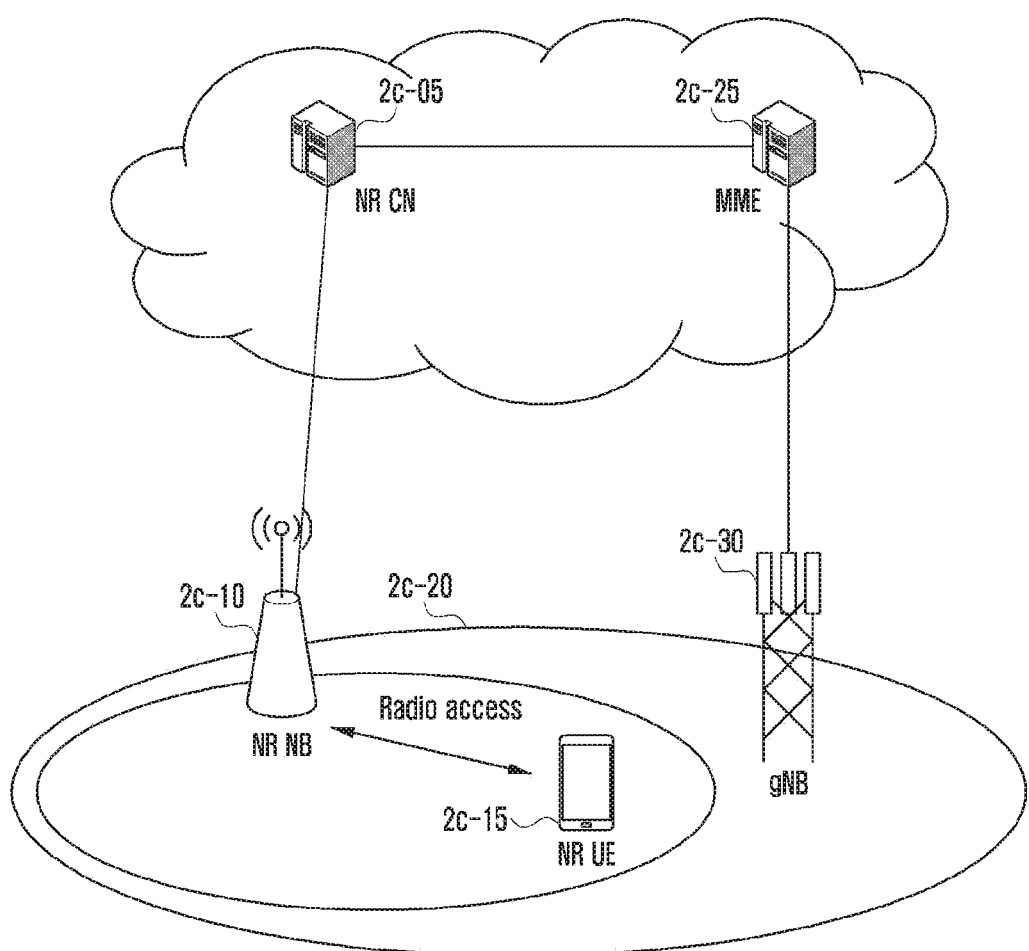
FIG. 2C is a diagram showing the configuration of a next-generation mobile communication system according to an embodiment of the disclosure.

FIG. 2C is a diagram showing the configuration of a next-generation mobile communication system according to an embodiment of the disclosure.

Referring to FIG. 2C, the radio access network of the NR includes a new radio Node B (hereinafter referred to as an "NR gNB" or an "NR base station") 2c-10 and a new radio core network (NR CN) 2c-05. A new radio user equipment (hereinafter referred to as an "NR UE" or a "terminal") 2c-15 accesses an external network through the NR gNB 2c-10 and the NR CN 2c-05.

In FIG. 2C, the NR gNB 2c-10 corresponds to an evolved Node B (ENB) of the existing LTE system. The NR gNB is connected to the NR UE 2c-15 through a radio channel, and may provide an excellent service compared to the existing Node B. The NR requires a device for performing scheduling by collecting state information, such as the buffer state, available transmission power state, and channel state of UEs, because all of types of user traffic are served through a shared channel. The NR gNB 2c-10 is in charge of the device. In general, one NR gNB controls multiple cells. In order to implement ultra-high speed data transfer compared to the existing LTE, the NR may have the existing maximum bandwidth or more and may additionally graft the beam-forming technology using OFDM as a radio access technology. Furthermore, the NR adopts the AMC scheme that determines a modulation scheme and a channel coding rate based on the channel state of a UE. The NR CN 2c-05 performs functions, such as mobility support, a bearer configuration, and a QoS configuration. The NR CN 2c-05 is in charge of various control functions in addition to a mobility management function for a UE, and is connected to multiple ENBs. Furthermore, the NR may also operate in conjunction with the existing LTE system. The NR CN 2c-05 is connected to an MME 2c-25 through a network interface. The MME 2c-25 is connected to an ENB 2c-30, that is, the existing ENB. The coverage area 2c-20 of the ENB 2c-30 is shown in FIG. 2C as including the coverage area of the NR gNB 2c-10.

Figure 2D:
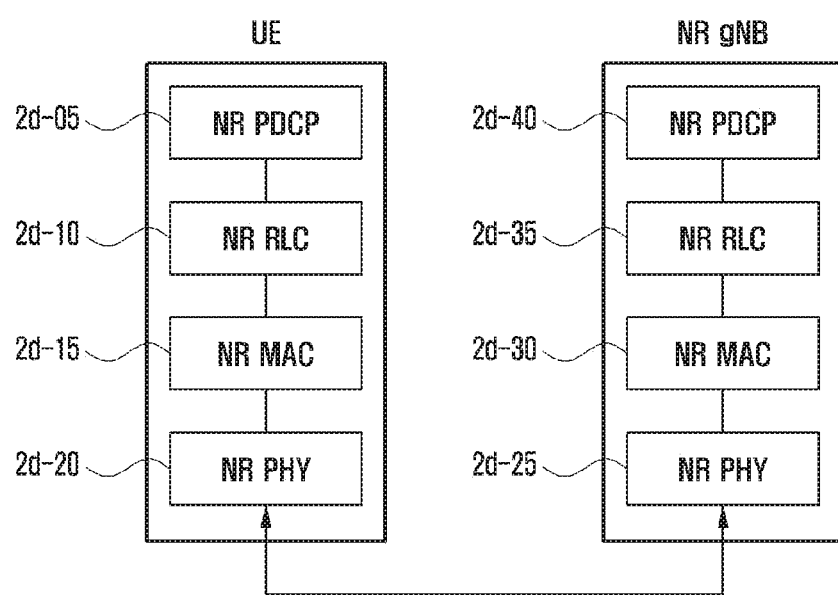
FIG. 2D is a diagram showing radio protocol architecture in the next-generation mobile communication system according to an embodiment of the disclosure.

FIG. 2D is a diagram showing radio protocol architecture in the next-generation mobile communication system according to an embodiment of the disclosure.

Referring to FIG. 2D, the radio protocol of the NR includes NR PDCPs 2d-05 and 2d-40, NR RLC 2d-10 and 2d-35, and NR MAC 2d-15 and 2d-30, respectively, in an NR UE and an NR base station. Major functions of the NR PDCP 2d-05, 2d-40 may include some of the following functions.

Header compression and decompression: ROHC only
Transfer of user data
In-sequence delivery of upper layer PDUs
Out-of-sequence delivery of upper layer PDUs
PDCP PDU reordering for reception
Duplicate detection of lower layer SDUs
Retransmission of PDCP SDUs
Ciphering and deciphering
Timer-based SDU discard in uplink.

In the above description, the reordering function of the NR PDCP device refers to a function of sequentially reordering PDCP PDUs received from a lower layer based on a PDCP sequence number (SN). The reordering function may include a function of transmitting data in a reordered sequence to a higher layer, a function of directly transmitting data to a higher layer without taking the sequence into consideration, a function of reordering orders and recording lost PDCP PDUs, a function of making a status report on lost PDCP PDUs to the transmission side, and a function of requesting the retransmission of lost PDCP PDUs.

Major functions of the NR RLC 2d-10, 2d-35 may include some of the following functions.

Transfer of upper layer PDUs
In-sequence delivery of upper layer PDUs
Out-of-sequence delivery of upper layer PDUs
Error Correction through ARQ
Concatenation, segmentation and reassembly of the RLC SDUs
Re-segmentation of RLC data PDUs
Reordering of RLC data PDUs
Duplicate detection
Protocol error detection
RLC SDU discard
RLC re-establishment In the above description, the in-sequence delivery function of the NR RLC device refers to a function of sequentially transmitting RLC SDUs received from a lower layer to a higher layer, and may include a function of reassembling and transmitting multiple RLC SDUs if one RLC SDU has been originally segmented into the multiple RLC SDUs and received. The in-sequence delivery function may include a function of reordering received RLC PDUs based on an RLC sequence number (SN) or a PDCP sequence number (SN), a function of reordering orders and recording lost RLC PDUs, a function of transmitting a status report on lost RLC PDUs to the transmission side, a function of requesting the retransmission of lost RLC PDUs, a function of sequentially transmitting only RLC SDUs prior to a lost RLC SDU to a higher layer when the lost RLC SDU occurs, a function of sequentially transmitting all of RLC SDUs received until a given timer expires to a higher layer when the timer expires although there is a lost RLC SDU, and a function of sequentially transmitting all of RLC SDUs received so far to a higher layer when a given timer expires although there is a lost RLC SDU. Furthermore, the in-sequence delivery function may include a function of processing RLC PDUs in order that the RLC PDUs are received (in order of arrival regardless of the order of a sequence number) and transmitting the RLC PDUs to a PDCP device regardless of their orders (i.e., out of sequence delivery). The in-sequence delivery function may include a function of receiving segments stored in a buffer or segments to be received subsequently, reconfiguring the segments in one complete RLC PDU, processing the RLC PDU, and transmitting the RLC PDU to the PDCP device. The NR RLC layer may not include a concatenation function. The concatenation function may be performed by the NR MAC layer or may be substituted with the multiplexing function of the NR MAC layer.

In the above description, the out-of-sequence delivery function of the NR RLC device refers to a function of directly transmitting RLC SDUs received from a lower layer to a higher layer regardless of their orders. The out-of-sequence delivery function may include a function of reassembling multiple RLC SDUs if one RLC SDU has been originally segmented into the multiple RLC SDUs and received. The out-of-sequence delivery function may include a function of storing the RLC SNs or PDCP SNs of received RLC PDUs, reordering their orders, and recording lost RLC PDUs.

The NR MAC 2d-15, 2d-30 may be connected to multiple NR RLC entities configured in one UE. Major functions of the NR MAC may include some of the following functions.

Mapping between logical channels and transport channels
Multiplexing/demultiplexing of the MAC SDUs
Scheduling information reporting
Error correction through HARQ
Priority handling between logical channels of one UE
Priority handling between the UEs by means of dynamic scheduling
MBMS service identification
Transport format selection
Padding The NR PHY layer 2d-20, 2d-25 may perform an operation of channel-coding and modulating higher layer data, generating the higher layer data into an OFDM symbol, and transmitting the OFDM symbol to a radio channel or demodulating an OFDM symbol received through a radio channel, channel-decoding the OFDM symbol, and transferring the OFDM symbol to a higher layer.

In the disclosure, a transmission stage device may be a base station or a UE, and a reception stage device may be a base station or a UE. That is, the disclosure may include a case where a transmission stage device is a base station and a reception stage device is a UE (downlink data transmission scenario) or a case where a transmission stage device is a UE and a reception stage device is a base station (uplink data transmission scenario). A transmission stage device may indicate a base station or a UE, and a reception stage device may indicate a base station or a UE.

Figure 2E:
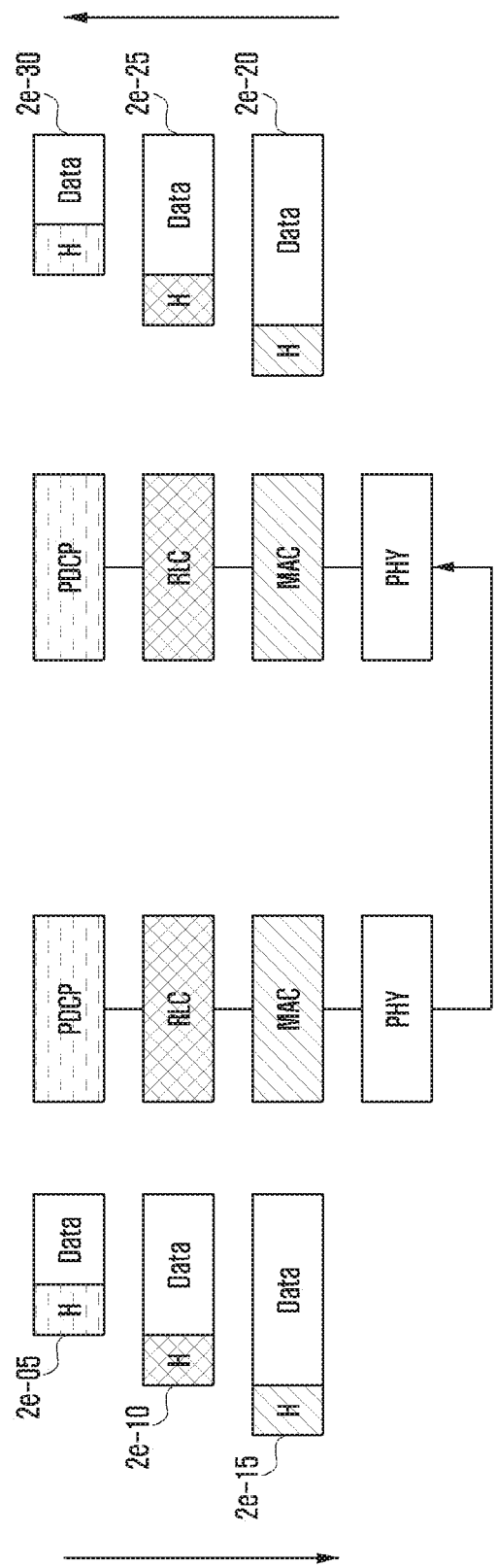
FIG. 2E is a diagram showing a procedure of data being processed in each layer in a next-generation mobile communication system according to an embodiment of the disclosure.

FIG. 2E is a diagram showing a procedure of data being processed in each layer in a next-generation mobile communication system according to an embodiment of the disclosure.

Referring to FIG. 2E, when an IP packet arrives at the PDCP entity, the PDCP layer may perform the function operation of the PDCP layer described in FIG. 2D, may configure a PDCP header, may configure data, such as 2e-05, and may deliver the data to a lower layer. The RLC layer, that is, a lower layer, recognizes the entire PDCP PDU 2e-05, received from the PDCP layer, as one datum, performs an operation according to the RLC layer function described in FIG. 2D, generates data 2e-10 by configuring an RLC header, and delivers the data to a lower layer. When the MAC entity, that is, a lower layer, receives the data 2e-10 from the RLC layer, that is, an RLC PDU 2e-10, it recognizes the entire RLC PDU as data, performs the function of the MAC entity described in FIG. 2D, completes data 2e-15 by configuring a MAC subheader, and performs transmission by delivering the MAC PDU 2e-15 to a lower layer.

When the reception stage MAC entity of FIG. 2E receives a MAC PDU 2e-20 from a lower layer, the MAC entity may read contents regarding a MAC header, considers all the remainders to be data, and delivers them to the RLC layer, that is, a higher layer. When the RLC layer reads the RLC PDU 2e-25, it reads only an RLC header corresponding to the RLC layer, performs a corresponding RLC layer function, and delivers a PDCP PDU 2e-30 to a higher layer. Likewise, the PDCP layer may read only a PDCP header, performs an operation corresponding to the PDCP entity, removes the PDCP header, and delivers the results to a higher layer.

As described above, each layer of a next-generation mobile communication system can read only a header corresponding to each layer, but cannot read a header or data of another layer. Accordingly, each layer manages and processes independent information.

Figure 2F:
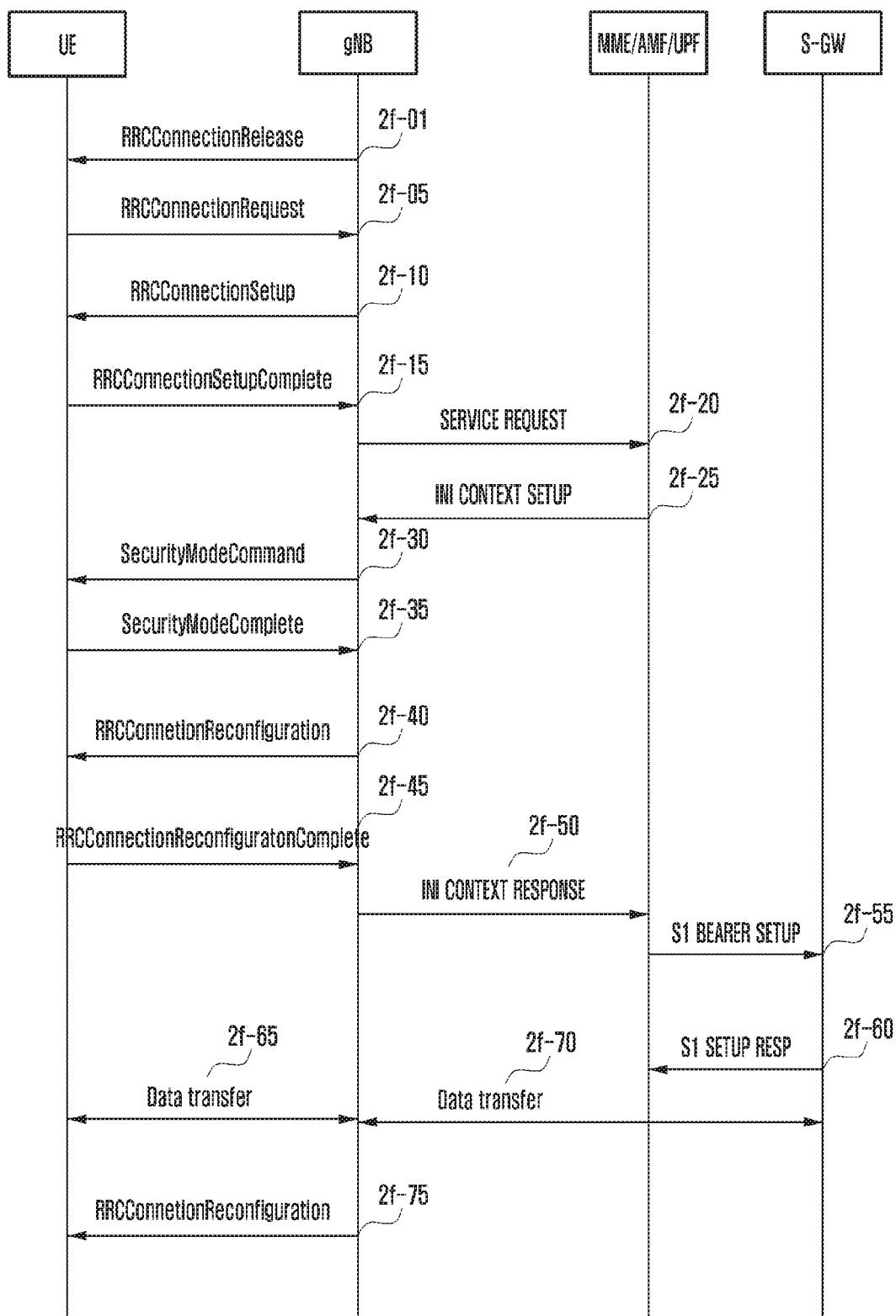
FIG. 2F is a diagram showing a procedure for a base station to configure a packet duplication function in a PDCP layer through an RRC message when a UE establishes a connection with a network according to an embodiment of the disclosure.

FIG. 2F is a diagram showing a procedure for an eNB to configure a packet duplication function in a PDCP layer through an RRC message when a UE establishes a connection with a network according to an embodiment of the disclosure.

FIG. 2F illustrates a procedure for a UE to switch from an RLC idle mode or an RRC inactive mode (or lightly-connected mode) to an RRC connected mode and to establish a connection with a network, and illustrates a procedure of configuring the uplink packet duplication function (PDCP packet duplication) of the PDCP layer. The procedure may be identically applied to configuring a downlink packet duplication function. The uplink packet duplication function configuration may be configured to configure both the uplink and downlink packet duplication functions.

Referring to FIG. 2F, when the UE transmitting and receiving data in the RRC connected mode does not transmit and receive data for a given cause or for a given time, a gNB may transmit an RRCConnectionRelease message to the UE so that the UE switches to the RRC idle mode (2f-01). Subsequently, when the UE with which a connection has not been currently established (hereinafter referred to as an "idle mode UE") has data to be transmitted, it performs an RRC connection establishment process with the gNB. If the UE is the RRC inactive mode, it may perform an RRC connection resume procedure by transmitting an RRCConnectionResumeRequest message. The UE establishes backward transmission synchronization with the gNB through a random access process and transmits an RRCConnectionRequest message to the gNB (2f-05). The message contains an ID and a cause (establishmentCause) for establishing the connection of the UE.

The gNB transmits an RRCConnectionSetup message to the UE so that the UE sets up an RRC connection (2f-10). The message (RRCConnectionSetup message) may configure whether or not to use a packet duplication function for each logical channel (logicalchannelconfig) or for each bearer or for each PDCP entity (PDCP-config). Specifically, the message may designate a primary RLC entity and a secondary RLC entity which are connected to a PDCP entity and may be used for packet duplication. The primary RLC entity or the secondary RLC entity may be indicated as a single RLC entity of a master cell group (MCG) or secondary cell group (SCG) or a logical channel ID. Furthermore, when two RLC entities are configured to be connected to the PDCP entity in the message, the message may configure a threshold that may be used in a split bearer. When the threshold operates as a split bearer, data may be transmitted to only the primary RLC entity when the amount of data to be transmitted is less than the threshold, and data may be transmitted to the primary RLC entity and the secondary RLC entity when the amount of data to be transmitted is greater than the threshold. The configured threshold and the primary RLC entity and the secondary RLC entity activate and use the packet duplication function in dual connectivity. When the packet duplication function is deactivated based on MAC control information, the configured threshold and the primary RLC entity and the secondary RLC entity may be fallen back as a split bearer and may continue to transmit and receive data. Furthermore, when the packet duplication function is configured in the message, the message may configure whether or not to active or deactivate the packet duplication function with respect to a data radio bearer (DRB). Alternatively, when the packet duplication function is configured, the message may designate the packet duplication function to be an activation state or a deactivation state. Specifically, in the case of a signaling radio bearer (SRB) not a data radio bearer, when the packet duplication function is configured, the message may designate the packet duplication function to be always activated. Alternatively, the message may designate the packet duplication function to be always deactivated. Furthermore, when the packet duplication function is configured, the message may designate an initial state as activation or deactivation. Furthermore, when the packet duplication function is configured, the message may designate a default RLC entity to which the PDCP entity will transmit data in the deactivation state. The default RLC entity may be designated as a primary RLC entity or a secondary RLC entity or may be indicated by a logical channel ID. Furthermore, in order to prevent configuration information from being unnecessarily increased in the message, when the packet duplication is configured and becomes the deactivation state, the PDCP entity may always transmit data to the primary RLC entity (convenience of an implementation can be improved because the primary RLC entity is always used in the activation state and the deactivation state). Furthermore, the message may include a logical channel ID to which packet duplication is applied and mapping information of cells to which packet duplication is applied. That is, when the packet duplication is applied, the message may perform a configuration, including mapping information regarding that data corresponding to which logical channel ID will be transmitted to which cells (the logical channel IDs may be configured to transmit data to only the mapped cells). When the packet duplication function is deactivated, the mapping relation of mapping information between the logical channel IDs and the cells configured in the message may be released, and data corresponding to the logical channel ID may be transmitted to a given cell. Furthermore, the message may include indication information indicating whether or not to perform packet duplication on PDCP control data (PDCP control PDU) for each bearer or for each logical channel. The indication information may indicate one RLC entity that will transmit data without transmitting two RLC layer data by applying packet duplication to the PDCP control data. The indicated RLC entity may be indicated as a primary RLC entity or a secondary RLC entity. If the indication information is not present, data may be always transmitted to the primary RLC entity. Furthermore, the message includes RRC connection configuration information. The RRC connection is also called a signaling radio bearer (SRB), and is used for the transmission and reception of an RRC message, that is, a control message between the UE and the gNB.

The UE that has established an RRC connection transmits an RRCConnetionSetupComplete message to the gNB (2*f*-15). If the gNB is unaware of the UE capability of a UE with which a connection is now established or wants to be aware of the UE capability, it may transmit, to the UE, a message asking the capability of the UE. Furthermore, the UE may transmit, to the gNB, a message that reports its own capability. The message may indicate whether the UE supports a new packet duplication function. An indicator indicating whether the UE supports a new packet duplication function may be included in the message and transmitted. The RRCConnetionSetupComplete message includes a control message called SERVICE REQUEST that the UE requests a bearer configuration for a given service from the MME or an access and mobility management function (AMF) or a user plane function (UPF) or a session management function (SMF).

The gNB transmits, to the MME or AMF or UPF or SMF, the SERVICE REQUEST message included in the RRCConnetionSetupComplete message (2*f*-20). The MME determines whether or not to provide a service requested by the UE. If, as a result of the determination, the MME has determined to provide the service requested by the UE, the MME or AMF or UPF or SMF transmits a message called INITIAL CONTEXT SETUP REQUEST to the gNB (2*f*-25). The message includes quality of service (QoS) information to be applied when a data radio bearer (DRB) is configured and information, such as security-related information (e.g., a security key, security algorithm) to be applied to a DRB.

The gNB transmits a SecurityModeCommand message 2*f*-30 to the UE in order to configure security with the UE. The UE transmits a SecurityModeComplete message 2*f*-35 to the gNB. When the security configuration is completed, the gNB transmits an RRCConnectionReconfiguration message to the UE (2*f*-40). The message (RRCConnectionReconfiguration message) may configure whether or not to use a packet duplication function for each logical channel (logicalchannelconfig) or for each bearer or for each PDCP entity (PDCP-config). Specifically, the message may designate a primary RLC entity and a secondary RLC entity which are connected to a PDCP entity and may be used for packet duplication. The primary RLC entity or the secondary RLC entity may be indicated as a single RLC entity of a master cell group (MCG) or secondary cell group (SCG) or a logical channel ID. Furthermore, when two RLC entities are configured to be connected to the PDCP entity in the message, the message may configure a threshold that may be used in a split bearer. When the threshold operates as a split bearer, data may be transmitted to only the primary RLC entity when the amount of data to be transmitted is less than the threshold, and data may be transmitted to the primary RLC entity and the secondary RLC entity when the amount of data to be transmitted is greater than the threshold. The configured threshold and the primary RLC entity and the secondary RLC entity activate and use the packet duplication function in dual connectivity. When the packet duplication function is deactivated based on MAC control information, the configured threshold and the primary RLC entity and the secondary RLC entity may be fallen back as a split bearer and may continue to transmit and receive data. Furthermore, when the packet duplication function is configured in the message, the message may configure whether or not to active or deactivate the packet duplication function with respect to a data radio bearer (DRB). Alternatively, when the packet duplication function is configured, the message may designate the packet duplication function to be an activation state or a deactivation state. Specifically, in the case of a signaling radio bearer (SRB) not a data radio bearer, when the packet duplication function is configured, the message may designate the packet duplication function to be always activated. Alternatively, the message may designate the packet duplication function to be always deactivated. Furthermore, when the packet duplication function is configured, the message may designate an initial state as activation or deactivation. Furthermore, when the packet duplication function is configured, the message may designate a default RLC entity to which the PDCP entity will transmit data in the deactivation state. The default RLC entity may be designated as a primary RLC entity or a secondary RLC entity or may be indicated by a logical channel ID. Furthermore, in order to prevent configuration information from being unnecessarily increased in the message, when the packet duplication is configured and becomes the deactivation state, the PDCP entity may always transmit data to the primary RLC entity (convenience of an implementation can be improved because the primary RLC entity is always used in the activation state and the deactivation state). Furthermore, the message may include a logical channel ID to which packet duplication is applied and mapping information of cells to which packet duplication is applied. That is, when the packet duplication is applied, the message may perform a configuration, including mapping information regarding that data corresponding to which logical channel ID will be transmitted to which cells (the logical channel IDs may be configured to transmit data to only the mapped cells). When the packet duplication function is deactivated, the mapping relation of mapping information between the logical channel IDs and the cells configured in the message may be released, and data corresponding to the logical channel ID may be transmitted to a given cell. Furthermore, the message may include indication information indicating whether or not to perform packet duplication on PDCP control data (PDCP control PDU) for each bearer or for each logical channel. The indication information may indicate one RLC entity that will transmit data without transmitting two RLC layer data by applying packet duplication to the PDCP control data. The indicated RLC entity may be indicated as a primary RLC entity or a secondary RLC entity. If the indication information is not present, data may be always transmitted to the primary RLC entity. Furthermore, the message may include configuration information of a DRB in which user data will be processed. The UE configures the DRB by applying the configuration information of the DRB, and transmits an RRCConnectionReconfigurationComplete message to the gNB (2f-45).

The gNB that has completed the DRB configuration with the UE transmits an INITIAL CONTEXT SETUP COMPLETE message to the MME (2f-50). The MME that has received the message transmits an Si BEARER SETUP message to the S-GW in order to set up an Si bearer with the S-GW (2f-55). The S-GW transmits an Si BEARER SETUP RESPONSE message to the MME (2f-60). The Si bearer is a connection for data transmission set up between the S-GW and the gNB, and corresponds to a DRB in a one-to-one manner. When the process is fully completed, the UE transmits and receives data to and from the gNB and the S-GW (2f-65, 2f-70).

As described above, the known data transmission process basically includes three operations of an RRC connection configuration, a security configuration, and a DRB configuration. Furthermore, the gNB may transmit an RRCConnectionReconfiguration message (2f-75) in order to newly provide a configuration to the UE or to add or change a configuration for a given cause. The message (RRCConnectionReconfiguration message) may configure whether or not to use a packet duplication function for each logical channel (logicalchannelconfig) or for each bearer or for each PDCP entity (PDCP-config). Specifically, the message may designate a primary RLC entity and a secondary RLC entity which are connected to a PDCP entity and may be used for packet duplication. The primary RLC entity or the secondary RLC entity may be indicated as a single RLC entity of a master cell group (MCG) or secondary cell group (SCG) or a logical channel ID. Furthermore, when two RLC entities are configured to be connected to the PDCP entity in the message, the message may configure a threshold that may be used in a split bearer. When the threshold operates as a split bearer, data may be transmitted to only the primary RLC entity when the amount of data to be transmitted is less than the threshold, and data may be transmitted to the primary RLC entity and the secondary RLC entity when the amount of data to be transmitted is greater than the threshold. The configured threshold and the primary RLC entity and the secondary RLC entity activate and use the packet duplication function in dual connectivity. When the packet duplication function is deactivated based on MAC control information, the configured threshold and the primary RLC entity and the secondary RLC entity may be fallen back as a split bearer and may continue to transmit and receive data. Furthermore, when the packet duplication function is configured in the message, the message may configure whether or not to active or deactivate the packet duplication function with respect to a data radio bearer (DRB). Alternatively, when the packet duplication function is configured, the message may designate the packet duplication function to be an activation state or a deactivation state. Specifically, in the case of a signaling radio bearer (SRB) not a data radio bearer, when the packet duplication function is configured, the message may designate the packet duplication function to be always activated. Alternatively, the message may designate the packet duplication function to be always deactivated. Furthermore, when the packet duplication function is configured, the message may designate an initial state as activation or deactivation. Furthermore, when the packet duplication function is configured, the message may designate a default RLC entity to which the PDCP entity will transmit data in the deactivation state. The default RLC entity may be designated as a primary RLC entity or a secondary RLC entity or may be indicated by a logical channel ID. Furthermore, in order to prevent configuration information from being unnecessarily increased in the message, when the packet duplication is configured and becomes the deactivation state, the PDCP entity may always transmit data to the primary RLC entity (convenience of an implementation can be improved because the primary RLC entity is always used in the activation state and the deactivation state). Furthermore, the message may include a logical channel ID to which packet duplication is applied and mapping information of cells to which packet duplication is applied. That is, when the packet duplication is applied, the message may perform a configuration, including mapping information regarding that data corresponding to which logical channel ID will be transmitted to which cells (the logical channel IDs may be configured to transmit data to only the mapped cells). When the packet duplication function is deactivated, the mapping relation of mapping information between the logical channel IDs and the cells configured in the message may be released, and data corresponding to the logical channel ID may be transmitted to a given cell. Furthermore, the message may include indication information indicating whether or not to perform packet duplication on PDCP control data (PDCP control PDU) for each bearer or for each logical channel. The indication information may indicate one RLC entity that will transmit data without transmitting two RLC layer data by applying packet duplication to the PDCP control data. The indicated RLC entity may be indicated as a primary RLC entity or a secondary RLC entity. If the indication information is not present, data may be always transmitted to the primary RLC entity.

Figure 2G:
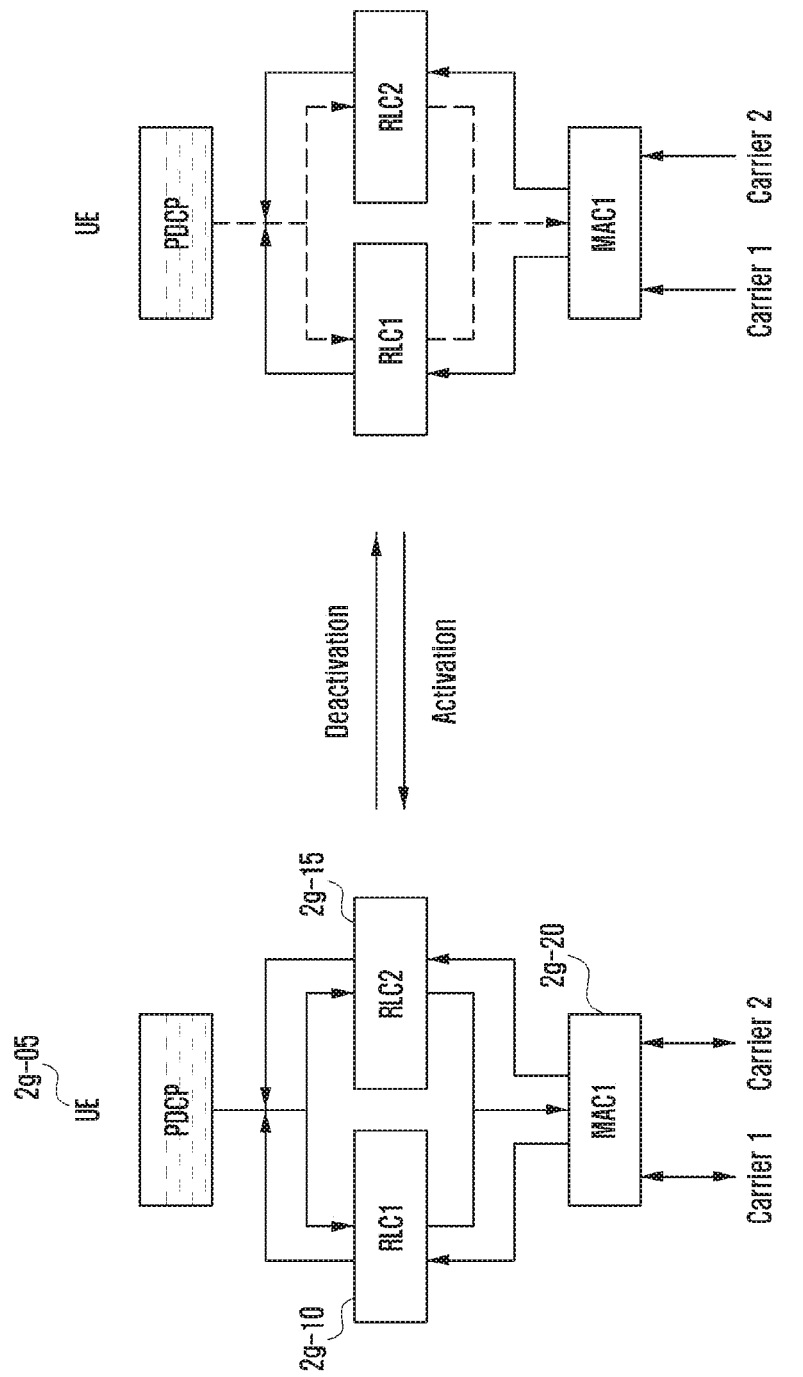
FIG. 2G is a diagram showing a 2-1 embodiment of packet duplication in which the PDCP layer duplicates a packet and transmits the packet based on a carrier aggregation in a next-generation mobile communication system according to an embodiment of the disclosure.

FIG. 2G is a diagram showing a 2-1 embodiment of packet duplication in which the PDCP layer duplicates a packet and transmits the packet based on a carrier aggregation in a next-generation mobile communication system according to an embodiment of the disclosure.

Referring to FIG. 2G, as in FIG. 2F, when an RRC message is received, a UE 2g-05 may configure a bearer (DRB or SRB) based on configuration information received in the message, and may configure a PDCP entity, RLC entity, MAC entity corresponding to each bearer. If packet duplication (PDCP packet duplication) is to be configured based on a carrier aggregation with respect to a bearer or PDCP entity or logical channel, a gNB may configure, in the UE, two RLC entities 2g-10 and 2g-15 to be connected to the PDCP entity and a MAC entity 2g-20 with respect to the bearer. The two RLC entities may be configured with a primary RLC entity 2g-10 and a secondary RLC entity 2g-15, and may be indicated using a logical channel ID (LCID). As described above, if packet duplication is configured based on a carrier aggregation, an initial state may become an activation state right after the configuration or may immediately become a deactivation state based on the configuration information of the RRC message. If the bearer is an SRB, the initial state may immediately become an activation state. The gNB may indicate whether or not to activate packet duplication with respect to the bearer through a MAC control element. To indicate whether or not to activate or deactivate packet duplication using MAC control information is transmitted from the gNB to the UE. Whether or not to activate or deactivate packet duplication is control information on uplink packet duplication. Accordingly, downlink packet duplication may be used or not depending on an implementation of the gNB. Accordingly, when the primary RLC entity and the secondary RLC entity for the packet duplication are configured, the UE may have to always perform a reception operation in the activation state.

For a detailed operation of FIG. 2G, reference is made to the description of FIG. 1G.

Figure 2H:
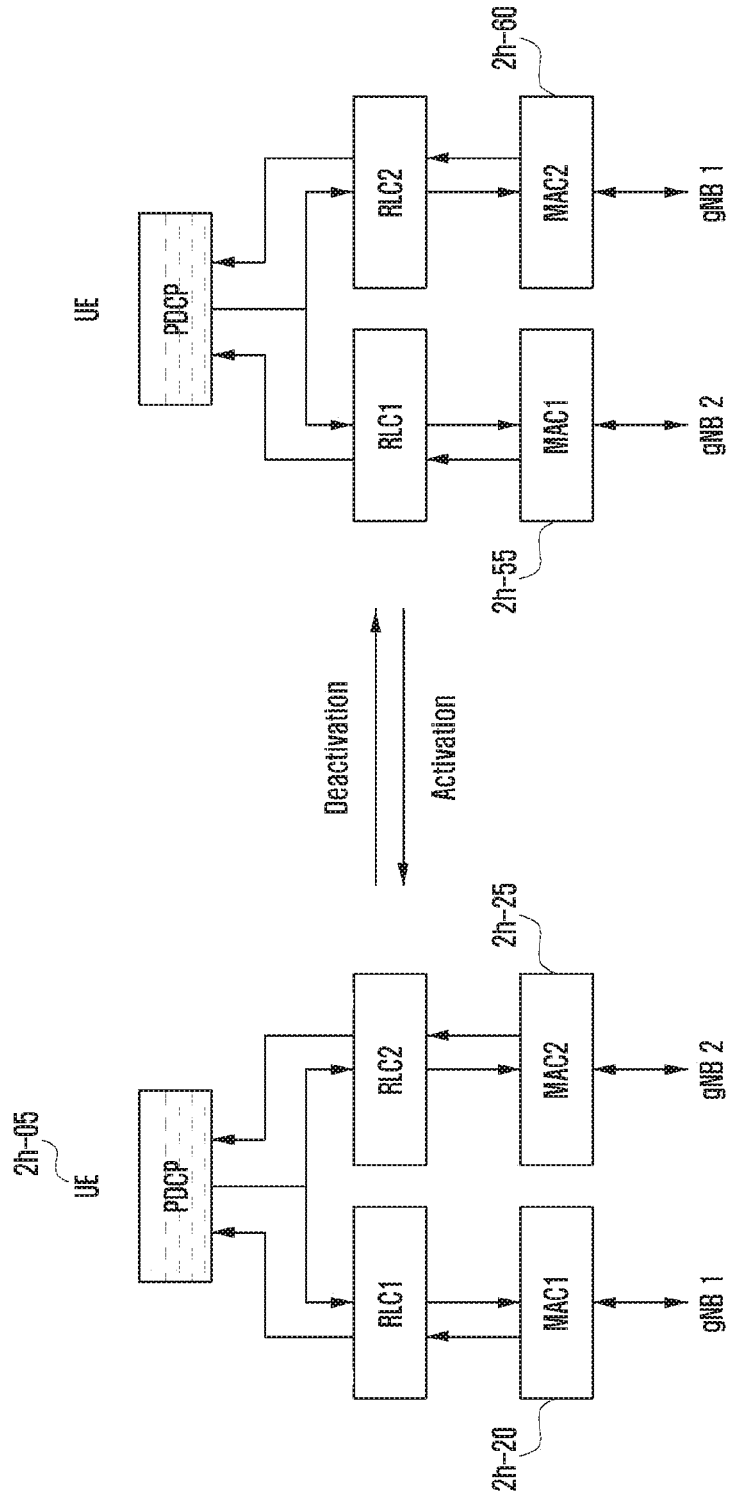
FIG. 2H is a diagram showing a 2-2 embodiment of packet duplication in which the PDCP layer duplicates and transmits a packet based on dual connectivity in a next-generation mobile communication system according to an embodiment of the disclosure.

FIG. 2H is a diagram showing a 2-2 embodiment of packet duplication in which the PDCP layer duplicates and transmits a packet based on dual connectivity in a next-generation mobile communication system according to an embodiment of the disclosure.

In FIG. 2H, as in FIG. 2F, when a UE 2h-05 receives an RRC message, the UE may configure a bearer (DRB or SRB) based on configuration information received in the message, and may configure a PDCP entity, RLC entities and MAC entities correspond to each bearer. If packet duplication (PDCP packet duplication) is to be configured based on dual connectivity with respect to a bearer or PDCP entity or logical channel, a gNB may configure, in the UE, two RLC entities 2h-10 and 2h-15 to be connected to the PDCP entity with respect to the bearer. The two RLC entities may be configured as a primary RLC entity 2h-10 and a secondary RLC entity 2h-15, and may be indicated using a logical channel ID (LCID) and a cell group ID. As described above, if packet duplication is configured based on dual connectivity, an initial state may become an activation state right after the configuration or may immediately become a deactivation state based on the configuration information of the RRC message. If the bearer is an SRB, the initial state may immediately become an activation state. A gNB may indicate whether or not to activate or deactivate packet duplication with respect to the bearer using a MAC control element. To indicate whether or not to activate or deactivate packet duplication using MAC control information is transmitted from the gNB to the UE. Whether or not to activate or deactivate packet duplication is control information on uplink packet duplication. In the above description, the gNB may transmit the MAC control information, indicating whether to activate or deactivate uplink packet duplication, to MAC entities 2h-20 and 2h-55 corresponding to a master cell group or MAC entities 2h-25 and 2h-60 corresponding to a secondary cell group. Alternatively, the gNB may always transmit the MAC control information to only the MAC entities corresponding to a master cell group because the master cell group is always activated, for convenience of an implementation. Unlike the uplink packet duplication, downlink packet duplication may be used or not depending on an implementation of the gNB. Accordingly, when a primary RLC entity and secondary RLC entity for packet duplication are configured, the UE may have to always perform a reception operation in the activation state.

For a detailed operation of FIG. 2H, reference is made to the description of FIG. 1H.

Figure 2I:
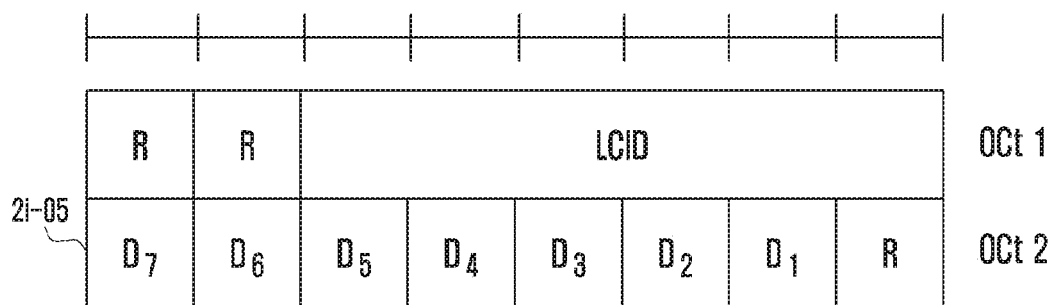
FIG. 2I is a diagram illustrating medium access control (MAC) control information indicative of the activation or deactivation of packet duplication according to an embodiment of the disclosure.

FIG. 2I is a diagram illustrating MAC control information indicative of the activation or deactivation of packet duplication according to an embodiment of the disclosure.

In the 2-1 embodiment and 2-2 embodiment of the disclosure, in order to indicate the activation or deactivation of packet duplication for each bearer or for each logical channel, MAC control information (MAC control element (MAC CE)), such as FIG. 2I, may be used. In the MAC control information, a logical channel ID (LCID) indicates that the MAC control information is MAC control information indicative of the activation or deactivation of packet duplication, and may use a bitmap having 1 byte size like 2i-05 based on the bitmap. The $D_7, D_6, \ldots D_1$ fields of the bitmap are mapped to a UE in ascending order of the ID values of bearers for which a packet duplication function has been configured. That is, for example, if a base station has configured packet duplication in a UE with respect to bearers having bearer ID values of 1, 3, and 5, the $D_1$ field may indicate a bearer having the bearer ID 1, the $D_2$ field may indicate a bearer having the bearer ID 3, and the $D_3$ field may indicate a bearer having the bearer ID 5. Furthermore, if a 1-bit value of each of the $D_7, D_6, \ldots, D_1$ fields is 0, it may indicate the deactivation of packet duplication of a corresponding bearer. If the 1-it value is 1, it may indicate the activation of packet duplication of a corresponding bearer.

In the disclosure, a base station may transmit the MAC control information in order to indicate the activation or deactivation of packet duplication for each bearer or for each logical channel. As in the 2-1 embodiment of the disclosure, if a UE performs packet duplication based on a carrier aggregation, a base station may indicate the activation or deactivation of the packet duplication for each bearer or for each logical channel with respect to a UE MAC entity by transmitting the MAC control information to a given carrier or cell in terms of implementation. As another method, a base station may indicate the activation or deactivation of packet duplication by always transmitting the MAC control information to a primary cell (PCell) for convenience of an implementation because the primary cell is always connected when a carrier aggregation is used. Furthermore, as in the 2-2 embodiment of the disclosure, if a UE performs packet duplication based on dual connectivity, a base station may indicate the activation or deactivation of the packet duplication for each bearer or for each logical channel with respect to a UE MAC entity by transmitting the MAC control information to a given cell group (master cell group or secondary cell group) in terms of implementation. As another method, a base station may indicate the activation or deactivation of the packet duplication by always transmitting the MAC control information to a primary cell group (master cell group (MCG)) for convenience of an implementation because the primary cell group is always connected when dual connectivity is used.

The packet duplication proposed and described in the 2-1 embodiment and 2-2 embodiment of the disclosure may be applied to the user data (PDCP data PDU) of a PDCP entity. The above packet duplication proposed and described in the 2-1 embodiment and 2-2 embodiment may be identically applied to the control data (PDCP control PDU) of a PDCP entity. That is, PDCP layer control data (PDCP layer status report or feedback for a header compression protocol) may be generated by applying the 2-1 embodiment or the 2-2 embodiment to the PDCP layer status report or feedback for a header compression protocol (Interspersed ROHC feedback) generated in the PDCP entity, and packet duplication may be performed on a primary RLC entity and a secondary RLC entity.

In the disclosure, however, there is provided a method of processing control data of a PDCP entity in a bearer for which packet duplication has been configured for a reduction in the amount of unnecessary data processing of a receiving stage PDCP entity and for a smooth operation of a header compression/decompression protocol if header compression has been configured (robust header compression (ROHC)). The control data (PDCP control PDU) of the PDCP entity may include a PDCP layer status report on information on data that has been successfully received or not received in the PDCP entity and feedback for a header compression protocol (Interspersed ROHC feedback) capable of transmitting whether header decompression is successful and configuration information as feedback if the header compression protocol (ROHC) has been configured.

The 2-3a embodiment of the disclosure in which the control data of the PDCP entity is processed in packet duplication based on a carrier aggregation or packet duplication based on dual connectivity is described below.

Figure 2J:
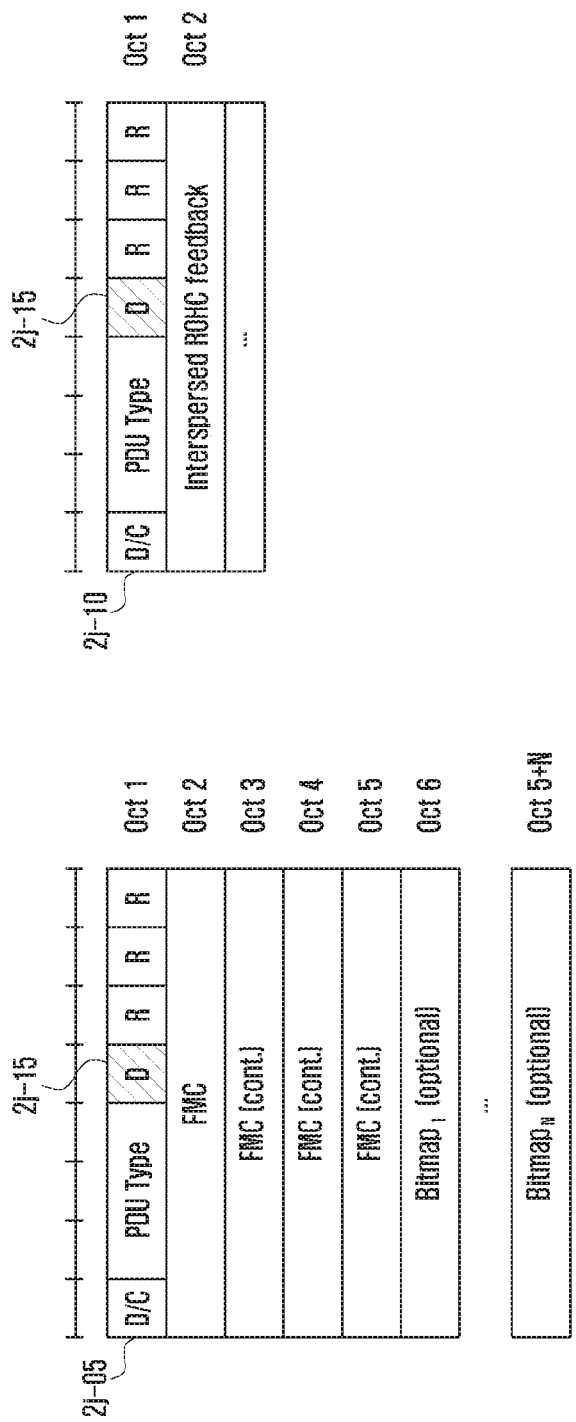
FIG. 2J is a diagram illustrating a 2-3 embodiment in which the control data of a PDCP entity is processed in packet duplication based on a carrier aggregation or packet duplication based on dual connectivity according to an embodiment of the disclosure.

FIG. 2J is a diagram illustrating a 2-3 embodiment in which the control data of a PDCP entity is processed in packet duplication based on a carrier aggregation or packet duplication based on dual connectivity according to an embodiment of the disclosure.

The 2-3a embodiment of the disclosure proposes the introduction of a new D field 2j-15 in order to prevent unnecessary data processing from being duplicated and performed when a PDCP layer status report, such as FIG. 2J-05, or feedback for a header compression protocol (Interspersed ROHC feedback), such as FIG. 2J-10, is duplicated and received by a receiving stage according to packet duplication. The D field may be defined by 1 bit or 2 bits. If the D field is defined by 1 bit, it may indicate whether PDCP layer control data is the original data or duplicated data. That is, the D field may indicate the original data when the bit is 0 and indicate duplicated (copied) data when the bit is 1 upon packet duplication. However, the D field may indicate duplicated (copied) data when the bit is 0 and indicate the original data when the bit is 1 upon packet duplication. Alternatively, the D field may indicate data transmitted by a primary RLC entity when the bit is 0 and indicate data transmitted by a secondary RLC entity when the bit is 1 upon packet duplication. However, the D field may indicate data transmitted by a secondary RLC entity when the bit is 0 and indicate data transmitted by a primary RLC entity when the bit is 1 upon packet duplication. In the above description, a PDU type field may indicate when the PDCP layer control data is a PDCP layer status report or feedback for a header compression protocol (Interspersed ROHC feedback).

Furthermore, the newly introduced D field may be defined by 2 bits. Furthermore, each of the two bits may indicate that duplication transmission has been performed from which one of two RLC entities.

Accordingly, if duplicated PDCP layer control data is received by a receiving stage PDCP entity using the D field proposed in the disclosure, the PDCP layer control data can be immediately discarded without duplicating and performing unnecessary data processing if the PDCP layer control data is already received PDCP layer control data by checking the D field.

The 2-3b embodiment of the disclosure in which the control data of the PDCP entity is processed based on packet duplication based on a carrier aggregation or packet duplication based on dual connectivity is described below.

Figure 2K:
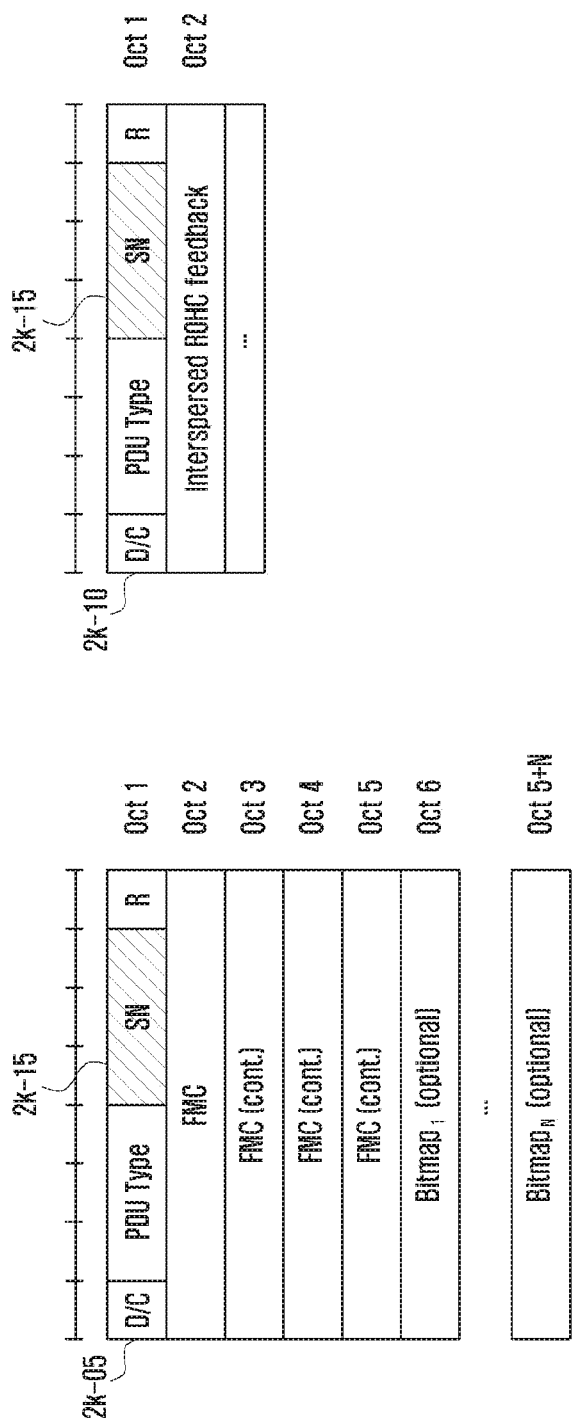
FIG. 2K is a diagram illustrating a 2-4 embodiment in which the control data of the PDCP entity is processed in packet duplication based on a carrier aggregation or packet duplication based on dual connectivity according to an embodiment of the disclosure.

FIG. 2K is a diagram illustrating a 2-4 embodiment in which the control data of the PDCP entity is processed in packet duplication based on a carrier aggregation or packet duplication based on dual connectivity according to an embodiment of the disclosure.

The 2-3a embodiment of the disclosure proposes the introduction of a new sequence number (SN) field (for PDCP control PDU) 2k-15 in order to prevent unnecessary data processing from being duplicated and performed when a PDCP layer status report, such as FIG. 2K-05, or feedback for a header compression protocol (Interspersed ROHC feedback), such as FIG. 2K-10, is duplicated and received by a receiving stage according to packet duplication. The SN field may be defined by 2 bits or 3 bits or 4 bits. The sequence number of the SN field may be increased by 1 whenever PDCP layer control data is transmitted. The sequence number may be allocated in such a manner that it increases from 0 up to a $2^{\wedge}(bit\ length)-1$ value and then returns back to 0. In the above description, when the sequence number is increased, an individual SN field may be used for a PDCP layer status report or feedback for a header compression protocol (Interspersed ROHC feedback). That is, an SN field for the PDCP layer status report and an SN field for the feedback for a header compression protocol (Interspersed ROHC feedback) may be independently defined and used. Alternatively, for convenience of an implementation, the SN field for the PDCP layer status report and the SN field for the feedback for a header compression protocol (Interspersed ROHC feedback) are not separately divided, but the sequence number of the SN field may be increased by 1 whenever one of the two PDCP layer control data is transmitted by sharing one SN field. In the above description, a PDU type field may indicate whether the PDCP layer control data is a PDCP layer status report or feedback for a header compression protocol (Interspersed ROHC feedback).

In the above description, if the SN field is used, when PDCP layer control data is duplicated and transmitted to a primary RLC entity and a secondary RLC entity, duplication transmission may be performed by allocating the same sequence number value of the SN field. Accordingly, a reception PDCP entity can immediately discard unnecessarily duplicated and received PDCP layer control data without processing the PDCP layer control data using the SN field if the PDCP layer control data having the same sequence number value is duplicated and received.

Furthermore, a transmission PDCP entity and a reception PDCP entity may define and use new state variables in order to assign, compare, increase and operate the introduced sequence number SN field value. For example, a transmission stage may define TX_PDCP_CONTROL_SN to assign the sequence number of PDCP layer control data. A receiving stage may define RX_PDCP_CONTROL_SN to check and update the sequence number of received PDCP layer control data and to perform duplicate detection on the sequence number. If necessary, a reception PDCP entity may drive a PUSH reception window or a PULL reception window based on a sequence number of the SN field, and may apply a timer.

Accordingly, when a receiving stage PDCP entity receives duplicated PDCP layer control data using the SN field proposed in the disclosure, the receiving stage PDCP entity can immediately discard the PDCP layer control data without duplicating and performing unnecessary data processing if the PDCP layer control data is already received PDCP layer control data by checking the SN field.

A 2-3c embodiment of the disclosure in which the control data of a PDCP entity is processed in packet duplication based on a carrier aggregation or packet duplication based on dual connectivity is described below.

The 2-3c embodiment of the disclosure proposes that packet duplication is not applied to PDCP layer control data in order to prevent unnecessary data processing from being duplicated and performed when a PDCP layer status report, such as FIG. 2K-05, or feedback for a header compression protocol (Interspersed ROHC feedback), such as FIG. 2K-10, is duplicated and received by a receiving stage according to packet duplication.

The 2-3c embodiment proposes that if the gNB has configured packet duplication for each bearer or for each logical channel using an RRC message and has activated the packet duplication or has activated the packet duplication using MAC control information in FIG. 2F, the UE applies the packet duplication to only PDCP layer user data (PDCP data PDU) and does not apply the packet duplication to PDCP layer control data (PDCP control PDU). Furthermore, in FIG. 2F, if an RLC entity (primary RLC entity or secondary RLC entity) to which PDCP layer control data will be transmitted is indicated using an RRC message, PDCP layer control data may be transmitted to only the indicated RLC entity. Alternatively, if a packet duplication function has been activated for convenience of an implementation, the UE does not apply the packet duplication function to PDCP layer control data, but may transmit PDCP layer control data to only a primary RLC entity that is always connected. The primary RLC entity may be configured to be an RLC entity corresponding to which bearer ID or which logical channel ID within which cell group through an RRC message, as described in FIG. 2F.

Accordingly, as proposed in the disclosure, a receiving stage PDCP entity may not duplicate and receive PDCP layer control data because the packet duplication is not applied to the PDCP layer control data.

Figure 2L:
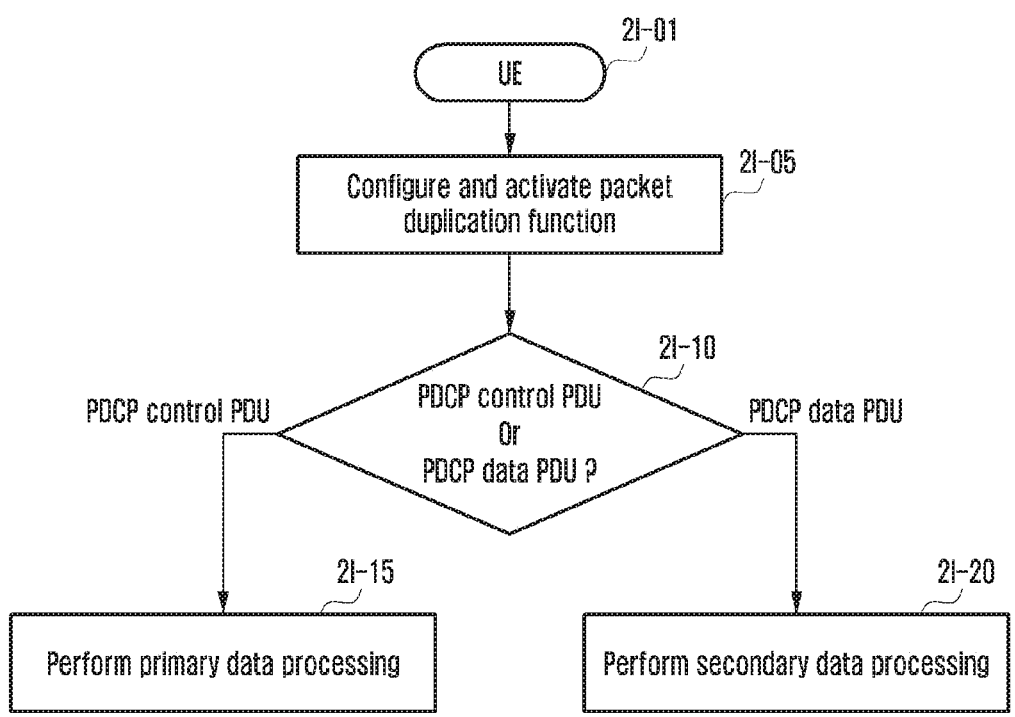
FIG. 2L is a diagram showing a UE operation when the PDCP layer performs packet duplication based on a carrier aggregation or dual connectivity in a next-generation mobile communication system according to an embodiment of the disclosure.

FIG. 2L is a diagram showing a UE operation when the PDCP layer performs packet duplication based on a carrier aggregation or dual connectivity in a next-generation mobile communication system according to an embodiment of the disclosure.

Referring to FIG. 2L, as in FIG. 2F, when a UE 2*l*-01 receives an RRC message, the UE may configure a bearer (DRB or SRB) based on configuration information received in the message, and may configure a PDCP entity, RLC entities and MAC entities correspond to each bearer. If packet duplication (PDCP packet duplication) is to be configured based on a carrier aggregation or dual connectivity with respect to a bearer or PDCP entity or logical channel, a gNB may configure, in the UE 2*l*-01, two RLC entities to be connected to the PDCP entity with respect to the bearer. The two RLC entities may be configured as a primary RLC entity and a secondary RLC entity, and may be indicated using a logical channel ID (LCID). As described above, if packet duplication is configured based on dual connectivity, an initial state may become an activation state right after the configuration or may immediately become a deactivation state based on the configuration information of the RRC message. If the bearer is an SRB, the initial state may immediately become an activation state. The gNB may indicate whether or not to activate or deactivate packet duplication with respect to the bearer using a MAC control element. To indicate whether or not to activate or deactivate packet duplication using MAC control information is transmitted from the gNB to the UE 2*l*-01. Whether or not to activate or deactivate packet duplication is control information on uplink packet duplication. An activation state may be configured using the MAC control information (2*l*-05).

When a PDCP entity for which packet duplication has been activated duplicates and transmits a packet, first, the UE 2*l*-01 identifies data to which the packet duplication is to be applied (2*l*-10). The UE 2*l*-01 identifies whether the data to which the packet duplication is to be applied is a PDCP data PDU or a PDCP control PDU. If the data is PDCP layer user data (PDCP data PDU) (2*l*-20), the UE may perform secondary data processing. In the above description, the secondary data processing indicates that the packet of the PDCP layer user data is duplicated and transmitted to a primary RLC entity and a secondary RLC entity, as described in FIGS. 2G and 2H. If, as a result of the identification of the data to which the packet duplication is to be applied (2*l*-10), the data is PDCP layer control data (PDCP control PDU) (2*l*-15), the UE may perform primary data processing. In the above description, the primary data processing indicates that data is processed using the 2-3a embodiment or the 2-3b embodiment or the 2-3c embodiment proposed in the disclosure.

In the methods applied to PDCP layer control data of packet duplication proposed in 2-3a, 2-3b, and 2-3c embodiments of the disclosure, data is identified when the packet duplication is applied, and different data processing is performed on PDCP layer user data and PDCP layer control data.

The following embodiments of the disclosure describe a problem that may occur in a polling operation when an RLC layer operates in the AM and propose a method for solving the problem.

When an RLC layer operates in the AM, the RLC layer of a transmission stage may receive an RLC status report (RLC status PDU) transmitted by the RLC layer of a receiving stage, may identify RLC PDUs that have not been successfully received, and may perform retransmission in order to guarantee lossless data transmission. Furthermore, when a given condition is satisfied, the transmission stage RLC layer may put a polling bit into an RLC header and transmit it in order to request an RLC status report from the receiving stage RLC layer. Furthermore, the transmission stage RLC layer stores the RLC sequence number of the RLC header into which the polling bit has been put in a variable POLL_SN, and drives a t-PollRetransmit timer. If successful delivery (ACK/NACK) corresponding to the POLL_SN is not identified until the timer expires, the transmission stage RLC entity may put a polling bit into a new RLC PDU or an RLC PDU for retransmission and perform polling again. In the above description, to request an RLC status report by setting the polling bit (setting the poll bit to 1) is called polling.

A procedure for the transmission stage RLC entity to receive an RLC SDU (PDCP PDU) from a higher layer and to assign an RLC sequence number is described below.

First, a TX_Next variable may be defined as a variable having an RLC sequence number assigned to a newly generated AMD PDU.

TX_Next—Send state variable

This state variable holds the value of the SN to be assigned for the next n ewly generated AMD PDU. It is initially set to 0, and is updated whenever the AM R LC entity constructs an AMD PDU with SN=TX_Next and contains an RLC SDU or the last segment of an RLC SDU.

The first operation of the transmission stage RLC entity is described below.

When an RLC SDU (PDCP PDU) is received from a higher layer, the transmission stage RLC entity may assign a value corresponding to a TX_Next value in order to assign an RLC sequence number to the RLC SDU, may generate an RLC header, and may configure an AMD PDU. Furthermore, the transmission stage RLC entity may increase the TX_Next value by 1 (in order to assign a next RLC sequence number to a next RLC SDU). That is, the transmission stage RLC entity assigns an RLC sequence number, configures an AMD PDU, and updates a TX_Next variable, that is, increases a TX_Next variable by 1, whenever it receives an RLC SDU. Furthermore, a split operation is performed. When the transmission stage RLC entity transmits a segment to a lower layer, it configures an AMD PDU by assigning the same RLC sequence number as an RLC sequence number assigned to an RLC SDU to which the segment belongs, and delivers the configured AMD PDU.

For each RLC SDU received from the upper layer, the AM RLC entity shall:
associate a SN with the RLC SDU equal to TX_Next and construct an AMD PDU by setting the SN of the AMD PDU to TX_Next;
increment TX_Next by one.

When submitting an AMD PDU that contains a segment of an RLC SDU, to lower layer, the transmitting side of an AM RLC entity shall:
set the SN of the AMD PDU to the SN of the corresponding RLC SDU.

When a given condition is satisfied in the transmission stage RLC entity, the transmission stage may perform polling by setting a poll bit. The given condition may include a case where a transmission stage RLC entity has sent a specific amount of RLC SDUs or more down to a lower layer (has transmitted) or a case where a transmission stage RLC entity has sent a specific amount of RLC SDUs or more down to a lower layer (has transmitted) or a case where a buffer is empty (other than data waiting for retransmission or in order to identify successful delivery or already transmitted data) or a case where a window has paused (window stall, if the window no longer moves due to lost data and if all data within the window has been transmitted) or a condition in which t-PollRetransmit has expired.

The second operation of the transmission stage RLC entity is described below.

The transmission stage RLC entity performs the following procedure when performing polling. When one of the conditions is satisfied, the transmission stage RLC entity sets the poll bit of an RLC header to 1, configures an AMD PDU, and delivers the AMD PDU to a lower layer. Thereafter, the transmission stage RLC entity sets POLL_SN as TX_Next−1, triggers a t-PollRetransmit timer if the timer is not driven, and restarts the timer if the timer is being driven. In the above description, POLL_SN is a variable having a TX_Next−1 value when an AMD PDU whose poll bit has been set to 1 is transmitted most recently.

POLL_SN—Poll send state variable

This state variable holds the value of TX_Next−1 upon the most recent t ransmission of an AMD PDU with the poll bit set to "1". It is initially set to 0.

After submitting an AMD PDU including a poll to lower layer and after incrementing of TX_Next if necessary, the transmitting side of an AM RLC entity shall:
set POLL_SN to TX_Next−1;
if t-PollRetransmit is not running:
start t-PollRetransmit;
else:
restart t-PollRetransmit;

The third operation of the transmission stage RLC entity is described below.

As described above, after the transmission stage RLC entity performs polling, if an RLC status report is received, the transmission stage RLC entity identifies whether the RLC sequence numbers of AMD PDUs transmitted in the RLC status report have been successfully delivered. If the successful delivery of data having the same RLC sequence number as POLL_SN is identified, the transmission stage RLC entity stops the t-PollRetransmit timer if the timer is driven. The reason for this is that the timer is stopped in order to prevent unnecessary polling because polling is triggered again when the timer expires.

Upon reception of a STATUS report from the receiving RLC AM entity the transmitting side of an AM RLC entity shall:
if the STATUS report comprises a positive or negative acknowled gement for the RLC SDU with sequence number equal to POLL_SN:
if t-PollRetransmit is running:
stop and reset t-PollRetransmit.

The fourth operation of the transmission stage RLC entity is described below.

When the t-PollRetransmit timer expires, the transmission RLC entity may perform polling again. However, if a transmission buffer or a retransmission buffer is empty or if new data can be no longer transmitted because a window is stopped, the transmission RLC entity may perform retransmission on an RLC SDU or RLC PDU having an RLC sequence number corresponding to TX_Next−1 or on RLC SDU or RLC PDU whose successful delivery has not been identified, may set the poll bit of the RLC header of data on which retransmission is performed to 1, and may perform polling again.

Upon expiry of t-PollRetransmit, the transmitting side of an AM RLC entity shall:
if both the transmission buffer and the retransmission buffer are empty (excluding transmitted RLC SDU or RLC SDU segment awaiting acknowledgements); or
if no new RLC SDU or RLC SDU segment can be transmitted (e.g. due to window stalling):
consider the RLC SDU with SN=TX_Next−1 for retransmission; or
consider any RLC SDU which has not been positively acknowledged f or retransmission;
include a poll in an AMD PDU as described in section 5.3.3.2.

The following problems may occur in the first, second, third and fourth operations of the transmission stage RLC entity described in the embodiments of the disclosure.

In the first operation of the transmission stage RLC entity, the transmission stage RLC entity may assign an RLC sequence number whenever it receives data (RLC SDU) from a higher layer. In the case of a high data transmission rate, that is, if a lot of data is delivered to an RLC layer, the transmission stage RLC entity may have assigned an RLC sequence number by pre-processing the data and may have generate AMD PDUs because the TX_Next value is increased. In the above description, the data pre-processing may refer to processing for pre-processing, configuring and generating data before an uplink transmission resource is received. Furthermore, when an uplink transmission resource is received, the transmission stage RLC entity may deliver the pre-processed AMD PDUs to a lower layer for transmission. Accordingly, the TX_Next value may indicate a next value of the highest RLC sequence number value among data to which RLC sequence numbers have been assigned although the data has not yet been transmitted. However, in the second operation of the transmission stage RLC entity, POLL_SN may be set as the RLC sequence number value of data that has not yet been actually transmitted when polling is performed because POLL_SN is set as a TX_Next−1 value.

Accordingly, in the third operation of the transmission stage RLC entity, successful delivery corresponding to the POLL_SN cannot be identified in an RLC status report. The reason for this is that a receiving stage cannot report whether data that has not yet been transmitted has been successfully delivered. Accordingly, in the third operation of the transmission stage RLC entity, the t-PollRetransmit timer cannot be stopped, and thus an unnecessary polling procedure is performed when the timer expires. Furthermore, in the fourth operation of the transmission stage RLC entity, when polling is performed again, the retransmission of data having an RLC sequence number corresponding to TX_Next−1 may be taken into consideration. The retransmission should not be taken into consideration because the TX_Next value may indicate a next value of the highest RLC sequence number value among data to which RLC sequence numbers have been assigned although the data has not yet been transmitted as described above.

The following embodiment of the disclosure proposes methods for solving a problem in that an RLC status report is unnecessarily requested due to the transmission of unnecessary polling.

The most efficient method for solving the problem is to modify the definition of POLL_SN and to modify corresponding operations. That is, POLL_SN may indicate the RLC sequence number of the last AMD PDU that belongs to AMD PDUs delivered to a lower layer, that has a poll bit set to 1 and that has been polled. In other words, POLL_SN may indicate the RLC sequence number of an AMD PDU that has a poll bit set to 1 and that has been finally delivered to a lower layer. That is, POLL_SN may indicate the RLC sequence number of an AMD PDU that belongs to AMD PDUs having their poll bits set and delivered to a lower layer and that has been finally delivered the lower layer.

c) POLL_SN—Poll Send State Variable

This state variable holds the value of the SN of the last AMD PDU with the poll bit set to "1" among the AMD PDUs submitted to lower layer. It is initially set to 0.

Or This state variable holds the value of the SN of the lastly submitted A MD PDU with the poll bit set to "1" among the AMD PDUs submitted to lower layer. It is initially set to 0.

The second operation of the transmission stage RLC entity may be modified as follows based on the new definition of the POLL SN.

The transmission stage RLC entity performs the following procedure when it performs polling. When one of the conditions is satisfied, the transmission stage RLC entity may set the poll bit of an RLC header to 1, may configure an AMD PDU, and may deliver the AMD PDU to a lower layer. Thereafter, the transmission stage RLC entity may set POLL_SN as the RLC sequence number of the last AMD PDU that belongs to AMD PDUs delivered to a lower layer, that has a poll bit set to 1, and that has been polled. In other words, POLL_SN may be set as the RLC sequence number of an AMD PDU finally delivered to a lower layer among data whose poll bit has been set to 1. Furthermore, the transmission stage RLC entity triggers the t-PollRetransmit timer if the timer is not driven, and restarts the timer if the timer is being driven. In the above description, POLL_SN is a variable having a TX_Next−1 value when an AMD PDU having a poll bit set to 1 is transmitted most recently.

After submitting an AMD PDU including a poll to lower layer and after incrementing of TX_Next if necessary, the transmitting side of an AM RLC entity shall:
 set POLL_SN to the SN of the last AMD PDU among the AMD PDUs including a poll submitted to lower layer.
 if t-PollRetransmit is not running:
 start t-PollRetransmit;
 else:
 restart t-PollRetransmit;

After submitting an AMD PDU including a poll to lower layer and after incrementing of TX_Next if necessary, the transmitting side of an AM RLC entity shall:
 set POLL_SN to the SN of the lastly submitted AMD PDU among the AMD PDUs including a poll submitted to lower layer.
 if t-PollRetransmit is not running:
 start t-PollRetransmit;
 else:
 restart t-PollRetransmit;

If the second operation of the transmission stage RLC entity is changed as described above based on the new definition of the POLL_SN, the fourth operation of the transmission stage RLC entity needs to be changed as follows.

When the t-PollRetransmit timer expires, the transmission RLC entity may perform polling again. However, if the transmission buffer or retransmission buffer is empty or if new data can be no longer transmitted because the window is stopped, the transmission RLC entity may perform retransmission on an RLC SDU or RLC PDU having an RLC sequence number corresponding to the RLC sequence number of the last AMD PDU that belongs to AMD PDUs delivered to a lower layer, that has a poll bit set to 1, and that has been polled, that is, to the RLC sequence number of an AMD PDU finally delivered to a lower layer among data having poll bits set to 1 or an RLC SDU or RLC PDU whose successful delivery has not been identified, may set the poll bit of an RLC header of data on which retransmission is performed to 1 and perform polling again.

Upon expiry of t-PollRetransmit, the transmitting side of an AM RLC entity shall:
 if both the transmission buffer and the retransmission buffer are empty (excluding transmitted RLC SDU or RLC SDU segment awaiting acknowledgements); or
 if no new RLC SDU or RLC SDU segment can be transmitted (e.g. due to window stalling):
 consider the RLC SDU with the SN of the last AMD PDU among the AMD PDUs including a poll submitted to lower layer for retransmission; or
 consider any RLC SDU which has not been positively acknowledged f or retransmission;
 include a poll in an AMD PDU as described in section 5.3.3.2.

Upon expiry of t-PollRetransmit, the transmitting side of an AM RLC entity shall:
 if both the transmission buffer and the retransmission buffer are empty (excluding transmitted RLC SDU or RLC SDU segment awaiting acknowledgements); or
 if no new RLC SDU or RLC SDU segment can be transmitted (e.g. due to window stalling):
 consider the RLC SDU with the SN of the lastly submitted AMD PDU among the AMD PDUs including a poll submitted to lower layer for retransmission; or
 consider any RLC SDU which has not been positively acknowledged f or retransmission;
 include a poll in an AMD PDU as described in section 5.3.3.2.

In the disclosure, a method simpler than the method for solving the problem in that an RLC status report is unnecessarily requested by transmitting unnecessary polling may include modifying the first operation of the transmission stage RLC entity as follows. That is, the problem can be solved by having only to perform the update of TX_Next (update TX_Next) (operation of increasing TX_Next by 1) only when an AMD PDU is delivered to a lower layer.

When submitting an AMD PDU that contains a new RLC SDU or an RLC SDU segment, to lower layer, the transmitting side of an AM RLC entity shall:
 set the SN of the AMD PDU to TX_Next;
 if the AMD PDU contains a segment that maps to the last byte of an R LC SDU
 increment TX_Next by one.

The disclosure proposes a method for solving a problem in that data is discarded without processing the data when data greater than data capable of being stored in the buffer of a UE is received. In this problem, in a reception PDCP entity using a split bearer, when an LTE gNB and an NR gNB or an NR gNB and an NR gNB are connected, a corresponding UE must have store all of a lot of data in the buffer because a PDCP sequence number gap occurs if a data transmission rate (data reception rate) from a first link or a second link is different when a lot of the data is received from the first link or the second link. Furthermore, the UE must store all the data without discarding the data until a PDCP re-arrangement timer is triggered and expires. In such a case, if data greater than the size of the buffer capable of storing data is received, data may be lost because the data is not processed and thus a buffer overflow phenomenon occurs. Accordingly, it is necessary for the UE to indicate that the data transmission rate should be lowered because buffer overflow may now occur with respect to the gNB. The buffer may indicate an RLC buffer or a PDCP buffer or an L2 buffer or an application buffer or a buffer used in the UE.

Accordingly, in order to solve the buffer overflow problem, a new RRC message may be defined, and a message indicating buffer overflow may be transmitted to the gNB. Alternatively, a new indicator may be defined in the existing RRC message and transmitted to the gNB in order to indicate buffer overflow.

As another method, a new PDCP control PDU may be defined, and the reception PDCP entity must store a lot of data attributable to a PDCP sequence number gap in the buffer. When the capacity of the buffer is insufficient, the UE may perform indication that the data transmission rate should be lowered because a buffer overflow problem may occur by transmitting the newly defined PDCP control PDU to the reception (gNB) PDCP entity. A primary 1-bit indicator may be defined in the PDCP control PDU, and a buffer overflow problem or a buffer memory shortage may be indicated with respect to the UE. For example, the 1-bit indicator may be set to 1 in order to indicate the buffer overflow problem or buffer memory shortage. Furthermore, a secondary 1-bit indicator may be defined in the PDCP control PDU in order to indicate that a buffer overflow problem or a buffer memory shortage has been solved with respect to the UE. For example, the 1-bit indicator may be set to 1 in order to indicate that a buffer overflow problem or a buffer memory shortage has been solved. That is, the primary 1-bit indicator may indicate that a problem has occurred so that a transmission stage lowers the data transmission rate, and the secondary 1-bit indicator may indicate that a problem has been solved so that a transmission stage can increase the data transmission rate.

FIG. 2M is a diagram showing a format in which new fields have been defined in a PDCP control PDU according to an embodiment of the disclosure.

That is, referring to part (a) of FIG. 2M, a new PDU type field value may be defined to define a new PDCP control PDU, and a primary 1-bit indicator (P field) and a secondary 1-bit indicator (S field) may be defined and used.

As another method, a new field may be defined in the new PDCP control PDU in order to report the current capacity of memory or the current capacity of a buffer. Alternatively, the new field may be used to indicate and report the amount of data capable of being stored in a current buffer in the future. In order to indicate the size of the data, a table may be configured to indicate the size interval of the data or to indicate the size value of actual data in a byte unit or in a kilo byte or mage byte unit. That is, a new PDCP control PDU, such as shown in part (b) of FIG. 2M, may be defined and used.

Figure 2N:
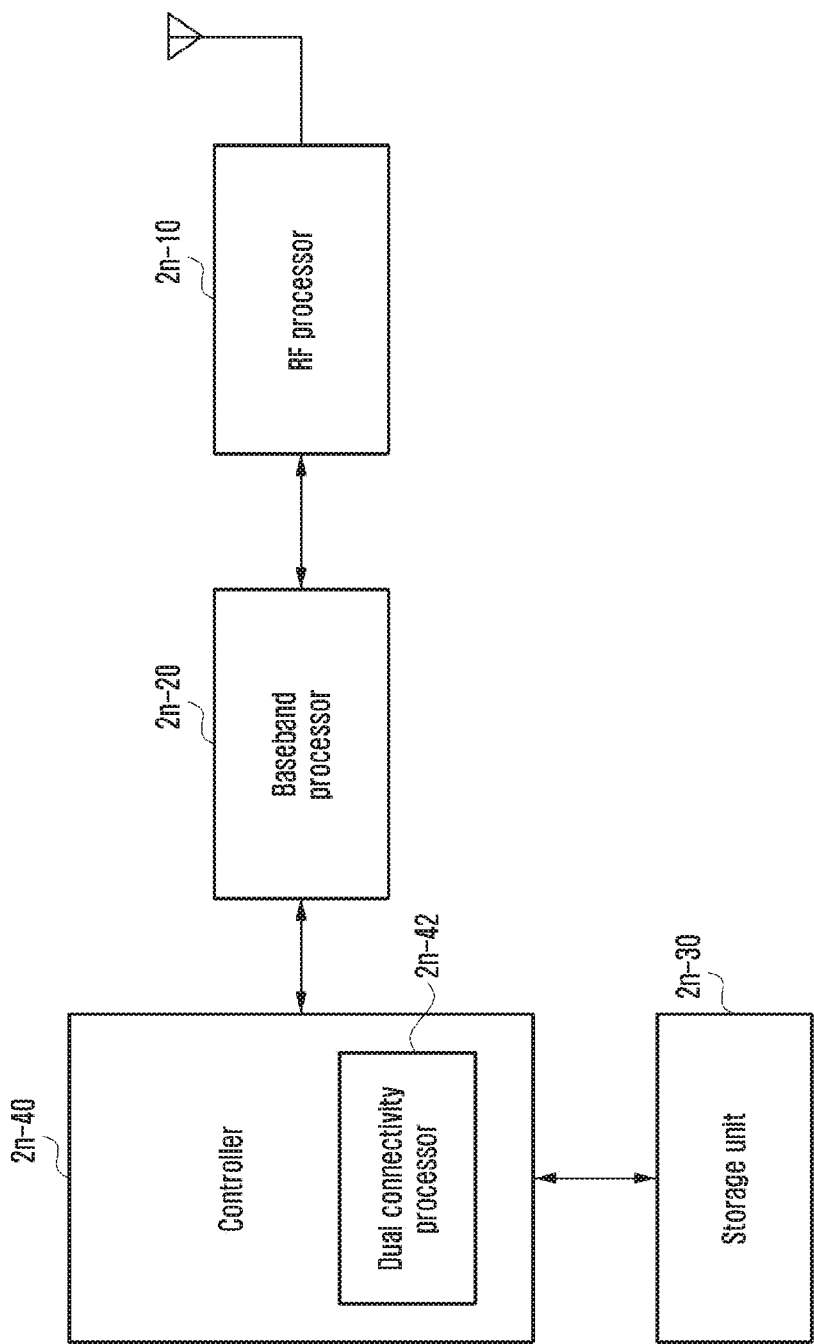
FIG. 2N is a diagram showing the configuration of a UE according to an embodiment of the disclosure.
Figure 20:
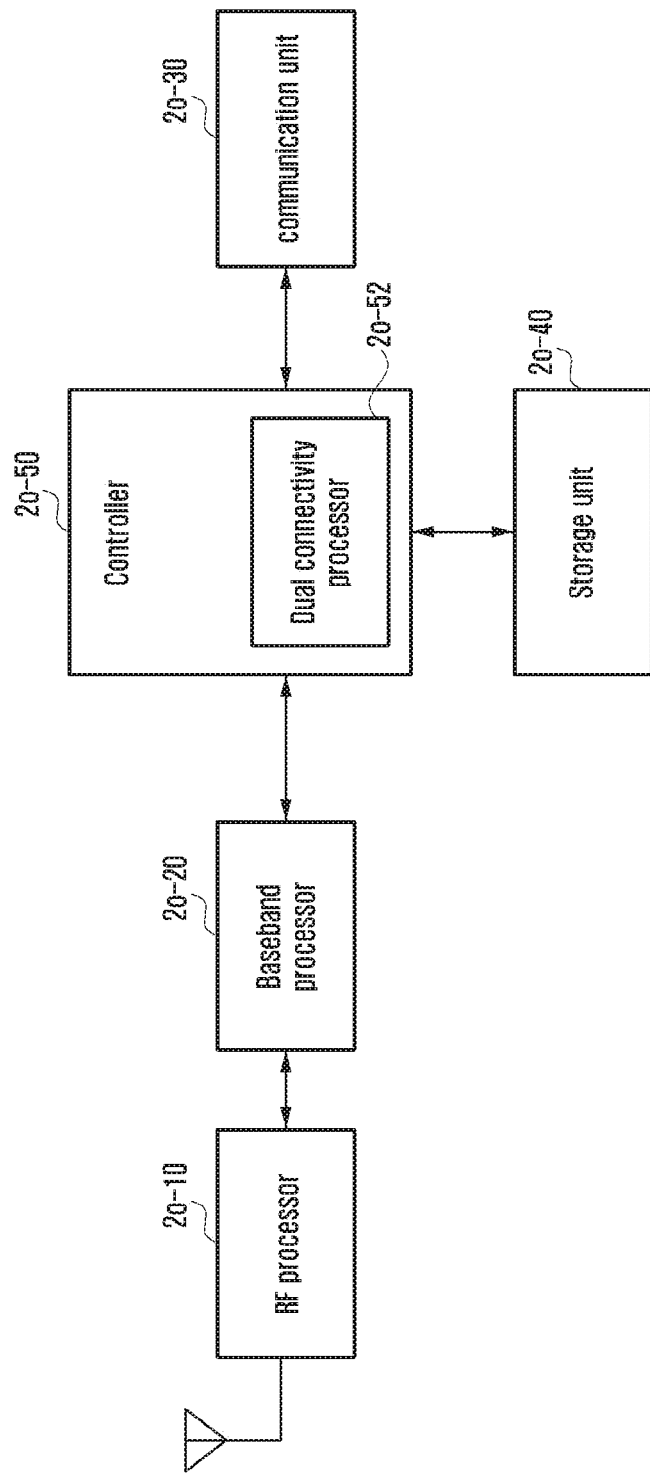

FIG. 2N is a diagram showing the configuration of a UE according to an embodiment of the disclosure.

Referring to FIG. 2N, the UE includes an RF processor 2n-10, a baseband processor 2n-20, a storage unit 2n-30 and a controller 2n-40. The controller 2n-40 may include a dual connectivity processor 2n-42 as shown in FIG. 2N.

The RF processor 2n-10 performs functions for transmitting and receiving signals through a radio channel, such as the band conversion and amplification of a signal. That is, the RF processor 2n-10 up-converts a baseband signal received from the baseband processor 2n-20 into an RF band signal, transmits the RF band signal through an antenna, and down-converts an RF band signal received through the antenna into a baseband signal. For example, the RF processor 2n-10 may include a transmission filter, a reception filter, an amplifier, a mixer, an oscillator, a digital to analog convertor (DAC), and an analog to digital convertor (ADC). In FIG. 2N, only one antenna has been illustrated, but the UE may include multiple antennas. Furthermore, the RF processor 2n-10 may include multiple RF chains. Furthermore, the RF processor 2n-10 may perform beamforming. For the beamforming, the RF processor 2n-10 may adjust the phase and size of each of signals transmitted/received through multiple antennas or antenna elements. Furthermore, the RF processor may perform MIMO. When the MIMO operation is performed, the RF processor may receive multiple layers. The RF processor 2n-10 may properly configure multiple antenna or antenna elements under the control of the controller, and may perform received beam swiping or adjust the direction and beam width of the received beam so that the received beam cooperates with a transmitted beam.

The baseband processor 2n-20 performs a baseband signal and inter-bit stream conversion function based on the physical layer standard of a system. For example, when data is transmitted, the baseband processor 2n-20 generates complex symbols by coding and modulating a transmission bit stream. Furthermore, when data is received, the baseband processor 2n-20 reconstructs a reception bit stream from a baseband signal received from the RF processor 2n-10 through demodulation and decoding. For example, if an OFDM scheme is applied, when data is transmitted, the baseband processor 2n-20 generates complex symbols by coding and modulating a transmission bit stream, maps the complex symbols to subcarriers, and then configures OFDM symbols through IFFT operation and CP insertion. Furthermore, when data is received, the baseband processor 2n-20 segments a baseband signal received from the RF processor 2n-10 in an OFDM symbol unit, reconstructs signals mapped to subcarriers through FFT operation, and reconstructs a reception bit stream through demodulation and decoding.

The baseband processor 2n-20 and the RF processor 2n-10 transmit and receive signals as described above. Accordingly, the baseband processor 2n-20 and the RF processor 2n-10 may be called a transmitter, a receiver, a transceiver or a communication unit. Furthermore, at least one of the baseband processor 2n-20 and the RF processor 2n-10 may include multiple communication modules in order to support different multiple radio access technologies. Furthermore, at least one of the baseband processor 2n-20 and the RF processor 2n-10 may include different communication modules in order to process signals of different frequency bands. For example, the different radio access technologies may include an LTE network and an NR network. Furthermore, the different frequency bands may include a SHF (e.g., 2.5 GHz, 5 GHz) band and a millimeter wave (e.g., 60 GHz) band.

The storage unit 2n-30 stores data, such as a basic program, an application program, and configuration information for the operation of the UE. The storage unit 2n-30 provides stored data in response to a request from the controller 2n-40.

The controller 2n-40 controls an overall operation of the UE. For example, the controller 2n-40 transmits/receives a signal through the baseband processor 2n-20 and the RF processor 2n-10. Furthermore, the controller 2n-40 writes data in the storage unit 2n-40 and reads data from the storage unit 2n-40. To this end, the controller 2n-40 may include at least one processor. For example, the controller 2n-40 may include a CP performing control for communication and an AP controlling a higher layer, such as an application program.

FIG. 2O is a diagram showing the configuration of an eNB according to an embodiment of the disclosure. The eNB may be named a TRP.

Referring to FIG. 2O, the gNB may include an RF processor 2o-10, a baseband processor 2o-20, a backhaul communication unit 2o-30, a storage unit 2o-40 and a controller 2o-50. The controller 2o-50 may include a dual connectivity processor 2o-52, as shown in FIG. 2O.

The RF processor 2o-10 performs a function for transmitting and receiving signals through a radio channel, such as the band conversion and amplification of a signal. That is, the RF processor 2o-10 up-converts a baseband signal received from the baseband processor 2o-20 into an RF band signal, transmits the RF band signal through an antenna, and down-converts an RF band signal received through the antenna into a baseband signal. For example, the RF processor 2o-10 may include a transmission filter, a reception filter, an amplifier, a mixer, an oscillator, a DAC, and an ADC. In FIG. 2O, only one antenna has been illustrated, but the gNB may include multiple antennas. Furthermore, the RF processor 2o-10 may include multiple RF chains. Furthermore, the RF processor 2o-10 may perform beamforming. For the beamforming, the RF processor 2o-10 may adjust the phase and size of each of signals transmitted/received multiple antennas or antenna elements. The RF processor may perform a downlink MIMO operation by transmitting one or more layers.

The baseband processor 2o-20 performs a baseband signal and inter-bit stream conversion function based on the physical layer standard of a first radio access technology. For example, when data is transmitted, the baseband processor 2o-20 generates complex symbols by coding and modulating a transmission bit stream. Furthermore, when data is received, the baseband processor 2o-20 reconstructs a reception bit stream from a baseband signal received from the RF processor 2o-10 through demodulation and decoding. For example, if the OFDM scheme is applied, when data is transmitted, the baseband processor 2o-20 generates complex symbols by coding and modulating a transmission bit stream, maps the complex symbols to subcarriers, and configures OFDM symbols through IFFT operation and CP insertion. Furthermore, when data is received, the baseband processor 2o-20 segments a baseband signal received from the RF processor 2o-10 in an OFDM symbol unit, reconstructs signals mapped to subcarriers through FFT operation, and then reconstructs a reception bit stream through demodulation and decoding. The baseband processor 2o-20 and the RF processor 2o-10 transmit and receive signals as described above. Accordingly, the baseband processor 2o-20 and the RF processor 2o-10 may be called a transmitter, a receiver, a transceiver, a communication unit or a wireless communication unit.

The communication unit 2o-30 provides an interface for performing communication with other nodes within a network.

The storage unit 2o-40 stores data, such as a basic program, an application program, and configuration information for the operation of the gNB. Specifically, the storage unit 2o-40 may store information on a bearer allocated to an accessed UE and measurement results reported by an accessed UE. Furthermore, the storage unit 2o-40 may store information, that is, a criterion by which whether to provide a UE with multiple connections is determined. Furthermore, the storage unit 2o-40 provides stored data in response to a request from the controller 2o-50.

The controller 2o-50 controls an overall operation of the gNB. For example, the controller 2o-50 transmits/receives a signal through the baseband processor 2o-20 and the RF processor 2o-10 or through the communication unit 2o-30. Furthermore, the controller 2o-50 writes data in the storage unit 2o-40 and reads data from the storage unit 2o-40. To this end, the controller 2o-50 may include at least one processor.

An embodiment of the disclosure proposes operations of a transmission device and reception device for efficiently using packet duplication which may be applied to a next-generation mobile communication system in order to reduce unnecessary retransmission and resource waste and transmission latency. Specifically, when packet duplication is activated and deactivated in a next-generation mobile communication system, efficient operations of a PDCP entity and RLC entity can be proposed to reduce transmission latency and prevent unnecessary transmission.

An embodiment of the disclosure proposes a method of processing control data of a PDCP layer without generating a problem in a reception PDCP entity by taking into consideration the easiness of an implementation in order to efficiently use packet duplication applicable to a next-generation mobile communication system.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a terminal in a wireless communication system, the method comprising:
   receiving, from a base station, a radio resource control (RRC) message including a radio link control (RLC) configuration and a packet data convergence protocol (PDCP) configuration associated with a packet duplication;
   identifying whether a PDCP packet is a PDCP control data in case that the packet duplication is activated;
   transmitting, to the base station, the PDCP control data without the packet duplication through a primary RLC entity based on the PDCP configuration, in case that the PDCP packet is the PDCP control data; and
   transmitting, to the base station, duplicated PDCP user data through the primary RLC entity and a secondary RLC entity in case that the PDCP packet is a PDCP user data.

2. The method of claim 1, wherein the RLC configuration includes:
 a first logical channel identity; and
 a second logical channel identity associated with the PDCP configuration.

3. The method of claim 1, wherein the activation of the packet duplication is indicated based on at least one of the RRC message or a medium access control (MAC) control element (CE).

4. The method of claim 1, wherein the PDCP control data includes at least one of a PDCP status report or an interspersed robust header compression (ROHC) feedback.

5. The method of claim 1, further comprising:
 receiving information indicating a deactivation of the packet duplication; and
 discarding all duplicated PDCP user data for the secondary RLC entity based on the information.

6. A terminal in a wireless communication system, the terminal comprising:
 a transceiver; and
 a controller configured to:
  receive, from a base station via the transceiver, a radio resource control (RRC) message including a radio link control (RLC) configuration and a packet data convergence protocol (PDCP) configuration associated with a packet duplication,
  identify whether a PDCP packet is a PDCP control data in case that the packet duplication is activated,
  transmit, to the base station via the transceiver, the PDCP control data without the packet duplication through a primary RLC entity based on the PDCP configuration, in case that the PDCP packet is the PDCP control data, and
  transmit, to the base station via the transceiver, duplicated PDCP user data through the primary RLC entity and a secondary RLC entity in case that the PDCP packet is a PDCP user data.

7. The terminal of claim 6, wherein the RLC configuration includes a first logical channel identity and a second logical channel identity associated with the PDCP configuration.

8. The terminal of claim 6, wherein an activation of the packet duplication is indicated based on at least one of the RRC message or a medium access control (MAC) control element (CE).

9. The terminal of claim 6, wherein the PDCP control data includes at least one of a PDCP status report or an interspersed robust header compression (ROHC) feedback.

10. The terminal of claim 6, wherein the controller is further configured to:
 receive information indicating a deactivation of the packet duplication, and
 discard all duplicated PDCP user data for the secondary RLC entity based on the information.

11. A method performed by a base station in a wireless communication system, the method comprising:
 transmitting, to a terminal, a radio resource control (RRC) message including a radio link control (RLC) configuration and a packet data convergence protocol (PDCP) configuration associated with a packet duplication;
 receiving, from the terminal, a PDCP control data without the packet duplication through a primary RLC entity based on the PDCP configuration, in case that a PDCP packet is the PDCP control data and a packet duplication is activated; and
 receiving, from the terminal, duplicated PDCP user data through the primary RLC entity and a secondary RLC entity in case that the PDCP packet is a PDCP user data and the packet duplication is activated.

12. The method of claim 11, wherein the RLC configuration includes a first logical channel identity and a second logical channel identity associated with the PDCP configuration.

13. The method of claim 11, wherein the activation of the packet duplication is indicated based on at least one of the RRC message or a medium access control (MAC) control element (CE).

14. The method of claim 11, wherein the PDCP control data includes at least one of a PDCP status report or an interspersed ROHC feedback.

15. The method of claim 11, further comprising:
 transmitting information indicating a deactivation of the packet duplication,
 wherein all duplicated PDCP user data for the secondary RLC entity are discarded based on the information.

16. A base station in a wireless communication system, the base station comprising:
 a transceiver; and
 a controller configured to:
  transmit, to a terminal via the transceiver, a radio resource control (RRC) message including a radio link control (RLC) configuration and a packet data convergence protocol (PDCP) configuration associated with a packet duplication,
  receive, from the terminal via the transceiver, a PDCP control data without the packet duplication through a primary RLC entity based on the PDCP configuration, in case that a PDCP packet is the PDCP control data and a packet duplication is activated, and
  receive, from the terminal via the transceiver, duplicated PDCP user data through the primary RLC entity and a secondary RLC entity in case that the PDCP packet is a PDCP user data and the packet duplication is activated.

17. The base station of claim 16, wherein the RLC configuration includes a first logical channel identity and a second logical channel identity associated with the PDCP configuration.

18. The base station of claim 16, wherein an activation of the packet duplication is indicated based on at least one of the RRC message or a medium access control (MAC) control element (CE).

19. The base station of claim 16, wherein the PDCP control data includes at least one of a PDCP status report or an interspersed robust header compression (ROHC) feedback.

20. The base station of claim 16, wherein the controller is further configured to:
 transmit information indicating a deactivation of the packet duplication, and
 discard all duplicated PDCP user data for the secondary RLC entity based on the information.

* * * * *